US012659734B2

(12) United States Patent
Chen

(10) Patent No.: US 12,659,734 B2
(45) Date of Patent: Jun. 16, 2026

(54) METHOD, APPARATUS, AND SYSTEM FOR VEHICLE-TO-VEHICLE COMMUNICATIONS

(71) Applicant: Shenzhen Yinwang Intelligent Technologies Co., Ltd., Shenzhen (CN)

(72) Inventor: Youlei Chen, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 324 days.

(21) Appl. No.: 17/903,764

(22) Filed: Sep. 6, 2022

(65) Prior Publication Data

US 2023/0007478 A1     Jan. 5, 2023

Related U.S. Application Data

(63) Continuation of application No. PCT/CN2020/079371, filed on Mar. 13, 2020.

(51) Int. Cl.
*H04W 12/06* (2021.01)
*H04L 9/08* (2006.01)
(Continued)

(52) U.S. Cl.
CPC ............. *H04W 12/06* (2013.01); *H04L 9/083* (2013.01); *H04L 9/0891* (2013.01);
(Continued)

(58) Field of Classification Search
CPC ....... H04L 9/08; H04L 9/0816; H04L 9/0819; H04L 9/083; H04L 9/0891; H04L 9/0894;
(Continued)

(56) References Cited

U.S. PATENT DOCUMENTS

| | | | |
|---|---|---|---|
| 11,252,154 B2 * | 2/2022 | Chun | ...................... H04L 67/52 |
| 11,777,590 B2 * | 10/2023 | Wang | ...................... H04W 4/44 |
| | | | 370/315 |

(Continued)

FOREIGN PATENT DOCUMENTS

| | | |
|---|---|---|
| CN | 107623912 A | 1/2018 |
| CN | 109548017 A | 3/2019 |

(Continued)

OTHER PUBLICATIONS

3GPP TR 33.885 vo.3.0 (May 2016);3rd Generation Partnership Project;Technical Specification Group Services and System Aspects;Study on Security Aspect for LTE support of V2X Services(Release 14), Total 33 Pages.

*Primary Examiner* — D'Arcy Winston Straub
(74) *Attorney, Agent, or Firm* — Leydig, Voit & Mayer, Ltd.

(57) ABSTRACT

In a method for conducting communications, a first terminal device in a vehicle-to-vehicle (V2V) network sends a first request message to a server of the V2V network to request the server to allocate an encryption key corresponding to a first service. The first request message includes an identifier of the first service and an identifier of the first terminal device. The first terminal device receives from the server a first response message that includes an encryption key corresponding to the first service. The first terminal device uses the encryption key to encrypt first information related to the first terminal device in the V2V network, and broadcasts a broadcast message that includes the encrypted first information to the V2V network.

22 Claims, 25 Drawing Sheets

(51) Int. Cl.

| | |
|---|---|
| *H04L 9/40* | (2022.01) |
| *H04W 4/44* | (2018.01) |
| *H04W 4/46* | (2018.01) |
| *H04W 12/03* | (2021.01) |
| *H04W 12/71* | (2021.01) |
| *H04W 64/00* | (2009.01) |
| *H04W 12/0431* | (2021.01) |

(52) U.S. Cl.
CPC .......... *H04L 9/0897* (2013.01); *H04L 63/065* (2013.01); *H04W 4/44* (2018.02); *H04W 4/46* (2018.02); *H04W 12/03* (2021.01); *H04W 12/71* (2021.01); *H04W 64/00* (2013.01); *H04L 2209/84* (2013.01); *H04W 12/0431* (2021.01)

(58) Field of Classification Search
CPC ..... H04L 9/0897; H04L 63/06; H04L 63/065; H04L 2209/84; H04W 4/30; H04W 4/40; H04W 4/44; H04W 4/46; H04W 12/03; H04W 12/04; H04W 12/043; H04W 12/0431; H04W 12/06; H04W 12/60; H04W 12/69; H04W 12/71; H04W 64/00
See application file for complete search history.

(56) References Cited

U.S. PATENT DOCUMENTS

| | | | |
|---|---|---|---|
| 2007/0281665 A1 | 12/2007 | Cho et al. | |
| 2012/0155636 A1* | 6/2012 | Muthaiah | H04L 9/0825 380/44 |
| 2017/0070485 A1* | 3/2017 | Kumar | H04L 9/3066 |
| 2018/0332585 A1* | 11/2018 | Faurie | H04W 4/70 |
| 2019/0200228 A1 | 6/2019 | Adrangi et al. | |
| 2019/0223008 A1 | 7/2019 | Vanderveen et al. | |
| 2020/0259896 A1* | 8/2020 | Sachs | H04L 63/0428 |
| 2020/0327806 A1* | 10/2020 | Lekutai | H04W 4/44 |
| 2021/0072041 A1* | 3/2021 | Castorena Martinez | G06V 20/64 |
| 2021/0112410 A1* | 4/2021 | Mitra | H04L 9/3026 |

FOREIGN PATENT DOCUMENTS

| | | | | |
|---|---|---|---|---|
| CN | 110445747 A | | 11/2019 | |
| CN | 107005844 B | | 12/2020 | |
| CN | 113395298 A | * | 9/2021 | ............ H04L 67/12 |
| EP | 3319354 A1 | | 5/2018 | |
| EP | 3487197 A1 | | 5/2019 | |
| JP | 2002300152 A | | 10/2002 | |
| JP | 2003152698 A | | 5/2003 | |
| JP | 2006157970 A | | 6/2006 | |
| JP | 2009212747 A | | 9/2009 | |
| JP | 2012234244 A | | 11/2012 | |
| JP | 2016010031 A | | 1/2016 | |
| JP | 2016019151 A | | 2/2016 | |
| JP | 2017079369 A | | 4/2017 | |
| JP | 2018061250 A | | 4/2018 | |
| WO | 2017029708 A1 | | 2/2017 | |

* cited by examiner

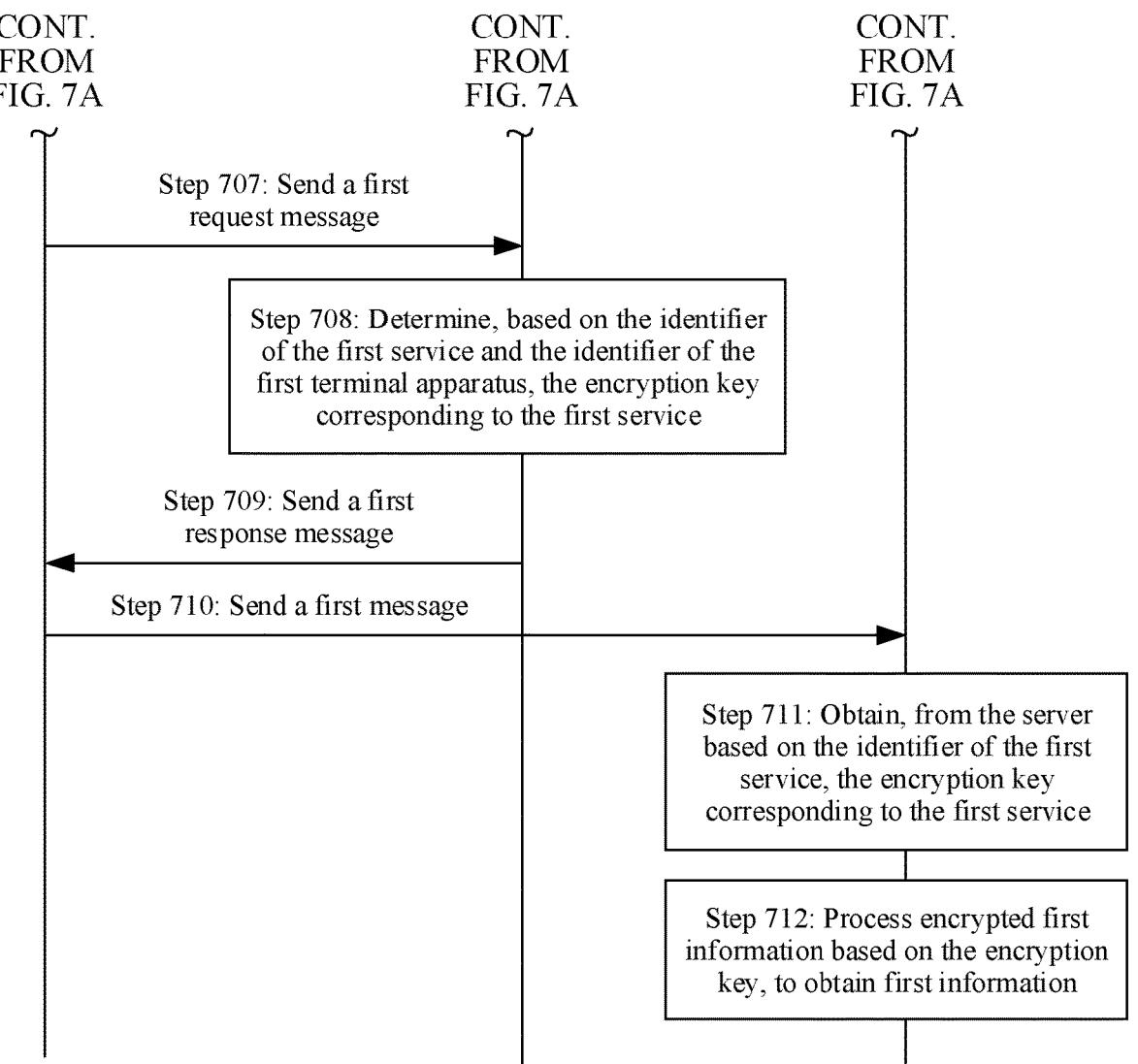

CONT.
FROM
FIG. 7A

CONT.
FROM
FIG. 7A

CONT.
FROM
FIG. 7A

Step 707: Send a first
request message

Step 708: Determine, based on the identifier
of the first service and the identifier of the
first terminal apparatus, the encryption key
corresponding to the first service Step 709: Send a first
response message Step 710: Send a first message Step 711: Obtain, from the server
based on the identifier of the first
service, the encryption key
corresponding to the first service Step 712: Process encrypted first
information based on the encryption
key, to obtain first information

FIG. 7B

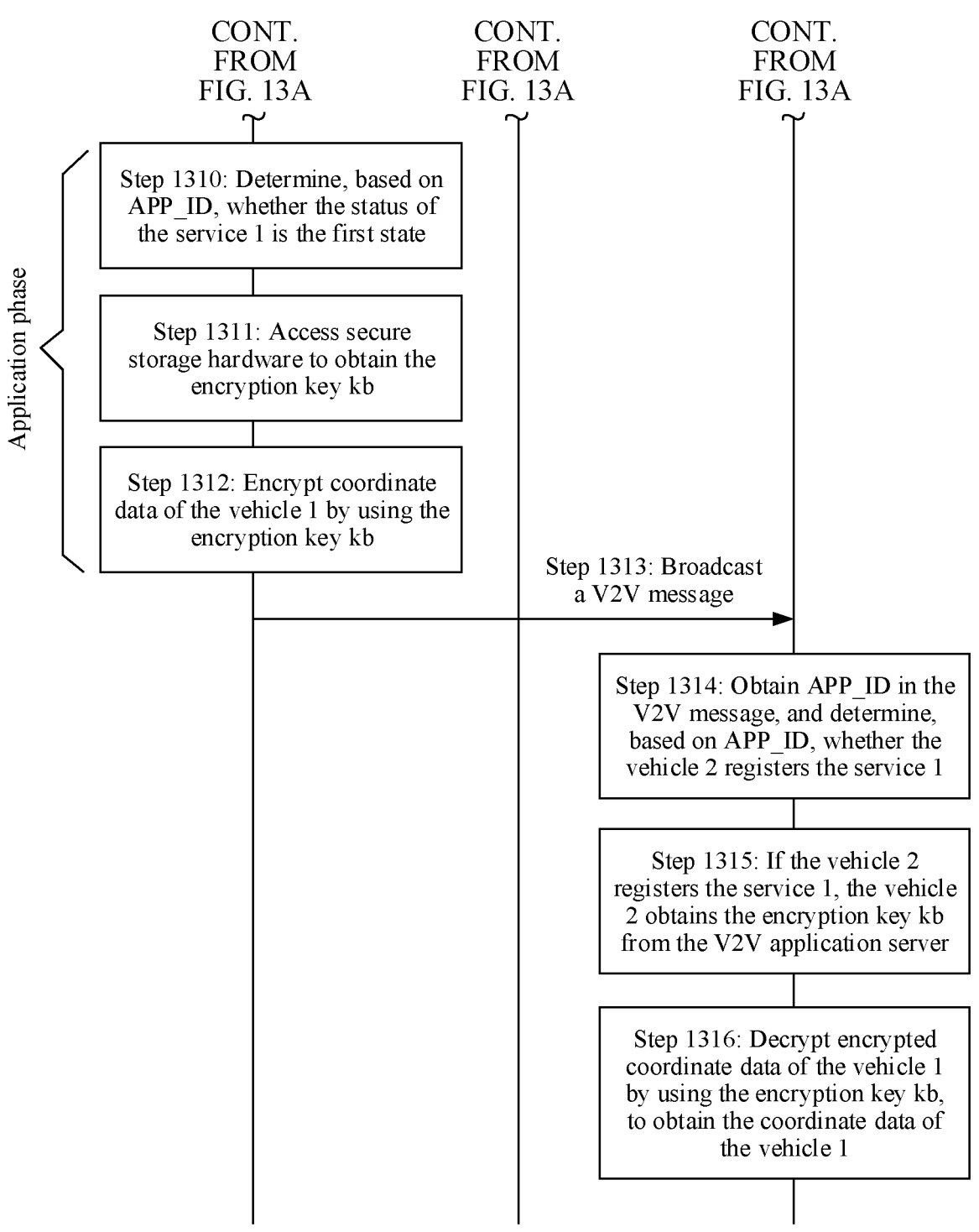

CONT. FROM FIG. 13A    CONT. FROM FIG. 13A    CONT. FROM FIG. 13A

Application phase

Step 1310: Determine, based on APP_ID, whether the status of the service 1 is the first state Step 1311: Access secure storage hardware to obtain the encryption key kb Step 1312: Encrypt coordinate data of the vehicle 1 by using the encryption key kb Step 1313: Broadcast a V2V message Step 1314: Obtain APP_ID in the V2V message, and determine, based on APP_ID, whether the vehicle 2 registers the service 1

Step 1315: If the vehicle 2 registers the service 1, the vehicle 2 obtains the encryption key kb from the V2V application server Step 1316: Decrypt encrypted coordinate data of the vehicle 1 by using the encryption key kb, to obtain the coordinate data of the vehicle 1

FIG. 13B

METHOD, APPARATUS, AND SYSTEM FOR VEHICLE-TO-VEHICLE COMMUNICATIONS

CROSS-REFERENCE TO RELATED APPLICATIONS

This application is a continuation of International Application No. PCT/CN2020/079371, filed on Mar. 13, 2020, the disclosure of which is hereby incorporated by reference in its entirety.

TECHNICAL FIELD

Embodiments of this application relate to the field of communication technologies, and in particular, to communications in a vehicle-to-vehicle network.

BACKGROUND

In a vehicle-to-vehicle (V2V) scenario, vehicle A may broadcast coordinate data of vehicle A at any time, to form a continuous track. There may be a case in which a malicious vehicle or a specially forged malicious road-side listening device intentionally listens on and collects a broadcast channel of a surrounding vehicle to obtain sensitive data such as coordinate data. Therefore, encrypting the coordinate data that is broadcast by the vehicle in the V2V scenario is a technical problem that urgently needs to be resolved.

However, in the V2V scenario, vehicle A broadcasts the coordinate data to a random object, a receiving vehicle surrounding vehicle A changes at any time, and there is no fixed receiving vehicle. Vehicle A needs to search for a proper broadcast object. After vehicle A finds the broadcast object, it may query a public key of the broadcast object based on an identifier of the broadcast object, to encrypt the coordinate data. However, this requires additional communication and computing overheads, for various purposes, such as identifying a surrounding vehicle, obtaining an identifier or attribute information of the vehicle, and sending an encryption key to the surrounding vehicle. Consequently, computing and storage overheads caused by the foregoing broadcast encryption solution are extremely high.

SUMMARY

Embodiments of this application provide a communications method, apparatus, and system, to reduce load of managing an encryption key by a terminal (for example, a vehicle), and reduce computing and storage overheads of the terminal.

To achieve the foregoing objectives, the embodiments of this application provide the following technical solutions.

According to a first aspect, an embodiment of this application provides a communications method. The method includes: A first terminal device sends, to a server, a first request message used to request the server to allocate an encryption key corresponding to a first service, where the first request message includes an identifier of the first service and an identifier of the first terminal device, and the encryption key is used to encrypt first information.

This embodiment of this application provides a secure communications method. In the method, an encryption key corresponding to a first service is managed by a server. A first terminal device requests, by using a first request message, the server to allocate the encryption key corresponding to the first service, and then receives, from the server, the encryption key that corresponds to the first service and that is used to encrypt first information. In this way, sensitive data such as the first information can be encrypted by using the encryption key in a V2V lane-level assisted driving application scenario, and a process of allocating the encryption key and a process of performing secure communication by using the encryption key can be decoupled. The first terminal device obtains the encryption key from the server, so that computing and storage overheads of the first terminal device can be reduced, a process in which the first terminal device generates the encryption key through calculation can be omitted, a delay can be increased, and a requirement of lane-level assisted driving on a communication delay can be satisfied. The server allocates the encryption key, so that it is more convenient to centrally maintain and update the encryption key, load of managing the encryption key by the first terminal device is reduced, application layer control is facilitated, and promotion and use are also facilitated. In addition, a correspondence between the encryption key and the identifier of the first service may be configured for different application scenarios in V2X.

In a possible implementation, the first request message in this embodiment of this application further includes a metric value of the first terminal device, and the metric value of the first terminal device is used to verify whether the first terminal device is authorized. The metric value of the first terminal device is provided for the server by using the first request message, so that the server determines whether the first terminal is qualified to request the encryption key corresponding to the first service. For example, if first terminal device is authorized, the server determines that the first terminal device is qualified to request the encryption key corresponding to the first service; and if the terminal device is unauthorized, in other words, if the terminal device is unauthorized, the server determines that the first terminal is unqualified to request the encryption key corresponding to the first service. In this way, the encryption key corresponding to the first service can be prevented from being obtained by the unauthorized terminal device.

In a possible implementation, the first request message further includes location information of the first terminal device. Correspondingly, the encryption key is determined based on the location information of the first terminal device and the identifier of the first service. In this way, the encryption key corresponding to the first service can be valid in a specified area.

In a possible implementation, the method provided in this embodiment of this application further includes: The first terminal device receives, from the server, an authorization code corresponding to the encryption key, where the authorization code is used to obtain the encryption key. In this way, the first terminal device can access the encryption key by using the authorization code, to improve security of the encryption key.

In a possible implementation, after the first terminal device receives the first response message, the method provided in this embodiment of this application further includes: The first terminal device stores the encryption key in the first terminal device. The first terminal device stores the encryption key, so that a process in which the first terminal device obtains the encryption key from the server can be separated from a process in which the first terminal device encrypts the first information by using the encryption key. In this way, a problem that the encryption key cannot be obtained online through a network connection in an application phase is resolved.

In a possible implementation, after the first terminal device receives the first response message, the method provided in this embodiment of this application further includes: The first terminal device updates a status of the first service to a first state, where the first state indicates that the first service has the corresponding encryption key. By updating the status of the first service, the first terminal device subsequently determines, in an application phase, that the first service has the corresponding encryption key.

In a possible implementation, the method provided in this embodiment of this application further includes: The first terminal device obtains, based on the identifier of the first service when the status of the first service is the first state, the encryption key from a component that stores the encryption key and that is in the first terminal device. The first terminal device sends a first message, where the first message includes the identifier of the first service and first information encrypted by using the encryption key. In this way, security of the first information can be improved.

In a possible implementation, that the first terminal device obtains, based on the identifier of the first service when the status of the first service is the first state, the encryption key from a component that stores the encryption key and that is in the first terminal device includes: When the status of the first service is the first state, the first terminal device generates a first authorization code based on the metric value of the first terminal device and the identifier of the first terminal device. When the first authorization code is the same as the authorization code corresponding to the encryption key, the first terminal device obtains, based on the identifier of the first service, the encryption key from the component that stores the encryption key and that is in the first terminal device.

In a possible implementation, the authorization code is determined based on the metric value and the identifier of the first terminal device.

In a possible implementation, before the first terminal device sends the first request message to the server, the method provided in this embodiment of this application further includes: The first terminal device sends a second request message to the server, where the second request message is used to request the server to allocate the encryption key corresponding to the first service, and the second request message includes the identifier of the first service and the identifier of the first terminal device. The first terminal device receives, from the server, a second response message used to indicate that the first service has the corresponding encryption key. The first terminal device updates a status of the first service to a first state based on the second response message, where the first state indicates that the first service has the corresponding encryption key. In this solution, key distribution may be delayed. To be specific, the server first generates the encryption key based on the second request message, but in this case, the server does not send the encryption key corresponding to the first service to the first terminal device.

In a possible implementation, before the first terminal device sends the first request message to the server, the method provided in this embodiment of this application further includes: The server determines that the status of the first service is the first state.

In a possible implementation, the method provided in this embodiment of this application further includes: The first terminal device sends the first message that includes the identifier of the first service and the first information encrypted by using the encryption key.

In a possible implementation, the method provided in this embodiment of this application further includes: The first terminal device receives a key update seed from the server, where the key update seed is used to update the encryption key. The first terminal device updates the encryption key based on the key update seed, to obtain an updated encryption key. In this way, the encryption key can be updated in a timely manner, and security of the encryption key can be improved.

In a possible implementation, the method provided in this embodiment of this application further includes: The first terminal device receives version number information from the server, where the version number information is used to identify the updated encryption key. The first terminal device determines a version number of the updated encryption key based on the version number information.

In a possible implementation, before the first terminal device receives the key update seed from the server, the method provided in this embodiment of this application further includes: The first terminal device sends a key update request to the server, where the key update request is used to request to update the encryption key corresponding to the first service.

In a possible implementation, before the first terminal device sends the key update request to the server, the method may further include: The first terminal device determines to update the encryption key corresponding to the first service.

In a possible implementation, that the first terminal device determines to update the encryption key corresponding to the first service includes: The first terminal device determines, according to a key update policy corresponding to the first service, to update the encryption key corresponding to the first service. Alternatively, the first terminal device receives a key update notification request from the server, where the key update notification request is used to indicate the first terminal device to update the encryption key corresponding to the first service. The first terminal device determines, based on the key update notification request, to update the encryption key corresponding to the first service.

In a possible implementation, the first terminal device is a vehicle, the first terminal device is a vehicle-mounted device, or the first terminal device is a chip in the vehicle-mounted device.

According to a second aspect, an embodiment of this application provides a communications method. The method includes: A server receives, from a first terminal device, a first request message used to request the server to allocate an encryption key corresponding to a first service, where the first request message includes an identifier of the first service and an identifier of the first terminal device. The server determines, based on the identifier of the first service and the identifier of the first terminal device, the encryption key corresponding to the first service. The server sends a first response message including the encryption key corresponding to the first service to the first terminal device.

In a possible implementation, the first request message further includes a metric value of the first terminal device, and the metric value is used to verify whether the first terminal device is authorized.

In a possible implementation, that the server determines, based on the identifier of the first service and the identifier of the first terminal device, the encryption key corresponding to the first service includes: When the server determines, based on the metric value, that the first terminal device is authorized, the server determines, based on the identifier of the first service, the encryption key corresponding to the first service.

In a possible implementation, that the server determines, based on the metric value of the first terminal device, that the first terminal device is authorized includes: If the metric value of the first terminal device is the same as a standard metric value or the metric value of the first terminal device exists in a standard metric list, the server determines that the first terminal device is authorized. If the metric value of the first terminal device is different from a standard metric value or the metric value of the first terminal device does not exist in a standard metric list, the server determines that the first terminal device is unauthorized.

In a possible implementation, the first request message further includes location information of the first terminal device. Correspondingly, the encryption key is determined based on the identifier of the first service and the location information of the first terminal device. For example, the server may determine, based on the identifier of the first service in the following manner, the encryption key corresponding to the first service: When the server determines, based on the identifier of the first terminal device, that the first terminal device meets a condition for enabling the first service, the server determines, based on the identifier of the first service and the location information of the first terminal device, the encryption key corresponding to the first service.

In a possible implementation, the method provided in this embodiment of this application further includes: The server sends an authorization code corresponding to the encryption key to the first terminal device.

In a possible implementation, the authorization code is determined based on one or more of the identifier of the first terminal device and the metric value of the first terminal device.

In a possible implementation, the authorization code is determined based on the identifier of the first terminal device. For example, the server determines, based on the identifier of the first terminal device, the authorization code corresponding to the encryption key.

In a possible implementation, the authorization code is determined based on the identifier of the first terminal device and the metric value of the first terminal device. For example, the server generates, based on the metric value of the first terminal device and the identifier of the first terminal device, the authorization code corresponding to the encryption key.

In a possible implementation, the authorization code is determined based on the metric value of the first terminal device. For example, the server determines the authorization code based on the metric value of the first terminal device.

In a possible implementation, before the server receives the first request message from the first terminal device, the method provided in this embodiment of this application further includes: The server receives, from the first terminal device, a second request message used to request the server to allocate the corresponding encryption key to the first service, where the second request message includes the identifier of the first service and the identifier of the first terminal device. The server sends a second response message to the first terminal device, where the second response message is used to indicate that the first service has the corresponding encryption key.

In a possible implementation, the second request message includes one or more of the metric value of the first terminal device and the location information of the first terminal device.

In a possible implementation, that the server sends the encryption key corresponding to the first service to the first terminal device includes: When the server determines, based on the metric value of the first terminal device, that the first terminal device is authorized, the server sends the encryption key corresponding to the first service to the first terminal device.

In a possible implementation, that the server determines, based on the identifier of the first service and the identifier of the first terminal device, the encryption key corresponding to the first service includes: When the server determines, based on the identifier of the first terminal device, that the first terminal device is capable of enabling the first service, the server determines, based on the identifier of the first service, the encryption key corresponding to the first service.

In a possible implementation, that the server determines, based on the identifier of the first service and the identifier of the first terminal device, the encryption key corresponding to the first service includes: When the server determines, based on the identifier of the first terminal device, that the first terminal device is capable of enabling the first service, the server determines, based on the identifier of the first service, an encryption key associated with the identifier of the first service as the encryption key corresponding to the first service.

In a possible implementation, the method provided in this embodiment of this application further includes: The server sends a key update seed and/or version number information to the first terminal device, where the key update seed is used to update the encryption key, and the version number information is used to identify an updated encryption key.

In a possible implementation, before the server sends the key update seed and/or the version number information to the first terminal device, the method provided in this embodiment of this application further includes: The server receives a key update request from the first terminal device, where the key update request is used to request to update the encryption key corresponding to the first service. Optionally, the key update request includes indication information x, used to indicate that the first terminal device requests to update the encryption key corresponding to the first service.

In a possible implementation, before the server receives the key update request from the first terminal device, the method provided in this embodiment of this application further includes: The server sends a key update notification request to the first terminal device, where the key update notification request is used to indicate the first terminal device to update the encryption key corresponding to the first service, and the key update notification request may include the identifier of the first service. Optionally, the key update notification request may carry indication information y, used to indicate the first terminal device to update the encryption key corresponding to the first service.

In a possible implementation, the first terminal device is a vehicle, the first terminal device is a vehicle-mounted device, or the first terminal device is a chip in the vehicle-mounted device.

According to a third aspect, an embodiment of this application provides a secure communications method, including: A second terminal device receives, from a first terminal device, a first message that includes an identifier of a first service and encrypted first information. The second terminal device obtains, from a server based on the identifier of the first service, an encryption key corresponding to the first service. The second terminal device processes the encrypted first information based on the encryption key, to obtain first information.

In a possible implementation, that the second terminal device obtains, from a server based on the identifier of the first service, an encryption key corresponding to the first service includes: The second terminal device sends a first request message to the server, where the first request message includes the identifier of the first service. The second terminal device receives a first response message from the server, where the first response message includes the encryption key corresponding to the first service.

In a possible implementation, the first message may further include an authorization code corresponding to the encryption key. Correspondingly, the first request message further includes the authorization code corresponding to the encryption key, and the authorization code is used to obtain the encryption key.

In a possible implementation, the first request message further includes one or more of an identifier of the second terminal device or location information of the second terminal device.

In a possible implementation, the first message may further include a location tag, and the first request message may further include the location tag.

In a possible implementation, the second terminal device is a vehicle, the second terminal device is a vehicle-mounted device, or the second terminal device is a chip in the vehicle-mounted device.

According to a fourth aspect, an embodiment of this application provides a key update method. The method is applied to a first terminal device, and the first terminal device has an encryption key corresponding to a first service. The method includes: The first terminal device receives, from a server, a key update seed corresponding to the first service, where the key update seed is used to update the encryption key. The first terminal device obtains an updated encryption key based on the key update seed and the encryption key.

In a possible implementation, the method provided in this embodiment of this application further includes: The first terminal device obtains version number information corresponding to the first service, where the version number information is used to identify the updated encryption key. Correspondingly, the method provided in this embodiment of this application further includes: The first terminal device determines a version number of the updated encryption key based on the version number information. For example, the version number information may be determined by the first terminal device and then determined by the server, or the version number information is determined through negotiation between the first terminal device and the server, or is predefined in a protocol. Certainly, the version number information may alternatively be sent by the server to the first terminal device.

In a possible implementation, the first terminal device is a vehicle, the first terminal device is a vehicle-mounted device, or the first terminal device is a chip in the vehicle-mounted device.

In a possible implementation, before the first terminal device receives, from the server, the key update seed corresponding to the first service, the method provided in this embodiment of this application may further include: The first terminal device sends a key update request to the server, where the key update request is used to request to update the encryption key corresponding to the first service. For example, the key update request includes an identifier of the first service. Optionally, the key update request includes indication information x, used to indicate that the first terminal device requests to update the encryption key corresponding to the first service.

In a possible implementation, before the first terminal device sends the key update request to the server, the method provided in this embodiment of this application may further include: The first terminal device receives a key update notification request from the server, where the key update notification request is used to indicate the first terminal device to update the encryption key corresponding to the first service, and the key update notification request may include the identifier of the first service. Optionally, the key update notification request may carry indication information y, used to indicate the first terminal device to update the encryption key corresponding to the first service.

According to a fifth aspect, an embodiment of this application provides a key update method. The method includes: A server determines, according to a key update policy, a key update seed corresponding to a first service. The server sends the key update seed corresponding to the first service to a first terminal device.

In a possible implementation, the method may further include: The server determines, based on the key update policy, version number information corresponding to the first service. The server sends the version number information corresponding to the first service to the first terminal device.

In a possible implementation, before the server sends the key update seed corresponding to the first service to the first terminal device, the method provided in this embodiment of this application may further include: The server receives a key update request from the first terminal device, where the key update request is used to request to update an encryption key corresponding to the first service. For example, the key update request includes an identifier of the first service. Optionally, the key update request includes indication information x, used to indicate that the first terminal device requests to update the encryption key corresponding to the first service.

In a possible implementation, the method provided in this embodiment of this application may further include: The server receives a key update notification request from the first terminal device, where the key update notification request is used to indicate the first terminal device to update the encryption key corresponding to the first service, and the key update notification request may include the identifier of the first service. Optionally, the key update notification request may carry indication information y, used to indicate the first terminal device to update the encryption key corresponding to the first service.

According to a sixth aspect, an embodiment of this application provides a communications apparatus. The communications apparatus may be a terminal, or may be a vehicle-mounted device built in the terminal or a component (for example, a chip) of the vehicle-mounted device. The communications apparatus may include a communications unit. The communications apparatus may further include a processing unit and a storage unit. In an example, when the communications apparatus is the terminal, the communications unit may be a transceiver, the storage unit may be a memory, where the storage unit is configured to store instructions, and the processing unit may be a processor. The processing unit executes the instructions stored in the storage unit, so that the terminal implements the communications method according to any one of the first aspect or the possible implementations of the first aspect. In another example, when the communications apparatus is the component (for example, the chip) built in the terminal, the processing unit may be a processor, and the communications unit may be a communications interface. For example, the communications interface in the chip may be an input/output interface, a pin, or a circuit. The processing unit executes instructions stored in the storage unit, so that the communications apparatus implements the communications method according to any one of the first aspect or the possible implementations of the first aspect. The storage unit may be a storage unit (for example, a register or a cache) in the chip, or may be a storage unit (for example, a read-only memory or a random access memory) that is in the terminal and that is located outside the chip.

According to a seventh aspect, an embodiment of this application provides a communications apparatus. The communications apparatus may be a server, or may be a component (for example, a chip) built in the server. The communications apparatus may include a communications unit and a processing unit. Optionally, the communications apparatus may further include a storage unit. In an example, when the communications apparatus is the server, the communications unit may be a communications interface, the storage unit may be a memory, where the storage unit is configured to store instructions, or a first service and an encryption key corresponding to the first service, and the processing unit may be a processor. The processing unit executes the instructions stored in the storage unit, so that the server implements the communications method according to any one of the second aspect or the possible implementations of the second aspect. In another example, when the communications apparatus is the component (for example, the chip) built in the server, the processing unit may be a processor, and the communications unit may be a communications interface. For example, the communications interface in the chip may be an input/output interface, a pin, or a circuit. The processing unit executes instructions stored in the storage unit, so that the communications apparatus implements the communications method according to any one of the second aspect or the possible implementations of the second aspect. The storage unit may be a storage unit (for example, a register or a cache) in the chip, or may be a storage unit (for example, a read-only memory or a random access memory) that is in the server and that is located outside the chip.

According to an eighth aspect, an embodiment of this application provides a communications apparatus. The communications apparatus may be a terminal, or may be a vehicle-mounted device built in the terminal or a component (for example, a chip) of the vehicle-mounted device. The communications apparatus may include a communications unit. The communications apparatus may further include a processing unit and a storage unit. In an example, when the communications apparatus is the terminal, the communications unit may be a transceiver, the storage unit may be a memory, where the storage unit is configured to store instructions, and the processing unit may be a processor. The processing unit executes the instructions stored in the storage unit, so that the terminal implements the secure communications method according to any one of the third aspect or the possible implementations of the third aspect. In another example, when the communications apparatus is the component (for example, the chip) built in the terminal, the processing unit may be a processor, and the communications unit may be a communications interface. For example, the communications interface in the chip may be an input/output interface, a pin, or a circuit. The processing unit executes instructions stored in the storage unit, so that the communications apparatus implements the secure communications method according to any one of the third aspect or the possible implementations of the third aspect. The storage unit may be a storage unit (for example, a register or a cache) in the chip, or may be a storage unit (for example, a read-only memory or a random access memory) that is in the terminal and that is located outside the chip.

According to a ninth aspect, an embodiment of this application provides a communications apparatus. The communications apparatus may be a terminal, or may be a vehicle-mounted device in the terminal or a component (for example, a chip) applied to the vehicle-mounted device. The communications apparatus may include a communications unit. The communications apparatus may further include a processing unit and a storage unit. In an example, when the communications apparatus is the terminal, the communications unit may be a transceiver, the storage unit may be a memory, where the storage unit is configured to store instructions, and the processing unit may be a processor. The processing unit executes the instructions stored in the storage unit, so that the terminal implements the key update method according to any one of the fourth aspect or the possible implementations of the fourth aspect. In another example, when the communications apparatus is the component (for example, the chip) built in the terminal, the processing unit may be a processor, and the communications unit may be a communications interface. For example, the communications interface in the chip may be an input/output interface, a pin, or a circuit. The processing unit executes instructions stored in the storage unit, so that the communications apparatus implements the key update method according to any one of the fourth aspect or the possible implementations of the fourth aspect. The storage unit may be a storage unit (for example, a register or a cache) in the chip, or may be a storage unit (for example, a read-only memory or a random access memory) that is in the terminal and that is located outside the chip.

According to a tenth aspect, an embodiment of this application provides a communications apparatus. The communications apparatus may be a server, or may be a component (for example, a chip) built in the server. The communications apparatus may include a communications unit and a processing unit. Optionally, the communications apparatus may further include a storage unit. In an example, when the communications apparatus is the server, the communications unit may be a communications interface, the storage unit may be a memory, where the storage unit is configured to store instructions, or a first service and a key update seed corresponding to the first service, and the processing unit may be a processor. The processing unit executes the instructions stored in the storage unit, so that the server implements the key update method according to any one of the fifth aspect or the possible implementations of the fifth aspect. In another example, when the communications apparatus is the component (for example, the chip) built in the server, the processing unit may be a processor, and the communications unit may be a communications interface. For example, the communications interface in the chip may be an input/output interface, a pin, or a circuit. The processing unit executes instructions stored in the storage unit, so that the communications apparatus implements the key update method according to any one of the fifth aspect or the possible implementations of the fifth aspect. The storage unit may be a storage unit (for example, a register or a cache) in the chip, or may be a storage unit (for example, a read-only memory or a random access memory) that is in the server and that is located outside the chip.

According to an eleventh aspect, an embodiment of this application provides a computer readable storage medium. The computer readable storage medium stores a computer program or instructions. When the computer program or the instructions are run on a computer, the computer is enabled to perform the communications method according to any one of the first aspect or the possible implementations of the first aspect.

According to a twelfth aspect, an embodiment of this application provides a computer readable storage medium. The computer readable storage medium stores a computer program or instructions. When the computer program or the instructions are run on a computer, the computer is enabled to perform the communications method according to any one of the second aspect or the possible implementations of the second aspect.

According to a thirteenth aspect, an embodiment of this application provides a computer readable storage medium. The computer readable storage medium stores a computer program or instructions. When the computer program or the instructions are run on a computer, the computer is enabled to perform the secure communications method according to any one of the third aspect or the possible implementations of the third aspect.

According to a fourteenth aspect, an embodiment of this application provides a computer readable storage medium. The computer readable storage medium stores a computer program or instructions. When the computer program or the instructions are run on a computer, the computer is enabled to perform the key update method according to any one of the fourth aspect or the possible implementations of the fourth aspect.

According to a fifteenth aspect, an embodiment of this application provides a computer readable storage medium. The computer readable storage medium stores a computer program or instructions. When the computer program or the instructions are run on a computer, the computer is enabled to perform the key update method according to any one of the fifth aspect or the possible implementations of the fifth aspect.

According to a sixteenth aspect, an embodiment of this application provides a computer program product including instructions. When the instructions are run on a computer, the computer is enabled to perform the communications method according to any possible implementation of the first aspect.

According to a seventeenth aspect, an embodiment of this application provides a computer program product including instructions. When the instructions are run on a computer, the computer is enabled to perform the communications method according to any possible implementation of the second aspect.

According to an eighteenth aspect, an embodiment of this application provides a computer program product including instructions. When the instructions are run on a computer, the computer is enabled to perform the secure communications method according to any possible implementation of the third aspect.

According to a nineteenth aspect, an embodiment of this application provides a computer program product including instructions. When the instructions are run on a computer, the computer is enabled to perform the key update method according to any possible implementation of the fourth aspect.

According to a twentieth aspect, an embodiment of this application provides a computer program product including instructions. When the instructions are run on a computer, the computer is enabled to perform the key update method according to any possible implementation of the fifth aspect.

According to a twenty-first aspect, an embodiment of this application provides a communications system. The communications system includes the communications apparatus according to any one of the sixth aspect or the possible implementations of the sixth aspect and the communications apparatus according to any one of the seventh aspect or the possible implementations of the seventh aspect.

In a possible implementation, the communications system may further include the communications apparatus according to any one of the eighth aspect or the possible embodiments of the eighth aspect.

According to a twenty-second aspect, an embodiment of this application provides a communications system. The communications system includes the communications apparatus according to any one of the ninth aspect or the possible implementations of the ninth aspect and the communications apparatus according to any one of the tenth aspect or the possible implementations of the tenth aspect.

According to a twenty-third aspect, an embodiment of this application provides a communications apparatus. The communications apparatus includes a processor and a storage medium. The storage medium stores instructions, and the instructions are run by the processor, to implement the communications method according to any one of the first aspect or the possible implementations of the first aspect.

According to a twenty-fourth aspect, an embodiment of this application provides a communications apparatus. The communications apparatus includes a processor and a storage medium. The storage medium stores instructions, and the instructions are run by the processor, to implement the communications method according to any one of the second aspect or the possible implementations of the second aspect.

According to a twenty-fifth aspect, an embodiment of this application provides a communications apparatus. The communications apparatus includes a processor and a storage medium. The storage medium stores instructions, and the instructions are run by the processor, to implement the secure communications method according to any one of the third aspect or the possible implementations of the third aspect.

According to a twenty-sixth aspect, an embodiment of this application provides a communications apparatus. The communications apparatus includes a processor and a storage medium. The storage medium stores instructions, and the instructions are run by the processor, to implement the key update method according to any one of the fourth aspect or the possible implementations of the fourth aspect.

According to a twenty-seventh aspect, an embodiment of this application provides a communications apparatus. The communications apparatus includes a processor and a storage medium. The storage medium stores instructions, and the instructions are run by the processor, to implement the key update method according to any one of the fifth aspect or the possible implementations of the fifth aspect.

According to a twenty-eighth aspect, an embodiment of this application provides a communications apparatus. The communications apparatus includes at least one processor. The at least one processor is coupled to a memory, the memory stores a computer program or instructions, and the at least one processor runs the computer program or the instructions stored in the memory, to implement the communications method according to any one of the first aspect or the possible implementations of the first aspect.

According to a twenty-ninth aspect, an embodiment of this application provides a communications apparatus. The communications apparatus includes at least one processor. The at least one processor is coupled to a memory, the memory stores a computer program or instructions, and the at least one processor runs the computer program or the instructions stored in the memory, to implement the communications method according to any one of the second aspect or the possible implementations of the second aspect.

According to a thirtieth aspect, an embodiment of this application provides a communications apparatus. The communications apparatus includes at least one processor. The at least one processor is coupled to a memory, the memory stores a computer program or instructions, and the at least one processor runs the computer program or the instructions stored in the memory, to implement the secure communications method according to any one of the third aspect or the possible implementations of the third aspect.

According to a thirty-first aspect, an embodiment of this application provides a communications apparatus. The communications apparatus includes at least one processor. The at least one processor is coupled to a memory, the memory stores a computer program or instructions, and the at least one processor runs the computer program or the instructions stored in the memory, to implement the key update method according to any one of the fourth aspect or the possible implementations of the fourth aspect.

According to a thirty-second aspect, an embodiment of this application provides a communications apparatus. The communications apparatus includes at least one processor. The at least one processor is coupled to a memory, the memory stores a computer program or instructions, and the at least one processor runs the computer program or the instructions stored in the memory, to implement the key update method according to any one of the fifth aspect or the possible implementations of the fifth aspect.

In an optional implementation, the communications apparatuses according to the twenty-eighth aspect to the thirty-second aspect each may further include a communications interface.

It should be understood that the memories according to the twenty-eighth aspect to the thirty-second aspect each may be located inside the communications apparatus, or may be located outside the communications apparatus. This is not limited in this embodiment of this application.

It should be noted that when the communications apparatus according to each of the foregoing aspects is applied to a terminal or a server, the communications apparatus may be a chip, a chip system, or a circuit system.

According to a thirty-third aspect, an embodiment of this application provides a communications apparatus. The communications apparatus includes one or more modules, configured to implement the method according to any one of the first aspect, the second aspect, the third aspect, the fourth aspect, or the fifth aspect; and the one or more modules may correspond to steps in the method according to any one of the first aspect, the second aspect, the third aspect, the fourth aspect, or the fifth aspect.

According to a thirty-fourth aspect, an embodiment of this application provides a chip. The chip includes a processor and a communications interface. The communications interface is coupled to the processor, and the processor is configured to run a computer program or instructions, to implement the communications method according to any one of the first aspect or the possible implementations of the first aspect. The communications interface is configured to communicate with another module outside the chip.

According to a thirty-fifth aspect, an embodiment of this application provides a chip. The chip includes a processor and a communications interface. The communications interface is coupled to the processor, and the processor is configured to run a computer program or instructions, to implement the communications method according to any one of the second aspect or the possible implementations of the second aspect. The communications interface is configured to communicate with another module outside the chip.

According to a thirty-sixth aspect, an embodiment of this application provides a chip. The chip includes a processor and a communications interface. The communications interface is coupled to the processor, and the processor is configured to run a computer program or instructions, to implement the secure communications method according to any one of the third aspect or the possible implementations of the third aspect. The communications interface is configured to communicate with another module outside the chip.

According to a thirty-seventh aspect, an embodiment of this application provides a chip. The chip includes a processor and a communications interface. The communications interface is coupled to the processor, and the processor is configured to run a computer program or instructions, to implement the key update method according to any one of the fourth aspect or the possible implementations of the fourth aspect. The communications interface is configured to communicate with another module outside the chip.

According to a thirty-eighth aspect, an embodiment of this application provides a chip. The chip includes a processor and a communications interface. The communications interface is coupled to the processor, and the processor is configured to run a computer program or instructions, to implement the key update method according to any one of the fifth aspect or the possible implementations of the fifth aspect. The communications interface is configured to communicate with another module outside the chip.

Specifically, the chip provided in the embodiments of this application further includes a memory, configured to store the computer program or the instructions.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

BRIEF DESCRIPTION OF DRAWINGS

FIG. 7A and FIG. 7B are a schematic interaction diagram of still another communications method according to an embodiment of this application;

FIG. 13A and FIG. 13B are a schematic diagram 5 of a specific embodiment of a secure communications method according to an embodiment of this application;

DESCRIPTION OF EMBODIMENTS

Figure 1:
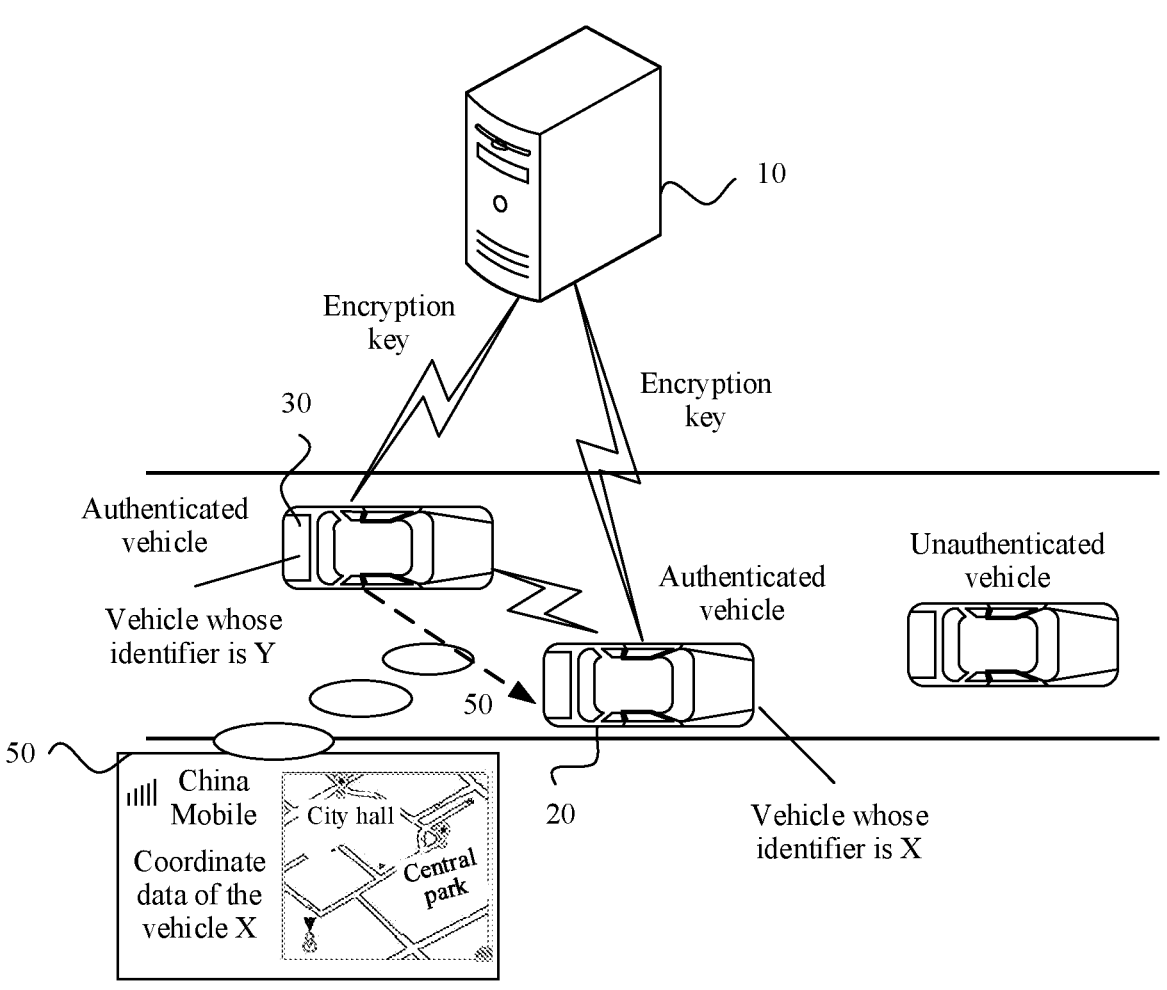
FIG. 1 is an architectural diagram of a communications system according to an embodiment of this application.

Before the embodiments of this application are described, related terms in the embodiments of this application are explained as follows:

(1) Metric value (which may also be referred to as integrity measurement (integrity measurement)): The metric value is obtained by a client (for example, a terminal device) by performing trusted measurement. The trusted measurement includes: A server side (for example, a server) performs integrity verification on a running environment and a key application program that used by the client (for example, a terminal). The client calculates hash values for the current running environment (for example, kernel code, a module, and a service) and the key application program (for example, an application program that uses a broadcast key) to form a hash chain. The metric value may include a value of the hash chain. The server side queries and compares standard metric values that are consistent with the running environment and the application program that are used by the client. An implementation of the trusted measurement is using a remote attestation protocol of a trusted computing group (TCG) standard, or using other lightweight runtime integrity measurement (RIM).

The hash chain means that a plurality of different hash values are combined, and then hash calculation is performed.

(2) Standard metric value: The standard metric value includes an integrity value (for example, an MD5 value of operating system code) that is used in a main running environment (for example, an operating system version in which an autonomous driving program runs) of the terminal and that is preconfigured based on an identifier of the terminal (for example, a vehicle) or an identifier of a vehicle-mounted communications module.

To clearly describe the technical solutions in the embodiments of this application, terms such as "first" and "second" are used in the embodiments of this application to distinguish between same items or similar items that have basically same functions and purposes. For example, a first terminal device and a second terminal device are merely intended to distinguish between different terminal devices, and are not intended to limit a sequence thereof. A person skilled in the art may understand that the terms such as "first" and "second" do not intend to limit a quantity or an execution sequence, and the terms such as "first" and "second" do not indicate a definite difference.

It should be noted that in this application, the term such as "example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "I" usually indicates an "or" relationship between the associated objects. "At least one of the following" or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems. In the embodiments of this application, an example in which a provided method is applied to a new radio (NR) system or a 5th generation (5G) network is used for description.

FIG. 1 shows a communications system according to an embodiment of this application. The communications system includes a server 10, a terminal 20, and a plurality of other terminals 30. In FIG. 1, for example, the terminal 20 and the plurality of other terminals 30 are vehicles.

The server 10 may manage one or more encryption keys corresponding to one or more services (for example, a first service) deployed on the server 10, and verify whether the terminal 20 and the plurality of other terminals 30 have permission to obtain the one or more encryption keys corresponding to the one or more services. For example, the server 10 may be a V2V application server or a V2X application server.

That the server 10 manages one or more services deployed on the server 10 may mean that the server 10 generates the one or more encryption keys corresponding to the one or more services, the server 10 updates the one or more encryption keys corresponding to the one or more services, or the server deletes the one or more encryption keys corresponding to the one or more services. This is not limited in this embodiment of this application.

In a possible implementation, the server 10 in this embodiment of this application includes at least a key management module and a verification service module. The key management module is configured to manage the one or more encryption keys corresponding to the one or more services (for example, the first service) deployed on the server 10. The verification service module is configured to verify, based on an identifier of the terminal 20, whether the terminal 20 has permission to obtain the one or more encryption keys corresponding to the one or more services.

In this embodiment of this application, the terminal 20 and some of the plurality of other terminals 30 may request the server 10 to generate an encryption key corresponding to the first service, and obtain, from the server 10, the encryption key corresponding to the first service. Then, the terminal 20 may encrypt, by using the obtained encryption key, first information sent to the another terminal 30. This is not limited in this embodiment of this application.

In this embodiment of this application, there is a communication connection (for example, a secure connection (which may also be referred to as a secure channel)) between the server 10 and the terminal 20 or between the server 10 and each of the plurality of terminals 20. The secure connection is used for secure communication between the server 10 and the terminal 20 or between the server 10 and the another terminal 30. For example, the secure connection may be established by performing two-way authentication between the server 10 and the terminal 20 or between the server 10 and the another terminal 30 by using the transport layer security (TLS) protocol/secure sockets layer (SSL) protocol.

In this embodiment of this application, a V2X server in a management area into which the terminal is about to move is used as the server. Optionally, the server is deployed on a road-side unit RSU.

In this embodiment of this application, there is a first communications interface between the terminal 20 and each of the plurality of other terminals 30. The first communications interface supports communication between the terminal 20 and each of the plurality of other terminals 30. For example, the first communications interface may be a PC5 interface, and use a dedicated frequency band (for example, 5.9 gigahertz (GHz)) for an internet of vehicles. The PC5 interface is usually used in a vehicle-to-everything (V2X) communication scenario or a device-to-device (D2D) scenario in which direct communication can be performed between devices.

The V2X refers to interconnection between a vehicle and the outside, and is a basic and key technology for a future smart vehicle, autonomous driving, and an intelligent transportation system. In the V2X, a specific application requirement of the V2X is optimized based on an existing D2D technology, to further reduce an access delay of a V2X device and resolve a resource conflict problem.

The V2X specifically further includes several application requirements such as vehicle-to-vehicle (V2V), vehicle-to-infrastructure (V2I), vehicle-to-pedestrian (V2P) direct communication, and vehicle-to-network (V2N) communication. As shown in FIG. 1, V2V refers to communication between vehicles, V2P refers to communication between a vehicle and a person (including a pedestrian, a cyclist, a driver, a passenger, or the like), and V2I refers to communication between a vehicle and a network device. The network device is, for example, a road-side unit (RSU). In addition, V2N may be included in the V2I, and the V2N refers to communication between a vehicle and a base station/network. The RSU may further provide various types of service information and data network access for each terminal in the system. For example, the terminal is a vehicle. For example, the RSU may further provide functions such as electronic toll collection and in-vehicle infotainment for each terminal in the system. This greatly improves traffic intelligence.

The V2P may be used for safety warning for a pedestrian or a non-motor vehicle on a road. A vehicle may communicate, through the V2I, with a road or even another infrastructure such as a traffic light or a road barrier, to obtain road management information such as a traffic light signal time sequence. The V2V may be used for information exchange and reminding between vehicles, and a most typical application is a safety system for anti-collision between vehicles. The V2N is currently a most widely used form of the internet of vehicles, and a main function of the V2N is to enable a vehicle to connect to a cloud server through a mobile network, and use application functions such as navigation, entertainment, and anti-theft provided by the cloud server.

The terminal may be a terminal device including a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function, or a processing device connected to a wireless modem. The terminal device may communicate with a core network through a radio access network (RAN), and exchange a voice or data with the RAN, or exchange a voice and data with the RAN. The terminal device may include user equipment (user equipment, UE), a wireless terminal device, a mobile terminal device, a device-to-device (D2D) communication terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, a radio frequency identification (RFID) device, a sensor, a global positioning system (GPS), or a laser scanner.

As an example instead of a limitation, in the embodiments of this application, the terminal may alternatively be a wearable device. The wearable device may also be referred to as a wearable intelligent device, an intelligent wearable device, or the like, and is a general term for wearable devices that are developed by applying a wearable technology to intelligent design of daily wear, for example, glasses, gloves, a watch, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, for example, various smart bands, smart helmets, or smart jewelry for monitoring physical signs.

However, if the various terminals described above are located on a vehicle (for example, placed in the vehicle or installed in the vehicle), the terminals may be considered as vehicle-mounted terminal devices. For example, the vehicle-mounted terminal devices are also referred to as on-board units (OBU).

A method and an apparatus that are provided in the embodiments of this application may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems, for example, a Linux operating system, a Unix operating system, an Android operating system, an iOS operating system, or a Windows operating system, that implement service processing through a process. The application layer includes applications such as a browser, an address book, word processing software, and instant messaging software. In addition, in the embodiments of this application, a specific structure of a body for performing a signal transmission method is not specially limited in the embodiments of this application, provided that the body can run a program recording code of the signal transmission method in the embodiments of this application to perform communication according to the signal transmission method in the embodiments of this application. For example, a wireless communications method in the embodiments of this application may be performed by a terminal device or a network device, or a functional module that can invoke a program and execute the program and that is in the terminal device or the network device.

In addition, aspects or features in the embodiments of this application may be implemented as a method, an apparatus, or a product that uses standard programming and/or engineering technologies. The term "product" used in this application covers a computer program that can be accessed from any computer readable component, carrier, or medium. For example, the computer readable storage medium may include but is not limited to a magnetic storage device (for example, a hard disk, a floppy disk, or a magnetic tape), an optical disc (for example, a compact disc (CD) or a digital versatile disc (DVD)), or a smart card and a flash memory device (for example, an erasable programmable read-only memory (EPROM), a card, a stick, or a key drive). In addition, various storage media described in this specification may indicate one or more devices and/or other machine readable media that are configured to store information. The "machine readable media" may include but are not limited to a wireless channel and various other media that can store, include, and/or carry instructions and/or data.

FIG. 1 shows a scenario according to an embodiment of this application. As shown in FIG. 1, for example, the terminal 20 is a vehicle whose identifier is X (vehicle X for short), the another terminal 30 is a vehicle whose identifier is Y (vehicle Y for short), and the vehicle X communicates with the vehicle Y through V2X. The vehicle X may send, on a sidelink resource, sidelink data (for example, the sidelink data may be coordinate data of the vehicle X) in a dialog box 50 to the vehicle Y located around the vehicle X. After receiving the coordinate data of the vehicle X, the vehicle Y determines a relative location between the vehicle X and the vehicle Y based on the coordinate data of the vehicle X, and senses and locates a lane and a surrounding object by using a vehicle sensor. In this way, a plurality of functions are implemented, including forward collision warning, blind spot/lane change assistance, emergency braking warning, reverse overtaking collision warning, intersection collision warning, left turn assistance, and the like. Certainly, the vehicle Y may also send coordinate data of the vehicle Y to the vehicle X. In a corresponding V2V scenario, the vehicle X or the vehicle Y needs to broadcast the coordinate data of the vehicle X or the vehicle Y at any time, to form a continuous track. However, there may be a case in which a malicious vehicle (for example, an unauthenticated vehicle in FIG. 1) or a specially forged malicious road-side listening device intentionally listens on and collects a broadcast channel of a surrounding vehicle to obtain sensitive data such as continuous coordinates. Therefore, in this case, the coordinate data, which is broadcast in V2V network, needs to be protected. The unauthenticated vehicle in FIG. 1 may be considered as a vehicle that is not registered with the server 10, or a vehicle whose metric value does not comply with a standard metric value.

The scenario shown in FIG. 1 is merely an example, and the solutions of this application are also applicable to another scenario of communication between terminals.

Before the embodiments of this application are described, the technical background in the embodiments of this application is described first.

Based on a premise that a broadcast center and each terminal (for example, a vehicle) are provided with a public key and a private key corresponding to the public key, the following provides a procedure of an encryption solution, to encrypt coordinate data:

1. Vehicle A generates a broadcast encryption key Ka. 2. Vehicle A encrypts a first message m by using the encryption key Ka, to obtain EKa(m). 3. Vehicle A obtains identifiers of a plurality of vehicles near vehicle A, and vehicle A queries public keys of the plurality of vehicles based on the identifiers of the plurality of vehicles, and generates n (where n represents a quantity of the plurality of vehicles) encrypted messages: Epk1(Ka), Epk2(Ka), Epk3(Ka), . . . , and Epkn (Ka), where each encrypted message includes EKa(m) and a broadcast key Ka encrypted by using a public key of a vehicle at a receive end. 4. Any one of the plurality of vehicles queries an identifier of the vehicle in an encrypted message packet, decrypts Ka by using a private key of the vehicle, and then decrypts EKa(m) by using Ka, to obtain the first message m.

Alternatively, in another broadcast encryption solution, improvements are usually made in aspects such as reducing a quantity of transmitted packets and a quantity of stored parameters. For example, a parameter N is disclosed in advance, a parameter M is sent, and an encryption key is restored by using the parameter N and the parameter M. Only an authorized terminal can restore the encryption key by using the received parameter M and the disclosed parameter N.

However, in the V2V scenario, an object to which vehicle A broadcasts the first message is random, and a receiving vehicle surrounding vehicle A changes at any time. Vehicle A needs to search for a proper broadcast object, and generate a corresponding broadcast message based on an identifier of the broadcast object. This requires additional communication and computing overheads, for example, for identifying a surrounding vehicle, obtaining an identifier or attribute information of the vehicle, and sending an encryption key to the surrounding vehicle. Consequently, computing and storage overheads caused by the encryption solution are extremely high.

Figure 2:
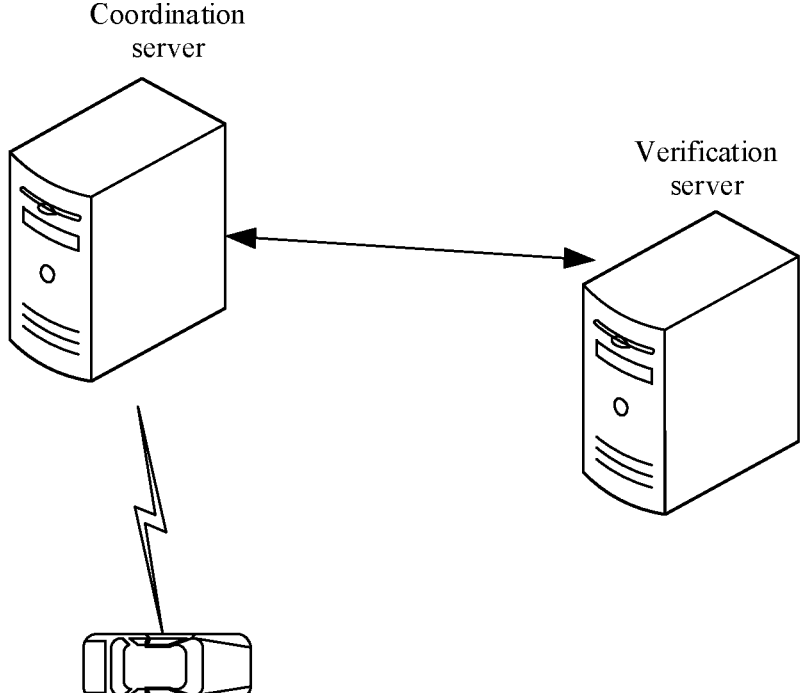
FIG. 2 is a schematic diagram of key distribution according to an embodiment of this application.

Another encryption solution is shown in FIG. 2. A coordination server assists in secure data exchange between vehicles, and the coordination server verifies security of the vehicle by using a verification server. The vehicle sends information to the coordination server, where the information includes sensor data, verification data, and a signature for the sensor information or the verification data (the signature for the sensor information or the verification data is generated by using a signature key of a trusted execution environment (TEE) of the vehicle). The coordination server verifies the verification data, and sends the sensor data to a remote vehicle after the verification succeeds. This solution is applicable to remote rescue during which information is sent to a remote rescue vehicle, and point-to-point communication in V2X, but is not applicable to an autonomous driving V2V broadcast scenario. For an autonomous driving V2V application, an original equipment manufacturer (OEM) automotive enterprise expects to minimize dependency on a communications module to avoid an increase in additional costs.

Figures 3, 4:
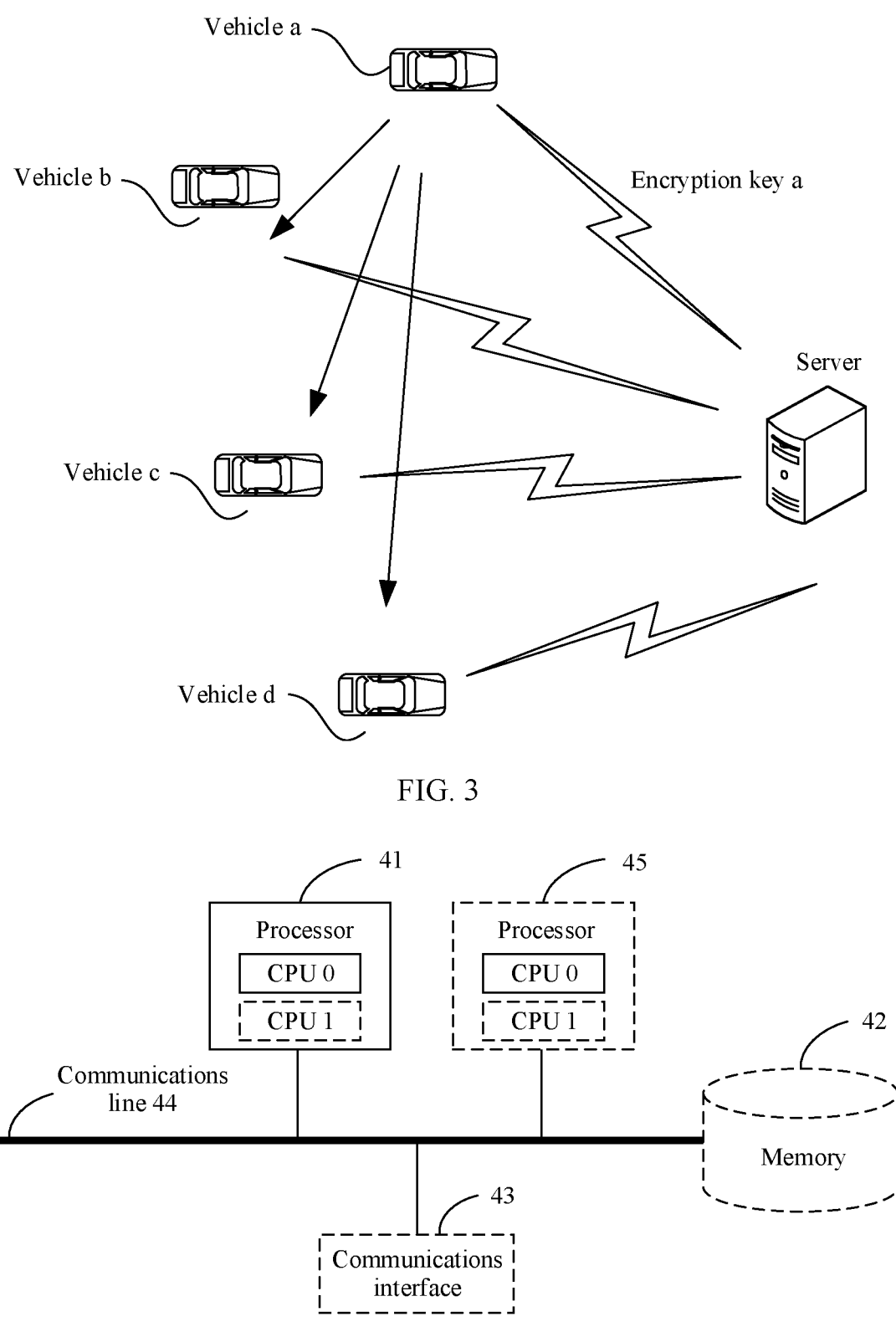
FIG. 3 is another schematic diagram of key distribution according to an embodiment of this application.
FIG. 4 is a schematic structural diagram of a communications device according to an embodiment of this application.

Still another encryption solution is shown in FIG. 3. Vehicle A initiates a registration request to a server, to obtain a communication key in a V2X scenario. The server generates a communication key a associated with vehicle A. The server stores an association relationship between the communication key a and identification information of vehicle A. The server returns the communication key a to vehicle A. Vehicle A stores the communication key a. In an application phase, vehicle A encrypts a message Q by using the communication key a, and broadcasts an encrypted message Q. After receiving the encrypted message Q, surrounding vehicles B, C, and D each query the communication key a of vehicle A from the server; and the server finds the communication key a of vehicle A from a database based on the identifier information of vehicle A, and separately returns the communication key a of vehicle A to vehicle B, vehicle C, and vehicle D. After obtaining the communication key a of vehicle A, vehicles B, C, and D can decrypt the encrypted message Q to obtain the message Q. In this solution, when one vehicle obtains encrypted messages of a plurality of different vehicles, implementation by the vehicle is complex, and overheads are high; and when there are dense vehicles, storage and computing overheads are high.

FIG. 4 is a schematic structural diagram of a communications device according to an embodiment of this application. For structures of a first terminal device and a server in this embodiment of this application, refer to a structure of the communications device shown in FIG. 4. The communications device includes a processor 41, a communications line 44, and at least one communications interface (descriptions are provided merely by using an example in which the communications device includes a communications interface 43 in FIG. 4).

Optionally, the communications device may further include a memory 42.

The processor 41 may be a general-purpose central processing unit (CPU), a microprocessor, an application-specific integrated circuit (ASIC), or one or more integrated circuits configured to control program execution of the solutions of this application.

The communications line 44 may include a channel for transmitting information between the foregoing components.

The communications interface 43 is configured to exchange information with another apparatus. For example, the communications interface 43 is any apparatus such as a transceiver, and is configured to communicate with another device or a communications network such as the Ethernet, a radio access network (RAN), or a wireless local area network (WLAN).

The memory 42 may be a read-only memory (ROM) or another type of static storage device that can store static information and an instruction, or a random access memory (random access memory, RAM) or another type of dynamic storage device that can store information and an instruction. The memory 42 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory may exist independently, and is connected to the processor through the communications line 44. Alternatively, the memory may be integrated into the processor.

The memory 42 is configured to store computer execution instructions for performing the solutions of this application, and the processor 41 controls execution of the computer execution instructions. The processor 41 is configured to execute the computer execution instructions stored in the memory 42, to implement a communications method provided in the following embodiments of this application.

Optionally, the computer execution instructions in this embodiment of this application may also be referred to as application program code. This is not specifically limited in this embodiment of this application.

In a specific implementation, in an embodiment, the processor 41 may include one or more CPUs, for example, a CPU 0 and a CPU 1 in FIG. 4.

In a specific implementation, in an embodiment, the communications device may include a plurality of processors, for example, the processor 41 and a processor 45 in FIG. 4. Each of the processors may be a single-core processor (single-CPU) or a multi-core processor (multi-CPU). The processor herein may be one or more devices, circuits, and/or processing cores configured to process data (for example, computer program instructions).

In the embodiments of this application, a specific structure of a body for performing a communications method is not specially limited in the embodiments of this application, provided that the body can run a program recording code of the communications method in the embodiments of this application to perform communication according to the communications method in the embodiments of this application. The following embodiments are described by using examples in which a communications method is performed by a first terminal device, a second terminal device, and a server.

It should be noted that mutual reference may be made between the embodiments of this application. For example, for same or similar steps, mutual reference may be made between the method embodiments, the apparatus embodiments, or the system embodiments. This is not limited herein.

Figure 5:
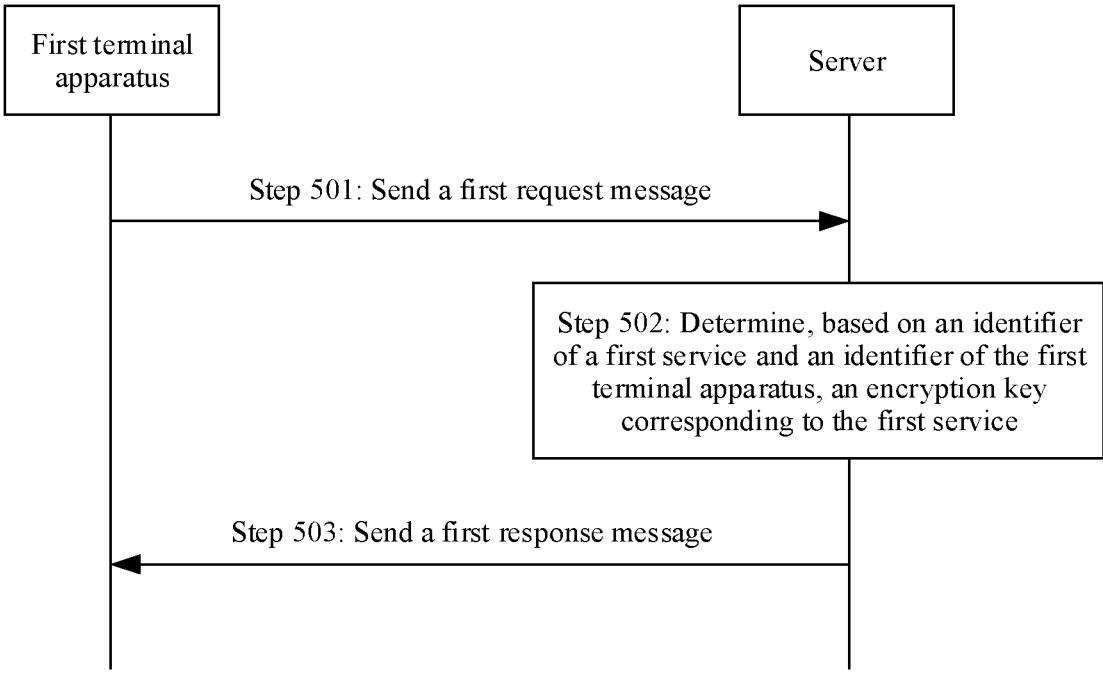
FIG. 5 is a schematic interaction diagram of a communications method according to an embodiment of this application.

With reference to FIG. 1, FIG. 5 shows an interaction embodiment of a communications method according to an embodiment of this application. The method includes the following steps.

Step 501: A first terminal device sends a first request message to a server 10, and correspondingly, the server 10 receives the first request message from the first terminal device. The first request message is used to request the server 10 to allocate an encryption key corresponding to a first service, and the first request message includes an identifier of the first service and an identifier of the first terminal device.

With reference to FIG. 1, for example, the first terminal device may be the terminal 20 or a component (for example, a circuit system in the terminal) that is disposed in the terminal 20 and that can implement a processing function or a communication function of the terminal 20. For example, the first terminal device may be a vehicle, and the vehicle has a communication function. Alternatively, the first terminal device may be a processing apparatus in a vehicle. The processing apparatus may communicate with the server 20 or a second terminal device by using an interface circuit (for example, a circuit that communicates with the outside) of the vehicle. For example, the interface circuit may be a telematics box (T-BOX). Alternatively, the first terminal device may be a vehicle-mounted device. For example, the vehicle-mounted device may be a telematics box (T-BOX). Alternatively, the first terminal device may be a chip in a T-BOX. In this case, the first terminal device may send a first message, a first request message, a second request message, or the like to an antenna of the chip by using an interface circuit, so that the antenna sends the first message, the first request message, or the second request message. For example, the T-BOX may include a cellular network communications module, a V2X communications module, and a processor. The cellular network communications module may be a communications module in a 2G, 3G, 4G, or 5G network. The V2X communications module may be LTE-V2X or 5G-V2X. In an embodiment, the T-BOX further includes a global navigation satellite system (GNSS) and a dead reckoning (DR) communications module. The T-BOX further communicates with a base station through V2N, and communicates with the server and the second terminal device by using the base station.

Certainly, the server in this embodiment of this application may alternatively be a chip or a component that is applied to the server 10 and that can implement a server function. This is not limited in this embodiment of this application.

It should be understood that the first service may be deployed on the server 10, or although the first service is not deployed on the server 10, the server 10 may manage the encryption key corresponding to the first service.

In a possible implementation, the first request message provided in this embodiment of this application includes indication information a, and the indication information a is used to request the server 10 to allocate the encryption key corresponding to the first service.

For example, the identifier of the first terminal device is used to identify the first terminal device. For example, the first terminal device is a vehicle. The identifier of the first terminal device may be a vehicle identifier or an identifier of a vehicle-mounted terminal device. The identifier of the first service is used to identify the first service.

Step 502: The server 10 determines, based on the identifier of the first service and the identifier of the first terminal device, the encryption key corresponding to the first service. For example, the encryption key is determined based on the identifier of the first service.

Step 503: The server 10 sends a first response message to the first terminal device, and correspondingly, the first terminal device receives the first response message from the server 10.

Specifically, step 503 in this embodiment of this application may be implemented in the following manner: The server 10 transmits the encryption key corresponding to the first service after encrypting the encryption key by using a session key negotiated between the server 10 and the first terminal device, or transmits, through a secure connection established between the server 10 and the first terminal device, the encryption key corresponding to the first service to the first terminal device.

The first response message includes the encryption key corresponding to the first service. For example, the first response message includes the identifier of the first service and the encryption key. Alternatively, the first response message includes the encryption key. This is not limited in this embodiment of this application. That the encryption key corresponds to the first service may be understood as follows: The identifier of the first service or the first service is associated with the encryption key.

In this embodiment of this application, different services may correspond to different encryption keys, a service may correspond to an application scenario, and different services may correspond to different application scenarios. If the service a corresponds to a lane-level assisted driving scenario, and an encryption key a is determined based on an identifier of the service a, one or more terminal devices that use the service a all use the same encryption key a. If another service b corresponds to a fleet cruising driving scenario, and an identifier of the service b is different from the identifier of the service a, the encryption key a corresponding to the service a is different from an encryption key b corresponding to the service b. Different encryption keys may be configured for service scenarios or functions, and therefore flexibility is improved.

It may be understood that in this embodiment of this application, first information may be information that needs to be encrypted by the terminal device in a scenario corresponding to the first service.

An embodiment of this application provides a secure communications method. In the method, an encryption key corresponding to a first service is managed by a server. A first terminal device requests, by using a first request message, the server to allocate the encryption key corresponding to the first service, and then receives, from the server, the encryption key that corresponds to the first service and that is used to encrypt first information. In this way, sensitive data such as the first information can be encrypted by using the encryption key in a V2V lane-level assisted driving application scenario, and a process of allocating the encryption key and a process of performing secure communication by using the encryption key can be decoupled. The first terminal device obtains the encryption key from the server, so that computing and storage overheads of the first terminal device can be reduced, a process in which the first terminal device generates the encryption key through calculation can be omitted, a delay can be increased, and a requirement of lane-level assisted driving on a communication delay can be satisfied. The server allocates the encryption key, so that it is more convenient to centrally maintain and update the encryption key, load of managing the encryption key by the first terminal device is reduced, application layer control is facilitated, and promotion and use are also facilitated. In addition, a correspondence between the encryption key and the identifier of the first service may be configured for different application scenarios in V2X.

In a possible embodiment, before step 501, the method provided in this embodiment of this application may further include: The first terminal device registers the first service on the server 10 and establishes a secure connection to the server 10.

Figure 9A:
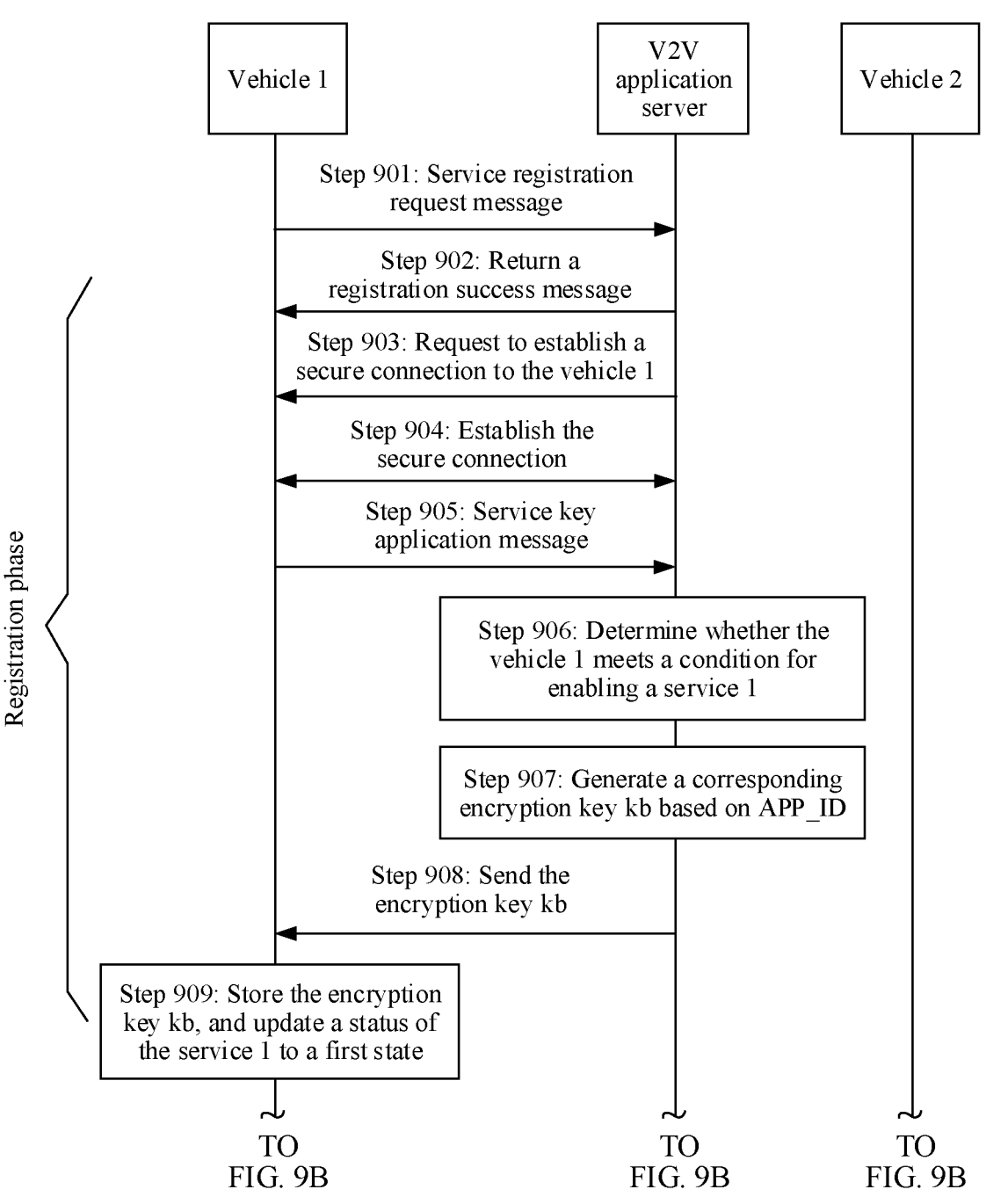
FIG. 9A and FIG. 9B are a schematic diagram 1 of a specific embodiment of a secure communications method according to an embodiment of this application.
Figure 9B:
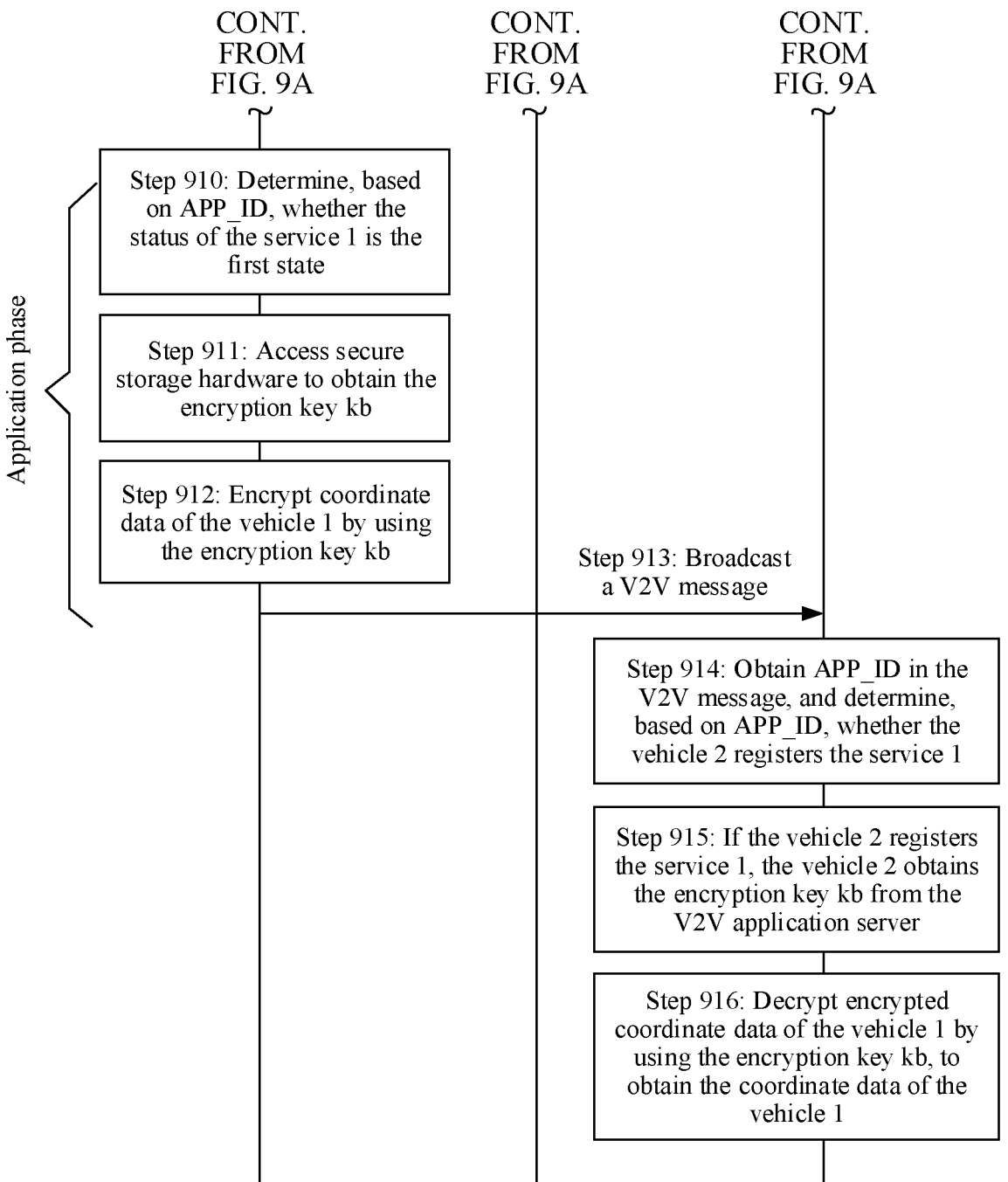

In a possible implementation, for a specific implementation in which the first terminal device registers the first service on the server 10 and establishes the secure connection to the server 10, refer to descriptions of step 901 to step 904 in FIG. 9A and FIG. 9B. Details are not described herein.

In a possible embodiment, the method provided in this embodiment of this application may further include: The server 10 determines an authorization code corresponding to the encryption key. The server 10 sends the authorization code corresponding to the encryption key to the first terminal device. Correspondingly, the first terminal device receives, from the server 10, the authorization code corresponding to the encryption key.

For example, the authorization code in this embodiment of this application is determined based on one or more of the identifier of the first terminal device and a metric value of the first terminal device.

In an example, the authorization code corresponding to the encryption key in this embodiment of this application is determined based on the identifier of the first terminal device. For example, the server 10 or a key management apparatus generates, based on the identifier of the first terminal device and a KDF, the authorization code corresponding to the encryption key.

When the key management apparatus generates the authorization code, the server 10 may obtain, from the key management apparatus in the following Manner a or Manner b, the authorization code corresponding to the encryption key.

Manner a: The server 10 requests the authorization code from the key management apparatus based on the identifier of the first terminal device, to obtain the authorization code. Manner b: After generating the authorization code, the key management apparatus configures an authorization code mapping relationship between the authorization code and the identifier of the first terminal device on the server 10. Subsequently, the server 10 obtains the authorization code based on the identifier of the first terminal device by querying the authorization code mapping relationship.

For example, Auth_code=KDF (V_ID). The authorization code (Auth_code) corresponding to the encryption key may be considered as a password for accessing or obtaining the encryption key. Herein, Auth_code represents the authorization code, the KDF represents a key derivation function, and V_ID represents the identifier of the first terminal device.

In another example, when the server 10 has the metric value of the first terminal device, if the first terminal device is authorized, the authorization code corresponding to the encryption key in this embodiment of this application is determined based on the metric value of the first terminal device. For example, the server 10 or a key management apparatus generates, based on the metric value of the first terminal device and a KDF, the authorization code corresponding to the encryption key. When the key management apparatus generates the authorization code, for a manner in which the server 10 obtains the authorization code corresponding to the encryption key, reference is made to descriptions of the foregoing Manner a or Manner b.

In still another example, when the server 10 has the metric value of the first terminal device, if the server 10 determines, based on the metric value of the first terminal device, that the first terminal device is authorized, the authorization code corresponding to the encryption key in this embodiment of this application may also be determined based on the metric value of the first terminal device and the identifier of the first terminal device. For example, the server 10 or a key management apparatus generates, based on a KDF, the metric value of the first terminal device, and the identifier of the first terminal device, the authorization code corresponding to the encryption key. For example, Auth_code=KDF (metric value, V_ID).

In a possible implementation, the server 10 may send, by using the first response message, the authorization code corresponding to the encryption key to the first terminal device, to reduce signaling overheads between the server 10 and the first terminal device. Certainly, the authorization code corresponding to the encryption key and the encryption key corresponding to the first service may be carried in different messages. This is not limited in this embodiment of this application.

It should be noted that in this embodiment of this application, a KDF for generating the encryption key may be the same as or different from a KDF for generating the authorization code. This is not limited in this embodiment of this application.

In this embodiment of this application, in addition to the identifier of the first terminal device and the identifier of the first service, the first request message may carry another parameter (for example, one or more of the metric value of the first terminal device and location information of the first terminal device), to improve security of the encryption key. Because content of the first request messages is different, processes in which the server determines the encryption key based on the first request messages are different. Therefore, descriptions are separately provided below.

Example 1: The first request message may further carry the metric value of the first terminal device. The metric value is used to verify whether the first terminal device is authorized.

Step 502 in this embodiment of this application may be implemented in the following manner: When determining, based on the metric value, that the first terminal device is authorized, the server 10 determines, based on the identifier of the first service and the identifier of the first terminal device, the encryption key corresponding to the first service.

For example, if the metric value of the first terminal device is the same as a standard metric value or the metric value of the first terminal device exists in a standard metric list, the server determines that the first terminal device is authorized. That the first terminal device is authorized means that the first terminal device may be successfully verified by the server 10, and therefore is qualified to obtain, from the server 10, the encryption key corresponding to the first service. The standard metric list in this embodiment of this application may include one or more standard metric values.

It should be understood that the standard metric value or the standard metric list may be configured on the server 10.

For example, the standard metric value is a. If the metric value of the first terminal device is also a, it indicates that the first terminal device is authorized. Alternatively, if the standard metric list includes a, b, c, and d, the server 10 may determine that the first terminal device is authorized.

Certainly, when the standard metric value is a range value, if the metric value of the first terminal device falls within the range of the standard metric value, it indicates that the first terminal device is authorized. If the metric value of the first terminal device is beyond the range of the standard metric value, it indicates that the first terminal device is unauthorized.

If the metric value of the first terminal device is different from a standard metric value or the metric value of the first terminal device does not exist in a standard metric list, the server determines that the first terminal device is unauthorized.

With reference to the foregoing list, if the metric value of the first terminal device is e and does not exist in the standard metric list, it indicates that the first terminal device is unauthorized.

In this embodiment of this application, that the first terminal device is unauthorized means that the first terminal device fails to be verified by the server 10. In other words, the first terminal device does not complete registration and authentication on the server 10 side, or the first terminal device does not have permission to request the encryption key corresponding to the first service.

It may be understood that even if the server 10 determines, based on the metric value of the first terminal device, that the first terminal device is authorized, only when the first terminal device meets a condition for enabling the first service, the first terminal device can obtain, from the server 10, the encryption key corresponding to the first service. In other words, for an authorized terminal device successfully verified by the server 10, if the authorized terminal device does not meet the condition for enabling the first service, the server 10 may also refuse obtaining of the encryption key corresponding to the first service by the first terminal device from the server 10. Certainly, for an unauthorized terminal device that fails to be verified by the server 10, the server 10 may refuse to allocate the encryption key corresponding to the first service to the unauthorized terminal device.

It should be noted that an action of determining, based on the metric value, whether the first terminal device is authorized may be performed by the server 10, or may be performed by an action other than the server 10. When the action other than the server 10 determines whether the first terminal device is authorized, the server 10 may send the metric value of the first terminal device to the apparatus, and then the apparatus feeds back, to the server 10, a response indicating whether the first terminal device is authorized.

In this embodiment of this application, the metric value of the first terminal device may be carried in the first request message. Certainly, the metric value of the first terminal device may alternatively be independently sent to the server 10. This is not limited in this embodiment of this application.

It may be understood that when the first terminal device sends the metric value of the first terminal device to the server 10, the method provided in this embodiment of this application may further include: The first terminal device performs trusted measurement, to obtain the metric value of the first terminal device.

In this embodiment of this application, the first terminal device may actively perform the trusted measurement to obtain the metric value of the first terminal device, and send the metric value of the first terminal device to the server 10. In addition, the first terminal device may also provide the metric value of the first terminal device for the server 10 after receiving a trusted environment authentication requirement from the server 10, for example, before the first terminal device sends the first request message (for example, after the first terminal device establishes a secure connection to the server 10). For another example, after receiving the first request message from the first terminal device, the server 10 sends the trusted environment authentication requirement to the first terminal device. This is not limited in this embodiment of this application. Certainly, an occasion on which the first terminal device sends the trusted measurement may alternatively be negotiated between the first terminal device and the server 10 or predefined in a protocol (for example, the first terminal device performs the trusted measurement after or before sending the first request message to the server 10). When the occasion on which the first terminal device performs the trusted measurement is negotiated between the first terminal device and the server 10 or predefined in the protocol, the step in which the server 10 sends the trusted environment authentication requirement to the first terminal device may be omitted.

Example 2: The first request message may further include the location information of the first terminal device. Correspondingly, the encryption key is determined based on the identifier of the first service and the location information of the first terminal device. In this case, a same service corresponds to different encryption keys in different areas.

For example, the server 10 determines the encryption key based on the identifier of the first service and the location information of the first terminal device.

For example, in this embodiment of this application, the server 10 may determine the encryption key based on the identifier of the first service and the location information of the first terminal device in the following manners.

In an implementation, the server 10 sends the identifier of the first service and the location information of the first terminal device to another apparatus (for example, a key management apparatus), to request the key management apparatus to generate the encryption key based on the identifier of the first service and the location information of the first terminal device. Then, the key management apparatus sends the encryption key corresponding to the first service to the server 10.

In another implementation, the server 10 generates the encryption key based on the identifier of the first service and the location information of the first terminal device.

For example, the encryption key satisfies: kb=KDF (identifier of the first service, location tag).

Specifically, the server 10 queries, based on the location information of the first terminal device, a location tag corresponding to the first terminal device. Then, the server 10 generates, based on the identifier of the first service, the location tag, and the KDF, the encryption key corresponding to the first service. It should be noted that the location information of the first terminal is introduced to determine the encryption key corresponding to the first service, so that the encryption key corresponding to the first service can be used within a range indicated by the location tag corresponding to the location information of the first terminal. In this case, the first service may correspond to different encryption keys in different areas.

It should be noted that in this embodiment of this application, the first terminal device has a global positioning system (GPS) or a global navigation satellite system (GNSS), so that the first terminal device can report the location information of the first terminal device. The location information of the first terminal device is used to determine a location of the first terminal device. For example, the location information of the first terminal device may be coordinates in a WGS 84 or coordinates in a GCJ-02. WGS 84, World Geodetic System 1984, is a coordinate system established for use by the global positioning system GPS, namely, a global positioning system (coordinates output from the GNSS).

In a possible implementation, step 502 in this embodiment of this application may be implemented in the following manner: When the server 10 determines, based on identifier of the first terminal device, that the first terminal device meets the condition for enabling the first service, the server 10 determines, based on the identifier of the first service, the encryption key corresponding to the first service.

In an example, that the server 10 determines, based on identifier of the first terminal device, whether the first terminal device meets the condition for enabling the first service is implemented as follows: The server 10 may query a vehicle type, a version, and a main function of the first terminal device based on the identifier of the first terminal device, and determine, based on whether the function supports an autonomous driving application scenario, whether the first terminal device meets the condition for enabling the first service. For example, if the first terminal device supports the autonomous driving application scenario, the first terminal device meets the condition for enabling the first service.

For example, in this embodiment of this application, the server 10 may determine, based on the identifier of the first service in Manner 1 or Manner 2, the encryption key corresponding to the first service.

Manner 1: The server 10 generates, based on a key derivation function (KDF) and the identifier of the first service, the encryption key corresponding to the first service.

For example, the server 10 generates a nonce (nonce) based on the KDF. The server 10 generates the encryption key based on the nonce and the identifier of the first service. For example, Encryption key=KDF (APP_ID, nonce). Herein, APP_ID represents the identifier of the first service.

For example, the server 10 generates the encryption key corresponding to the first service, and establishes a correspondence between the first service and the encryption key corresponding to the first service. For example, the correspondence may exist in a form of a table. A key mapping relationship table refers to a database including one or more records, and each record includes one tuple: (APP_ID, V_ID, kb). Herein, APP_ID represents the identifier of the first service, V_ID represents the identifier of the first terminal device, and kb represents the encryption key.

Manner 2: The server 10 determines, based on the identifier of the first service and a key mapping relationship table, the encryption key corresponding to the first service.

It may be understood that when the first terminal device requests the encryption key corresponding to the first service, if the server 10 has the encryption key corresponding to the first service (for example, the server 10 stores a mapping relationship between the identifier of the first service and the encryption key), the server 10 may determine, in Manner 2, the encryption key corresponding to the first service. When the first terminal device requests the encryption key corresponding to the first service, if the server 10 does not have the encryption key corresponding to the first service, the server 10 may determine, in Manner 3, the encryption key corresponding to the first service.

It should be noted that in this embodiment of this application, the encryption key corresponding to the first service may be generated by the server 10, or may be generated by the key management apparatus and then configured on the server 10. This is not limited in this embodiment of this application. For example, the server 10 sends the identifier of the first service to the key management apparatus, to request the key management apparatus to generate the encryption key corresponding to the first service. Then, the server 10 obtains, from the key management apparatus, the encryption key corresponding to the first service.

It should be noted that if the first terminal device does not meet the condition for enabling the first service, the server 10 sends a reject request message to the first terminal device. Optionally, the reject request message may further carry a reason why the first terminal device is incapable of enabling the first service.

It should be noted that step 501 to step 503 may be applied to different scenarios. For example, step 501 to step 503 may be performed after the first terminal device requests the server 10 to generate the encryption key corresponding to the first service (this corresponds to Scenario 2). Alternatively, step 501 to step 503 represent a process in which the first terminal device requests the server 10 to generate the encryption key corresponding to the first service (this corresponds to Scenario 1). Based on this, descriptions are separately provided below.

Figure 6:
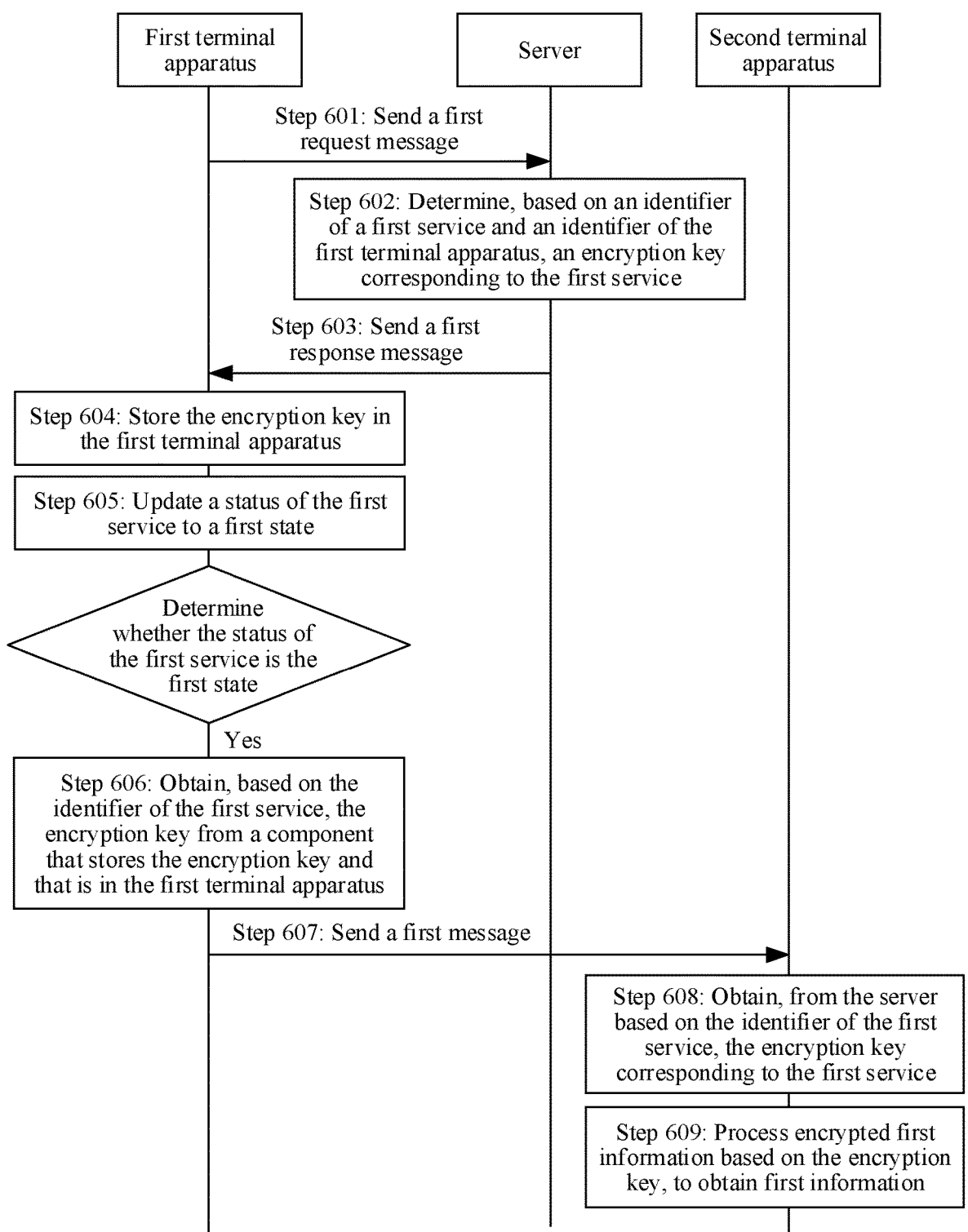
FIG. 6 is a schematic interaction diagram of another communications method according to an embodiment of this application.

Scenario 1:

FIG. 6 shows an embodiment according to an embodiment of this application. Step 601 to step 603 in this embodiment are the same as step 501 to step 503. In this embodiment, after step 603, the method may further include the following steps.

Step 604: The first terminal device stores the encryption key in the first terminal device.

To ensure storage security of the encryption key, the first terminal device may store the encryption key in a component (for example, secure storage hardware) that is configured to store the encryption key and that is in the first terminal. The secure storage hardware provides an access control mechanism to ensure that the encryption key cannot be accessed without authorization.

Step 605: The first terminal device updates a status of the first service to a first state, where the first state indicates that the first service has the corresponding encryption key.

In this embodiment of this application, the status of the first service may be the first state or a second state, and the second state indicates that the first service does not have the corresponding encryption key.

Updating a status of a service is updating a status flag by changing a flag bit of the status of the service. For example, if the first state is "1", it indicates that the first service is available, the first terminal device enables the first service, or the first service has the corresponding encryption key. If the second state may be "0", it indicates that the first service is unavailable, the first terminal device enables the first service, or the first service does not have the corresponding encryption key.

In a possible implementation, when the first terminal device needs to send first information, as shown in FIG. 6, after step 605, the method provided in this embodiment of this application may further include the following steps.

Step 606: When the status of the first service is the first state, the first terminal device obtains, based on the identifier of the first service, the encryption key from the component that stores the encryption key and that is in the first terminal device.

For example, if the first terminal device obtains an authorization code corresponding to the encryption key, step 606 in this embodiment of this application may be implemented in the following manner: When the status of the first service is the first state, the first terminal device generates a first authorization code. When the first authorization code is the same as the authorization code corresponding to the encryption key, the first terminal device obtains, based on the identifier of the first service, the encryption key from the module that stores the encryption key and that is in the first terminal device.

For example, the first terminal device may generate the first authorization code in the following manner: For example, the first terminal device generates the first authorization code based on the identifier of the first terminal device and a KDF. For another example, the first terminal device generates the first authorization code based on the identifier of the first terminal device, a metric value of the first terminal device, and a KDF. For still another example, the first terminal device generates the first authorization code based on a metric value of the first terminal device and a KDF.

It may be understood that the server 10 and the first terminal device side have a same KDF.

The authorization code is generated based on the identifier of the first terminal device; and identifiers of terminal devices are different, that is, a password for accessing the encryption key is configured for each terminal device. Therefore, security of accessing the encryption key by the first terminal device may be improved. In addition, there is no need to implement trusted measurement, so that implementation difficulty is reduced.

Step 607: The first terminal device sends a first message, where the first message includes the identifier of the first service and first information encrypted by using the encryption key.

For example, step 607 in this embodiment of this application may be implemented in the following manner: The first terminal device broadcasts the first message. In this way, one or more other terminal devices (for example, a second terminal device) within a preset distance range (for example, 1 kilometer, 500 meters, or 1.5 kilometers) of the first terminal device can receive the first message.

For example, the second terminal device may be the another terminal 30 shown in FIG. 1, or may be a chip or another component that is disposed in the another terminal 30 and that can implement a function of the terminal 20.

For example, the first information may be location information of the first terminal device. For example, the location information of the first terminal device may be coordinate data of the first terminal device. The first information may further include information about a vehicle speed, turning, lane change, parking, left turning, right turning, or the like of the first terminal device. This is not limited in this embodiment of this application.

Before step 607, the method provided in this embodiment of this application may further include: The first terminal device encrypts the first information by using the encryption key. For example, the first information may be encrypted by using a standard symmetric encryption algorithm. It is recommended that a symmetric algorithm approved by the state cryptography administration such as an SM4 algorithm or an international standard symmetric algorithm such as an AES algorithm be actually used.

The first message in this embodiment of this application may be a message for communication between any two vehicles. For example, the first message may be a basic safety message (BSM).

Step 608: The second terminal device obtains, from the server 10 based on the identifier of the first service, the encryption key corresponding to the first service.

For an implementation of step 608, refer to a process in which the first terminal device obtains, from the server 10, the encryption key corresponding to the first service. Specifically, the first terminal device that performs the process in which the first terminal device requests, from the server 10, the encryption key corresponding to the first service is replaced with the second terminal device. Details are not described below.

In a possible implementation, if the encryption key corresponds to the authorization code, the first terminal device may further send the authorization code corresponding to the encryption key to the second terminal device. In this case, in addition to an identifier of the second terminal device and the identifier of the first service, a key request message sent by the second terminal device to the server 10 may carry the authorization code corresponding to the encryption key.

In a possible implementation, if the encryption key is determined based on the identifier of the first service and the location information of the first terminal device, the first terminal device may further send a location tag corresponding to the first terminal device to the second terminal device. In this case, in addition to an identifier of the second terminal device and the identifier of the first service, a key request message sent by the second terminal device to the server 10 may carry the location tag corresponding to the first terminal device. Alternatively, in addition to an identifier of the second terminal device and the identifier of the first service, a key request message sent by the second terminal device to the server 10 may carry location information of the second terminal device. In this way, when the location information of the second terminal device indicates that the second terminal device is located within a range indicated by the location tag, the second terminal device can obtain a correct encryption key from the server 10.

Step 609: The second terminal device processes the encrypted first information based on the encryption key, to obtain the first information.

For example, the second terminal device decrypts the encrypted first information based on the encryption key, to obtain the first information.

Figure 7A:
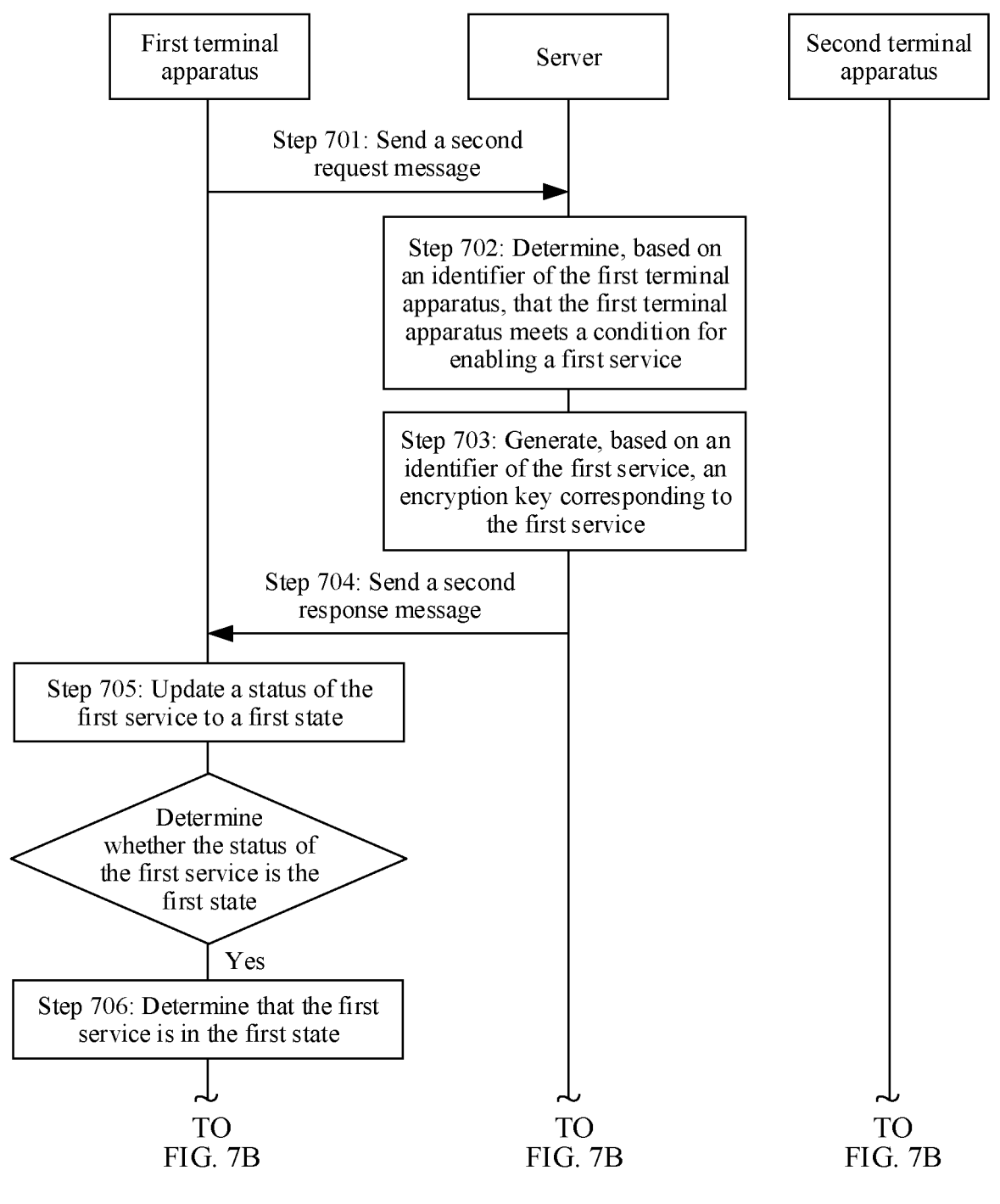

Scenario 2:

FIG. 7A and FIG. 7B show an embodiment according to an embodiment of this application. Step 707 to step 709 in this embodiment are the same as step 501 to step 503. In this embodiment, before step 707, the method may further include step 701 to step 706.

Step 701: A first terminal device sends a second request message to a server 10, and correspondingly, the server 10 receives the second request message from the first terminal device.

The second request message is used to request the server 10 to generate an encryption key corresponding to a first service, and the second request message includes an identifier of the first service and an identifier of the first terminal device.

For example, the second request message includes indication information b, and the indication information b is used to request the server to generate the encryption key corresponding to the first service.

Step 702: The server 10 determines, based on the identifier of the first terminal device, that the first terminal device meets a condition for enabling the first service.

Step 703: The server 10 generates, based on the identifier of the first service, the encryption key corresponding to the first service.

Step 704: The server 10 sends a second response message to the first terminal device, and correspondingly, the first terminal device receives the second response message from the server 10, where the second response message is used to indicate that the first service has the corresponding encryption key.

Step 705: The first terminal device updates a status of the first service to a first state based on the second response message, where the first state indicates that the first service has the corresponding encryption key.

Step 706: The first terminal device determines that the status of the first service is the first state.

In a possible embodiment, as shown in FIG. 7A and FIG. 7B, after step 709, the method provided in this embodiment of this application may further include step 710 to step 712. Step 710 to step 712: Same as step 607 to step 609. Details are not described herein again.

Figure 8:
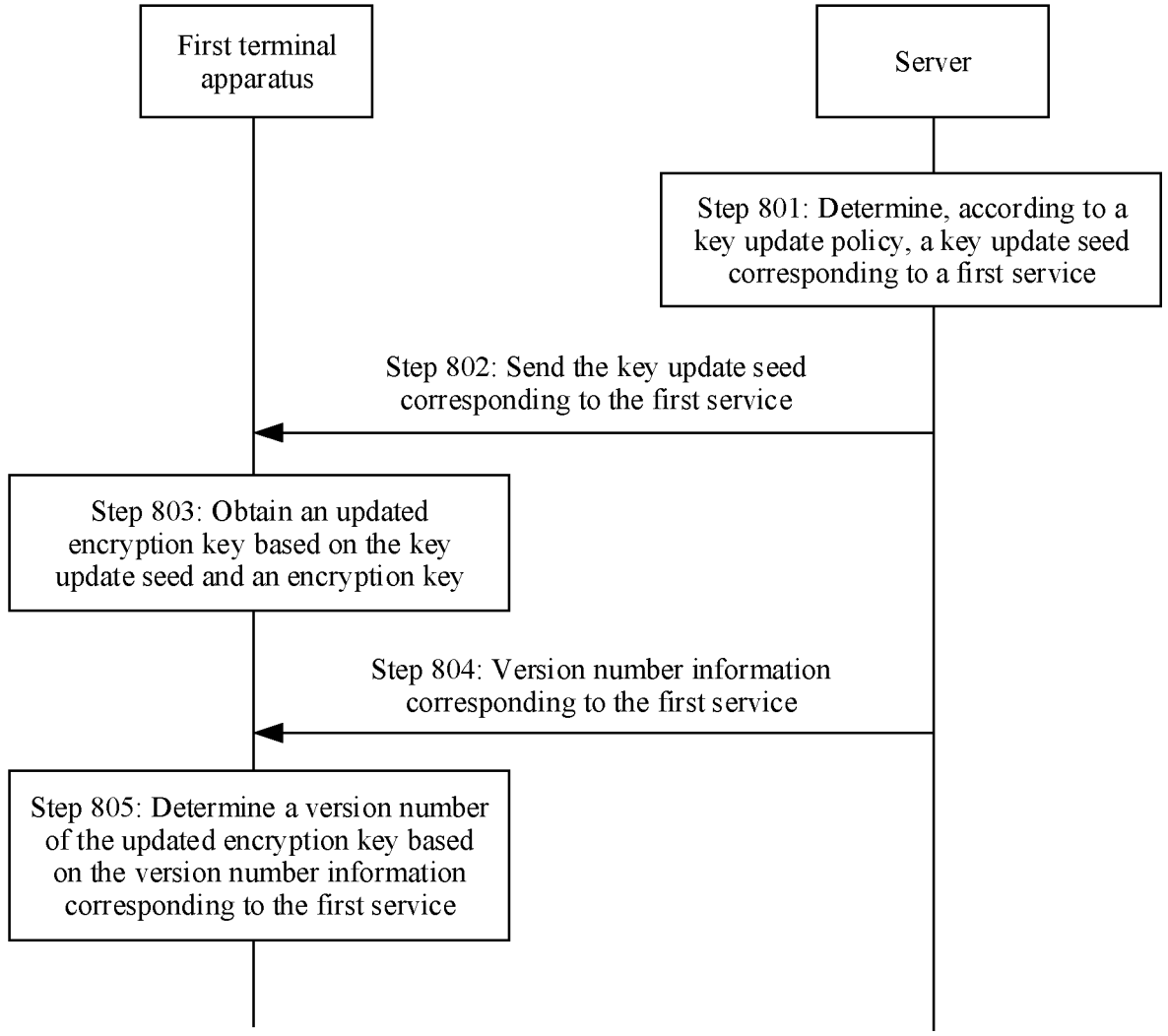
FIG. 8 is a schematic interaction diagram of a key update method according to an embodiment of this application.

The encryption key may be periodically updated, to improve security of the encryption key corresponding to the first service. Based on this, as shown in FIG. 8, an embodiment of this application provides a key update method. The method includes the following steps.

Step 801: A server 10 determines, according to a key update policy, a key update seed corresponding to a first service, where the key update seed is used to update the encryption key.

The key update policy is specifically defined based on a service, and a key update frequency may be defined based on a quantity of registered services, a registration manner of a service, and a security requirement of the service. For example, a key update period corresponding to a service a is shorter than a key update period corresponding to a service b. A security requirement of the service a is higher than a security requirement of the service b.

The key update seed may be a nonce seed, and is used for KDF input to generate a new encryption key.

Step 802: The server 10 sends the key update seed corresponding to the first service to a first terminal device, and correspondingly, the first terminal device receives, from the server 10, the key update seed corresponding to the first service.

In a possible implementation, in this embodiment of this application, the server 10 may actively send the key update seed and version number information that correspond to the first service to the first terminal device.

In a possible implementation, in this embodiment of this application, the server 10 may alternatively perform step 802 at the request of the first terminal device. Based on this, before step 802, the method provided in this embodiment of this application may further include: The first terminal device sends a key update request to the server 10. Correspondingly, the server 10 receives the key update request from the first terminal device, where the key update request is used to indicate that the first terminal device requests to update an encryption key corresponding to the first service. For example, the key update request carries an identifier of the first service. Optionally, the key update request may further carry indication information x, and the indication information x is used to indicate that the first terminal device requests to update the encryption key corresponding to the first service.

In this embodiment of this application, before the first terminal device sends the key update request to the server 10, the method may further include: The first terminal device determines to update the encryption key corresponding to the first service.

In an example, the first terminal device may determine, in the following manner, to update the encryption key corresponding to the first service: The first terminal device determines, based on a key update period corresponding to the first service, to update the encryption key corresponding to the first service.

In another example, the first terminal device may determine, in the following manner, to update the encryption key corresponding to the first service: The first terminal device receives a key update notification request from the server 10, where the key update notification request is used to indicate to update the encryption key corresponding to the first service. The first terminal device determines, based on the key update notification request, to update the encryption key corresponding to the first service.

For example, the server 10 may send the key update notification request to one or more terminal devices (including the first terminal device) based on a key update period corresponding to the encryption key. Alternatively, the server 10 may independently determine a period for sending the key update notification request to one or more terminal devices (including the first terminal device).

Step 803: The first terminal device obtains an updated encryption key based on the key update seed and the encryption key.

For example, the updated encryption key is determined based on the key update seed, the encryption key, and a KDF. For example, the updated encryption key is determined by the first terminal device. In this case, the first terminal device may determine the updated encryption key according to a formula: Updated kb=KDF (seed, kb_oldversion). Herein, kb_oldversion represents the encryption key before the update.

In a possible embodiment, as shown in FIG. 8, the method provided in this embodiment of this application may further include the following steps.

Step 804: The server 10 sends the version number information corresponding to the first service to the first terminal device, and correspondingly, the first terminal device receives, from the server 10, the version number information corresponding to the first service, where the version number information is used to determine a version number of the updated encryption key.

The version number information may be understood as a number or a version number corresponding to the encryption key, and a version number of each updated encryption key is obtained by adding n (n is an integer greater than or equal to 1) to a version number of each encryption key before the update. For example, if the version number of the encryption key before the update is v1, the version number of the updated encryption key may be v2.

Step 805: The first terminal device determines the version number of the updated encryption key based on the version number information corresponding to the first service.

In a possible implementation, when the server 10 sends, based on a request of the first terminal device, the key update seed corresponding to the first service to the first terminal device, the method provided in this embodiment of this application may further include: The first terminal device sends a metric value of the first terminal device to the server 10. Correspondingly, step 802 in this embodiment of this application may be implemented in the following manner: If the server 10 determines, based on the metric value, that the first terminal device is authorized, the server 10 determines, based on the first service, the key update seed corresponding to the first service, and then the server 10 sends the key update seed corresponding to the first service to the first terminal device.

It should be noted that in this embodiment of this application, the embodiment shown in FIG. 8 may be used in combination with any one of the embodiments shown in FIG. 5 to FIG. 7A and FIG. 7B. For example, step 801 to step 805 are performed after step 503. Certainly, when the first terminal device has the encryption key corresponding to the first service, step 801 to step 805 may alternatively be performed independently.

It should be noted that an example in which the first terminal device updates the encryption key based on the key update seed corresponding to the first service is used in the embodiment shown in FIG. 8. Certainly, the server 10 may alternatively update, based on the key update seed corresponding to the first service, the encryption key that corresponds to the first service and that is stored on the server side 10, to ensure that the encryption key that corresponds to the first service and that is on the first terminal device side is the same as the encryption key that corresponds to the first service and that is on the server side 10. In addition, if both the first terminal device and the server 10 update the encryption key corresponding to the first service, the server 10 may further send the updated encryption key to the first terminal device. A priority of the updated encryption key that corresponds to the first service and that is received by the first terminal device from the server 10 is higher than a priority of the encryption key that corresponds to the first service and that is on the first terminal device side. Alternatively, a priority of the updated encryption key that corresponds to the first service and that is received by the first terminal device from the server 10 is higher than a priority of the encryption key that corresponds to the first service and that is updated by the first terminal device.

FIG. 9A and FIG. 9B show a specific procedure of a secure communications method according to an embodiment of this application by using an example in which a first terminal device is a vehicle 1, a second terminal device is a vehicle 2, a server is a V2V application server, a first service is a service 1, and first information is coordinate data of the vehicle 1. The secure communications method includes a registration phase and an application phase. The registration phase includes step 901 to step 908. The application phase includes step 909 to step 913. The method includes the following steps.

Step 901: The vehicle 1 initiates a service registration request message to the V2V application server, and correspondingly, the V2V application server receives the service registration request message from the vehicle 1.

The service registration request message may include identity information of the vehicle 1. For example, the identity information of the vehicle 1 includes one or more pieces of the following information corresponding to the vehicle 1: a vehicle identifier, identity information of a user, or information such a registration code that needs to be provided for registration. The service registration request message is used to request to register the identity information of the vehicle 1 with the V2V application server. The registration code may be a unique identifier built in the vehicle 1.

Step 902: After verifying the identity information of the vehicle 1, the V2V application server returns a registration success message to the vehicle 1, and correspondingly, the vehicle 1 receives the registration success message from the V2V application server.

The registration success message indicates that the identity information of the vehicle 1 has been successfully registered with the V2V application server.

Step 903: The V2V application server requests to establish a secure connection (for example, a TLS connection or an SSL connection) to the vehicle 1.

For example, step 903 may be implemented in the following manner: The V2V application server sends a connection establishment request to the vehicle 1, to request to establish the secure connection to the vehicle 1.

It may be understood that step 903 may alternatively be implemented in the following manner: The vehicle 1 requests to establish a secure connection to the V2V application server, and after the V2V application server agrees to establish the secure connection, the V2V application server sends, to the vehicle 1, a response indicating that the V2V application server agrees to establish the secure connection.

Step 904: The vehicle 1 and the V2V application server perform two-way authentication by using TLS/SSL, and establish the secure connection.

The two-way authentication between the V2V application server and the vehicle 1 may be performed in a certificate manner or in a password manner. In the password manner, the vehicle 1 provides the registration code in step 901 for the V2V application server.

In an example, if the secure connection is established in the certificate manner, the vehicle 1 and the V2V application server establish the secure connection by using a standard TLS security protocol.

In another example, if the secure connection is established in the password manner, the vehicle 1 and the V2V application server negotiate a session key based on a password, and may negotiate, based on a PSK key or a DH key, a session key used for secure communication.

Step 905: The vehicle 1 sends a service key application message to the V2V application server, and correspondingly, the V2V application server receives the service key application message from the vehicle 1, where the service key application message includes APP_ID and a device ID.

Herein, APP_ID may uniquely identify the service 1, and the device ID may be an identifier that uniquely identifies the vehicle 1 or an identifier of a vehicle-mounted terminal device located on the vehicle 1. If APP_ID uniquely identifies the vehicle, the device ID may be a vehicle identifier V_ID.

Step 906: The V2V application server determines whether the vehicle 1 meets a condition for enabling the service 1.

That the V2V application server determines whether the vehicle 1 meets the condition for enabling the service 1 identified by APP_ID is implemented as follows: The V2V application server may query a vehicle type, a version, and a main function of the vehicle 1 based on the identifier of the vehicle 1, and determine, based on whether the function supports an autonomous driving application scenario, whether the vehicle meets the enabling condition.

Step 907: If the vehicle 1 meets the condition for enabling the service 1, the V2V application server generates, based on APP JD, an encryption key kb corresponding to the service 1.

In addition, after the V2V application server generates the encryption key kb, the V2V application server may store the encryption key kb, and establish a key mapping relationship table. The key mapping relationship table refers to a database including one or more records, and each record includes one tuple: (APP_ID, V_ID, kb).

The V2V application server may generate the encryption key kb by using a key derivation function (KDF). For example, the V2V application server selects or pre-configures the KDF, generates a nonce (nonce), and calculates kb, where kb=KDF (APP_ID, nonce).

It should be understood that if the vehicle 1 does not meet the condition for enabling the service 1, the V2V application server sends a reject request message to the vehicle 1. Optionally, the reject request message may further carry a reason why the vehicle 1 does not meet the condition for enabling the service 1.

Step 908: The V2V application server sends the encryption key kb to the vehicle 1, and correspondingly, the vehicle 1 receives the encryption key kb.

For example, the V2V application server sends a service key response message to the vehicle 1, where the service key response message includes the encryption key kb, or the service key response message includes APP_ID and the encryption key kb.

Specifically, step 908 in this embodiment of this application may be implemented in the following manner: The V2V application server transmits the encryption key kb after encrypting the encryption key kb by using the session key that is previously negotiated between the V2V application server and the vehicle 1, or transmits the encryption key kb to the vehicle 1 through the secure connection established between the V2V application server and the vehicle 1.

Step 909: The vehicle 1 stores the encryption key kb, and updates a status of the service 1 to a first state.

To ensure storage security of the encryption key kb, the vehicle 1 may store the encryption key kb in secure storage hardware of the vehicle 1.

In a possible embodiment, as shown in FIG. 9A and FIG. 9B, after step 909, the method provided in this embodiment of this application may further include the application phase. The application phase corresponds to step 910 to step 916.

Step 910: The vehicle 1 first determines, based on APP_ID, whether the status of the service 1 is the first state.

It may be understood that the vehicle 1 performs step 910 before the vehicle 1 determines to encrypt data by using the encryption key corresponding to the service 1.

Step 911: If the status of the service 1 is the first state, the vehicle 1 accesses the secure storage hardware to obtain the encryption key kb, and the secure storage hardware provides an access control mechanism to ensure that the encryption key cannot be accessed without authorization.

It should be noted that if the vehicle 1 determines, in the application phase, that the status of the service 1 is not the first state (for example, a second state), the vehicle 1 performs step 901 to step 908 to obtain the encryption key.

Step 912: The vehicle 1 encrypts the coordinate data of the vehicle 1 by using the encryption key kb.

For example, the coordinate data of the vehicle 1 may be encrypted by using a standard symmetric encryption algorithm. For example, the vehicle 1 may encrypt the coordinate data of the vehicle 1 by using the encryption key and a symmetric algorithm approved by the state cryptography administration such as an SM4 algorithm or an international standard symmetric algorithm such as an AES algorithm.

Step 913: The vehicle 1 broadcasts a V2V message, where the V2V message includes APP_ID and encrypted coordinate data of the vehicle 1, and correspondingly, another vehicle (for example, the vehicle 2) receives the V2V message.

Step 914: The vehicle 2 obtains APP_ID in the V2V message, and determines, based on APP_ID, whether the vehicle 2 registers the service 1.

Step 915: If the vehicle 2 registers the service 1, the vehicle 2 obtains the encryption key kb from the V2V application server.

A process in which the vehicle 2 obtains the encryption key kb from the V2V application server in step 915 may be implemented in the following manner: The vehicle 2 sends a third request message to the V2V application server, where the third request message includes an identifier of the service 1 and an identifier of the vehicle 2, and the third request message is used to request the encryption key corresponding to the first service. If the V2V application server determines, based on the identifier of the vehicle 2, that the vehicle 2 meets a condition for enabling the service 1, the V2V application server obtains, from the key mapping relationship table based on the identifier of the service 1, the encryption key kb corresponding to the service 1, and the V2V application server sends the encryption key kb to the vehicle 2.

Step 916: The vehicle 2 decrypts the encrypted coordinate data of the vehicle 1 by using the encryption key kb, to obtain the coordinate data of the vehicle 1.

It should be noted that step 911 to step 916 may be omitted if the vehicle 1 encrypts, after the registration phase, data without using the encryption key corresponding to the service 1.

Figure 10A:
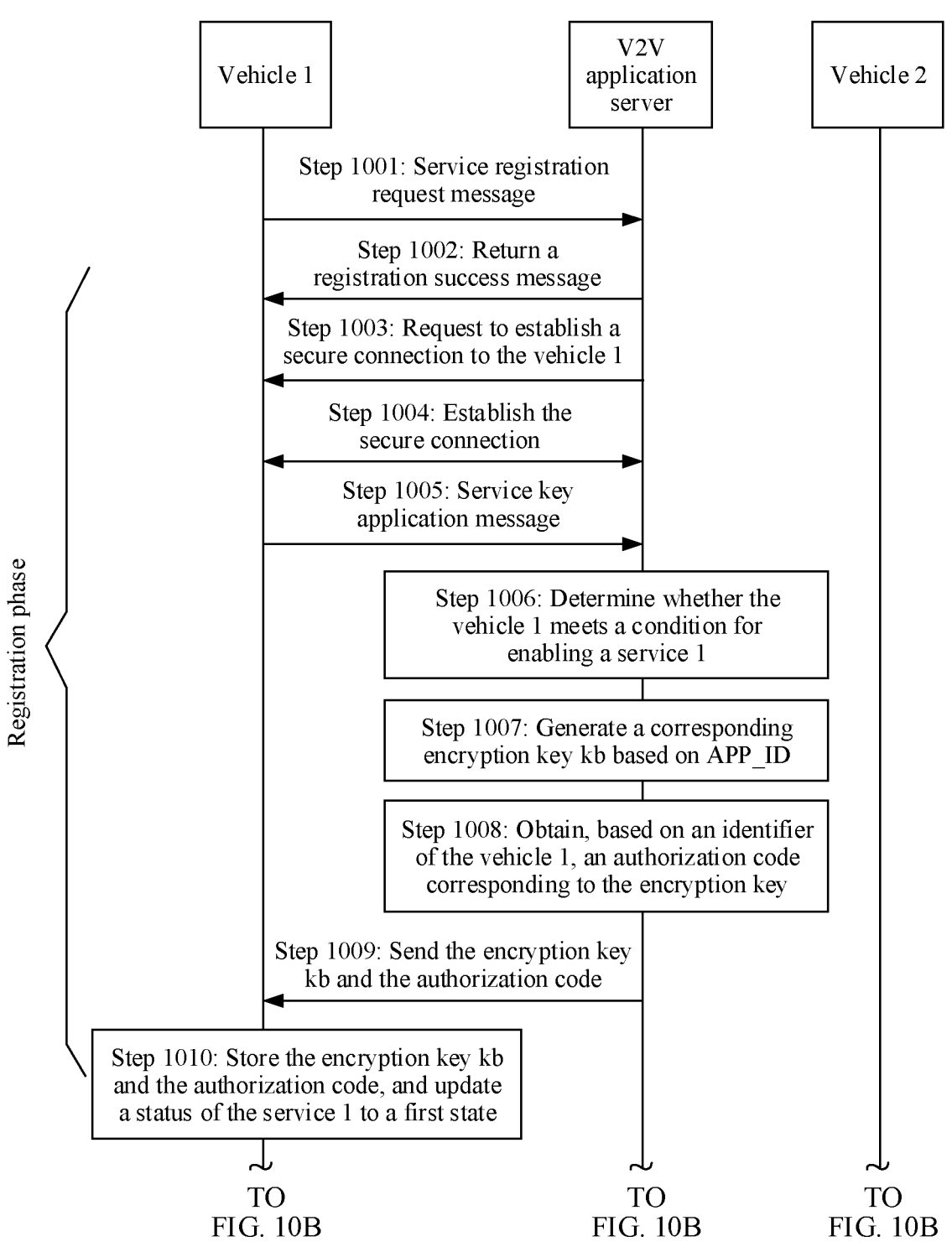
FIG. 10A and FIG. 10B are a schematic diagram 2 of a specific embodiment of a secure communications method according to an embodiment of this application.
Figure 10B:
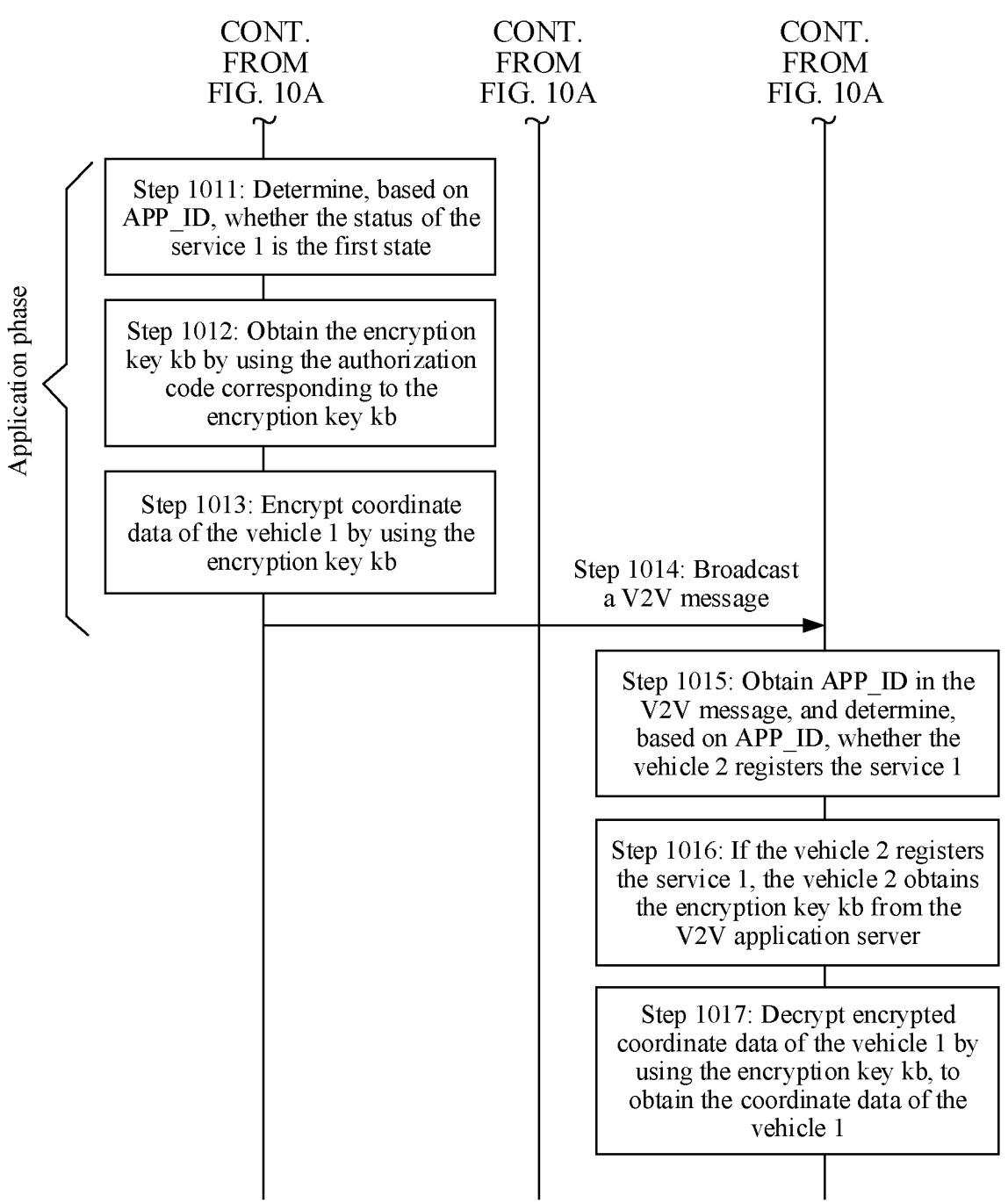

FIG. 10A and FIG. 10B show a specific procedure of another secure communications method according to an embodiment of this application. A difference between this method and the solution shown in FIG. 9A and FIG. 9B lies in that an authorization code is introduced in this embodiment shown in FIG. 10A and FIG. 10B. To be specific, in a registration phase, a process of generating the authorization code is added, and in an application phase, a vehicle 1 needs to provide a valid authorization code to obtain an encryption key kb. The specific procedure of this method is as follows:

Step 1001 to step 1007: Same as step 901 to step 907. Details are not described herein again.

Step 1008: The V2V application server obtains, based on the identifier of the vehicle 1, an authorization code (Auth_code) corresponding to the encryption key.

For example, the authorization code is determined based on the identifier of the vehicle 1.

For an implementation of step 1008 in this embodiment of this application, refer to the descriptions of step 703. Details are not described herein again.

Step 1009: The V2V application server sends the encryption key kb and the authorization code to the vehicle 1, and correspondingly, the vehicle 1 receives the encryption key kb and the authorization code.

For example, the V2V application server sends a service key response message to the vehicle 1, where the service key response message includes the encryption key kb and the authorization code. Alternatively, the encryption key kb and the authorization code are separately sent to the vehicle 1 by using different messages.

Step 1010: The vehicle 1 stores the encryption key kb and the authorization code, and updates a status of the service 1 to a first state.

It may be understood that the vehicle 1 stores a correspondence between the encryption key kb and the authorization code. Subsequently, if the vehicle 1 encrypts data by using the encryption key kb in the application phase, the vehicle 1 needs to provide an authorization code (Auth_code) corresponding to the encryption key kb to obtain the encryption key kb. If the authorization code provided by the vehicle 1 is different from the authorization code (Auth_code) corresponding to the encryption key, the vehicle 1 cannot access the encryption key.

Step 1011. Same as step 910. Details are not described herein again.

Step 1012: If the status of the service 1 is the first state, the vehicle 1 obtains the encryption key kb by using the authorization code corresponding to the encryption key kb.

Step 1013 to step 1017: Same as step 912 to step 916. Details are not described herein again.

In the embodiment shown in FIG. 10A and FIG. 10B, because the authorization code is generated based on the identifier of the vehicle, and identifiers of vehicles are different, authorization codes generated based on the identifiers of the vehicles are also different, that is, a password for accessing the encryption key is configured for each vehicle. Therefore, security of accessing the encryption key by the vehicle 1 is improved. In addition, there is no need to implement trusted measurement, so that implementation difficulty is reduced.

Figure 11A:
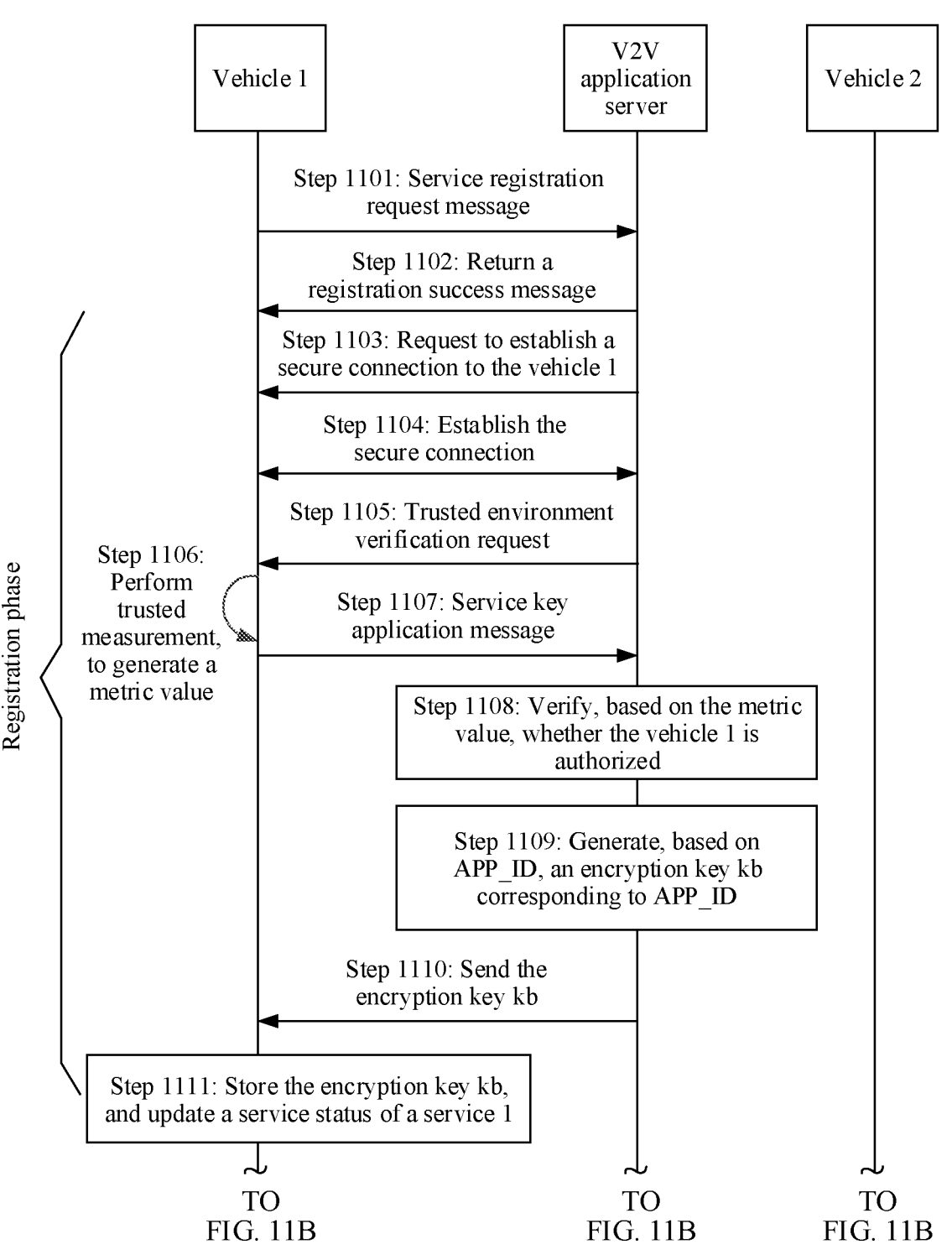
FIG. 11A and FIG. 11B are a schematic diagram 3 of a specific embodiment of a secure communications method according to an embodiment of this application.
Figure 11B:
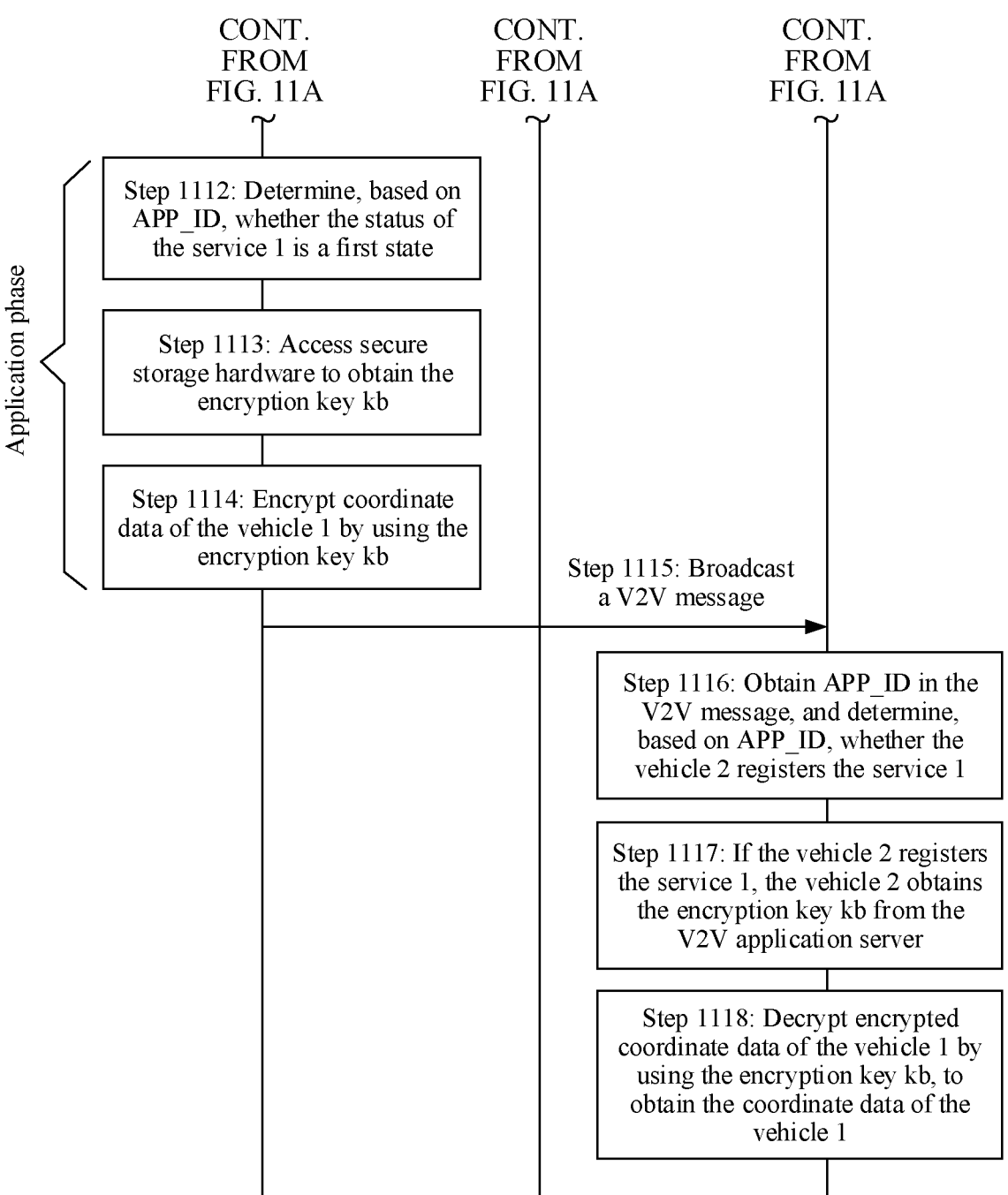

FIG. 11A and FIG. 11B show a specific procedure of another secure communications method according to an embodiment of this application. A difference between this method and the solution shown in FIG. 9A and FIG. 9B lies in that, to improve key access security, this embodiment shown in FIG. 11A and FIG. 11B further includes a process in which a vehicle 1 performs trusted measurement. To be specific, in a registration phase, a V2V application server requests to perform the trusted measurement on a vehicle-mounted communications module or the vehicle 1. If a metric value obtained after the vehicle 1 is requested to perform the trusted measurement is the same as a standard metric value, or a metric value of the first terminal device exists in a standard metric list, the vehicle 1 can obtain, from the V2V application server, an encryption key through key registration application. The specific procedure is as follows:

Step 1101 to step 1104: Same as step 901 to step 904. Details are not described herein again.

Step 1105: The V2V application server initiates a trusted environment verification request to the vehicle 1, where the trusted environment verification request is used to indicate the vehicle 1 to perform trusted measurement.

It should be noted that step 1105 may be omitted if the vehicle 1 and the V2V application server negotiate in advance or a protocol predefines that the vehicle 1 needs to perform the trusted measurement before requesting the encryption key from the V2V application server, or the trusted measurement is independently initiated by the vehicle 1. For example, the trusted environment verification request in this embodiment of this application carries indication information c, used to indicate the vehicle 1 to perform the trusted measurement.

Step 1106: The vehicle 1 performs the trusted measurement, to generate a metric value.

Step 1107: The vehicle 1 sends a service key application message to the V2V application server, and correspondingly, the V2V application server receives the service key application message from the vehicle 1, where the service key application message includes APP_ID, V_ID, and the metric value.

Step 1108: The V2V application server verifies, based on the metric value, whether the vehicle 1 is authorized.

For example, if the metric value of the first terminal device is the same as a standard metric value or the metric value exists in a standard metric list, the V2V application server determines that the vehicle 1 is authorized. If the metric value is different from a standard metric value or the metric value does not exist in a standard metric list, the V2V application server determines that the vehicle 1 is unauthorized.

Optionally, if the vehicle 1 is authorized, the V2V application server further needs to determine whether the vehicle 1 meets a condition for enabling the service 1. When the vehicle 1 meets the condition for enabling the service 1, the V2V application server 1 performs step 1109.

Step 1109: When determining, based on the metric value, that the vehicle 1 is authorized, the V2V application server generates, based on APP_ID, an encryption key kb corresponding to APP_ID.

Step 1110 to step 1118: Same as step 908 to step 916. Details are not described herein again.

In the solution described in FIG. 11A and FIG. 11B, the vehicle 1 first performs the trusted measurement, to generate the metric value of the vehicle 1. In a phase in which the vehicle 1 requests the encryption key, the vehicle 1 provides the identifier of the vehicle 1, the metric value, and the identifier of the first service for the V2V application server. Then, the V2V application server generates the encryption key after verifying, based on the metric value, that the vehicle 1 is authorized and that the vehicle 1 meets the condition for enabling the service 1. This can improve security in a V2V key configuration phase and prevent a malicious program from obtaining the encryption key without authorization.

Performing the trusted measurement by the vehicle 1 is performing integrity verification on a key component such as the service 1 (for example, an application program and a dependency library for running the application program) that accesses the encryption key. Remote verification is initiated by the V2V application server, and requires that the vehicle 1 performs the trusted measurement locally. A trusted measurement result is verified by using a whitelist mechanism (or a trusted value predefined by an application service provider), to ensure security and trustworthiness of programs such as an application program that accesses a key, a running environment, and an interface library, for example, no malicious code is injected or no other suspicious program is run. Therefore, after the remote verification succeeds, security of storing and using the key can be effectively prevented.

Figure 12A:
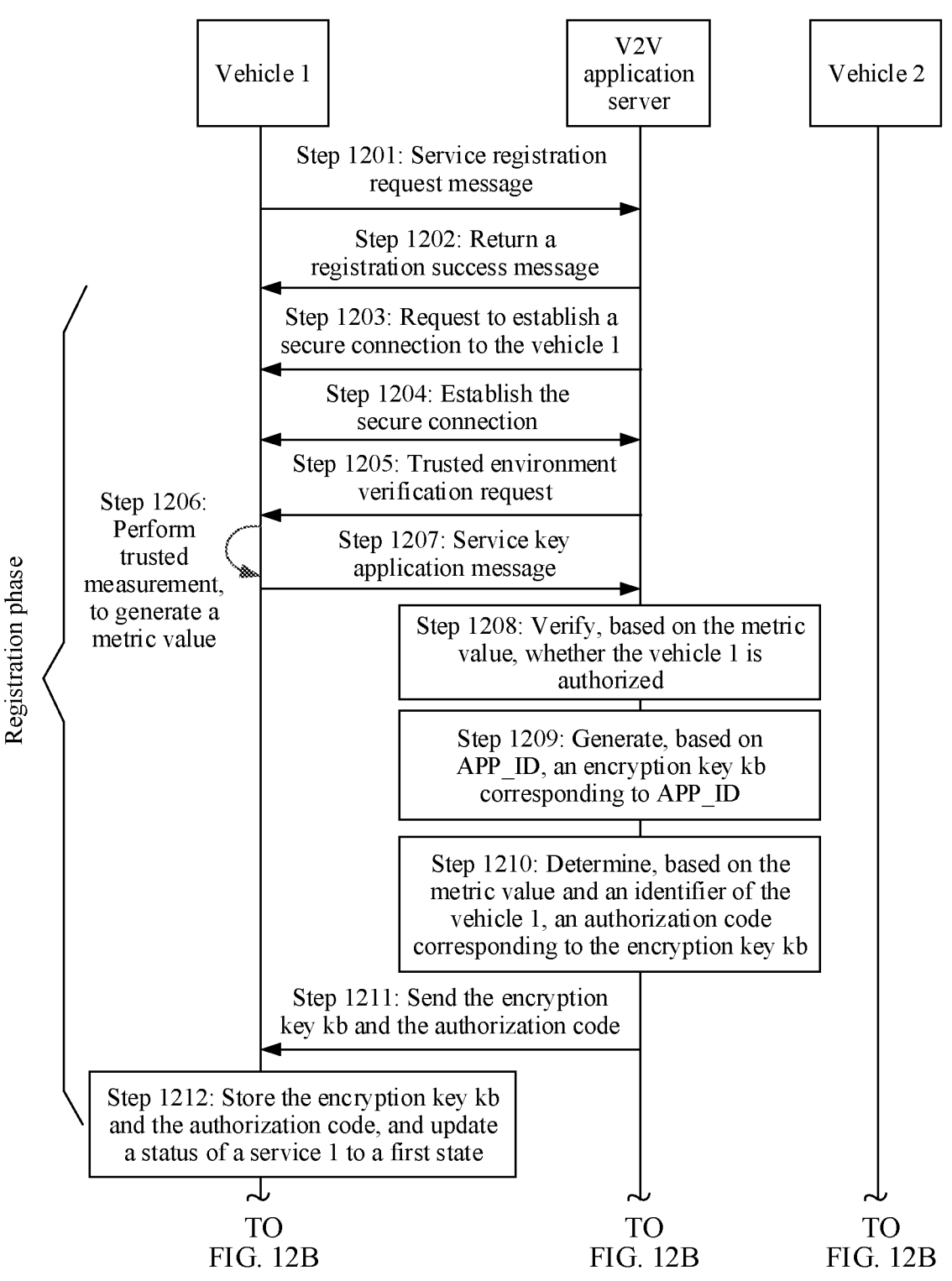
FIG. 12A and FIG. 12B are a schematic diagram 4 of a specific embodiment of a secure communications method according to an embodiment of this application.
Figure 12B:
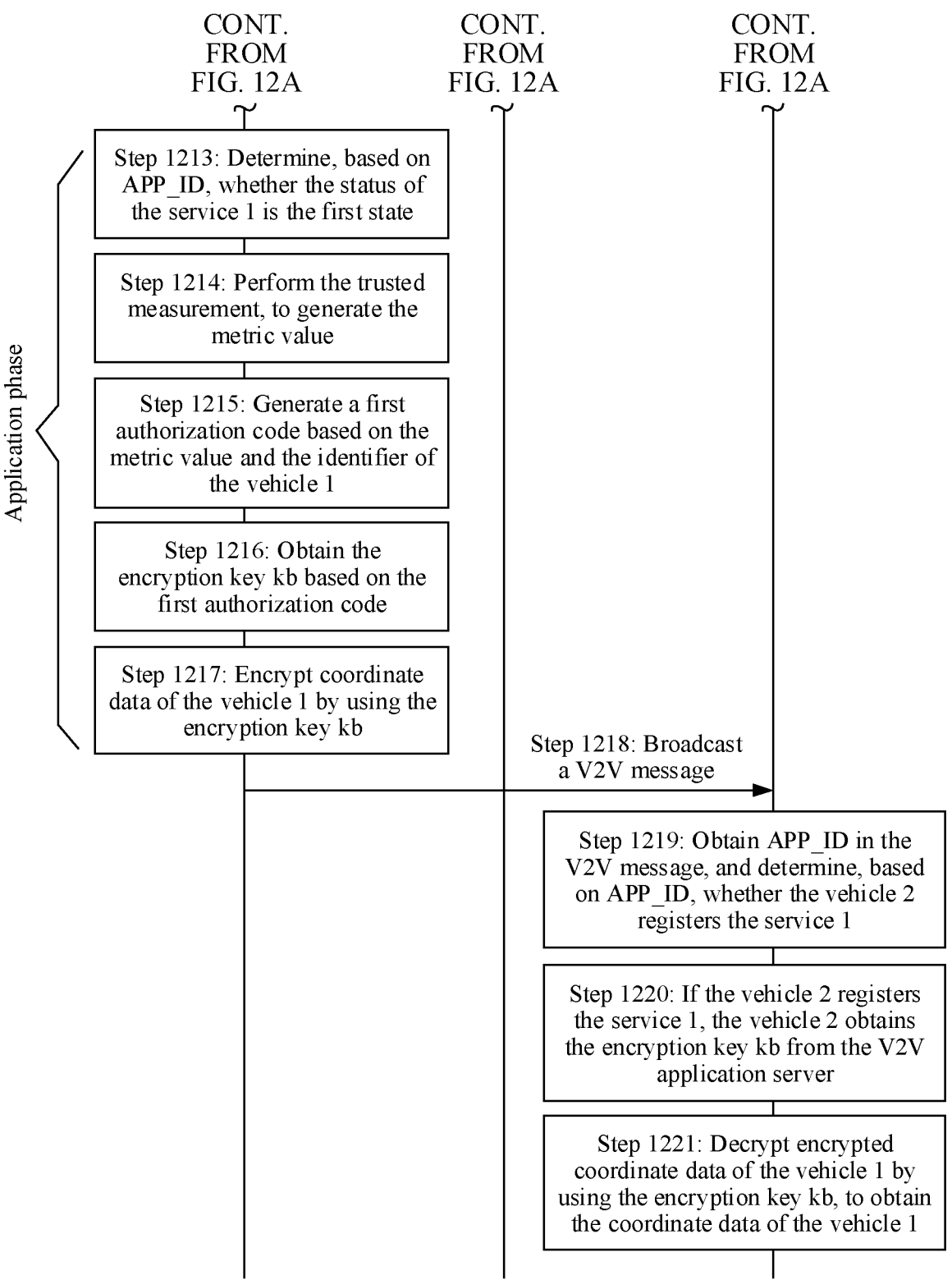

FIG. 12A and FIG. 12B show a specific procedure of another secure communications method according to an embodiment of this application. A difference between this method and the solution shown in FIG. 11A and FIG. 11B lies in that, in this embodiment shown in FIG. 12A and FIG. 12B, a metric value and an authorization code are used in combination, and the metric value is introduced into a parameter generated based on the authorization code. The specific procedure of this method includes step 1201 to step 1221.

Step 1201 to step 1209: Same as step 1101 to step 1109. Details are not described herein again.

Step 1210: The V2V application server determines, based on the metric value and the identifier of the vehicle 1, an authorization code corresponding to the encryption key kb.

For example, in an implementation of step 1210, Auth_code=KDF (metric value, V_ID).

Step 1210 in this embodiment of this application may be implemented in the following manner: A key management apparatus other than the V2V application server may generate the authorization code based on V_ID of the vehicle 1, the metric value, and a key derivation function. Then, the V2V application server requests the authorization code from the key management apparatus based on the identifier of the vehicle 1 and the metric value, to obtain the authorization code. Alternatively, the V2V application server generates the authorization code based on V_ID of the vehicle 1 and the metric value by using a key derivation function. Alternatively, a key management apparatus generates the authorization code based on V_ID of the vehicle 1, the metric value, and a key derivation function, and then configures a mutual mapping relationship between the authorization code, the identifier of the vehicle 1, and the metric value on the V2V application server; and subsequently, the V2V application server obtains the authorization code by querying the mutual mapping relationship based on the identifier of the vehicle 1 and the metric value that are used as indexes.

Step 1211 to step 1213: Same as step 1009 to step 1011. Details are not described herein again.

In a possible embodiment, as shown in FIG. 12A and FIG. 12B, after step 1213, the method provided in this embodiment of this application may further include step 1214 to step 1221.

Step 1214: If the status of the service 1 is the first state, the vehicle 1 performs trusted measurement, to generate the metric value.

Step 1215: The vehicle 1 generates a first authorization code based on the metric value and the identifier of the vehicle 1.

Step 1216: If the first authorization code is the same as the authorization code corresponding to the encryption key, the vehicle 1 obtains the encryption key kb based on the first authorization code.

Step 1217 to step 1221: Same as step 912 to step 916. Details are not described herein again.

In the embodiment shown in FIG. 12A and FIG. 12B, because the authorization code is determined based on the identifier of the vehicle 1 and the metric value of the vehicle 1, that is, the authorization code is bound to the metric value, and metric values of vehicles are different, authorization codes of the vehicles are also different. In addition, the authorization code is related to a security status of the vehicle, and the encryption key can be accessed only when the vehicle is in a secure state. This improves key access security and prevents an unauthorized vehicle from obtaining the encryption key.

Figure 13A:
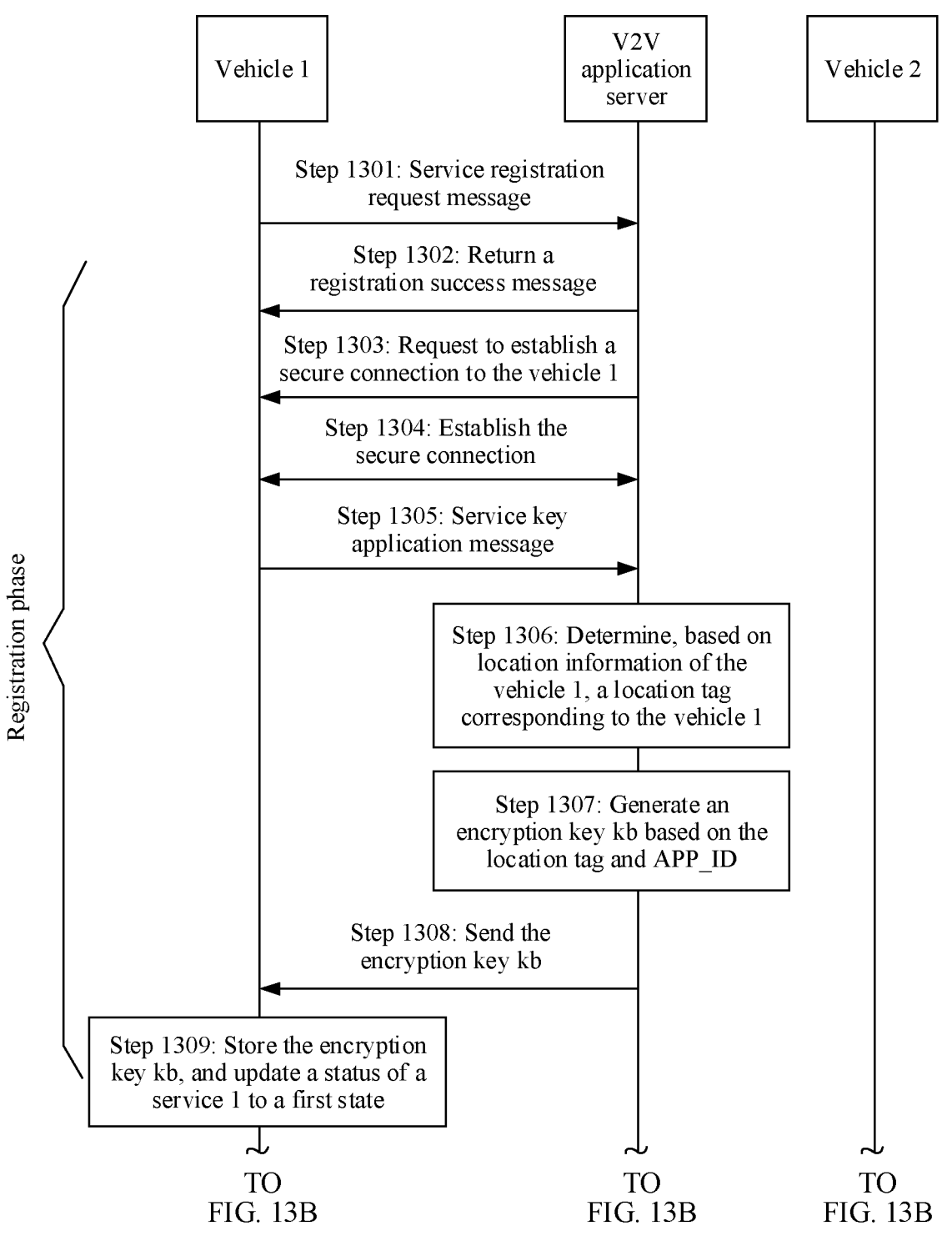

FIG. 13A and FIG. 13B show a specific procedure of another secure communications method according to an embodiment of this application. A difference between this method and the solution shown in FIG. 9A and FIG. 9B lies in that, in this embodiment shown in FIG. 13A and FIG. 13B, location information of a vehicle 1 is introduced, and is used by a V2V application server to generate an encryption key kb. The specific procedure of this method includes step 1301 to step 1316.

Step 1301 to step 1304: Same as step 901 to step 904. Details are not described herein again.

Step 1305: The vehicle 1 sends a service key application message to the V2V application server, and correspondingly, the V2V application server receives the service key application message from the vehicle 1, where the service key application message includes APP_ID, a device ID, and location information of the vehicle 1.

It may be understood that step 1306 is performed if the vehicle 1 determines, based on the identifier of the vehicle 1, that the vehicle 1 meets a condition for enabling the first service.

Step 1306: The V2V application server determines, based on the location information of the vehicle 1, a location tag (location tag) corresponding to the vehicle 1.

Step 1307: The V2V application server generates an encryption key kb based on the location tag and APP_ID.

For example, when generating the encryption key kb, the V2V application server may query a related location tag (which may also be referred to as a location code or a region code) based on the location information of the vehicle 1, where one type of the location identifier is an ID temporarily allocated to a location. For example, a specific number may be allocated to the Pudong district in Shanghai, or a specific number may be temporarily allocated to the Chaoyang district in Beijing. The location tag is not fixedly specified, and is temporarily allocated and used only during a service validity period. In addition, location tags at a same location may be different for different service APP IDs.

For example, step 1307 may be implemented in the following manner: The V2V application server generates the encryption key kb based on a KDF, APP_ID, and the location identifier. For example, kb=KDF (APP_ID, location_tag).

Step 1308 to step 1316: Same as step 908 to step 916. Details are not described herein again.

It should be understood that when the location information is introduced to generate the encryption key corresponding to the service 1, the service 1 corresponds to different encryption keys in different areas, and the V2V application server may record the encryption keys respectively corresponding to the service 1 in the different areas. To be specific, the encryption keys corresponding to the same service 1 in the different areas may be associated with one location tag. The location tag is used to indicate an area to which an encryption key associated with the location tag is applicable. When the vehicle 2 registers the service 1, the V2V application server also returns a corresponding encryption key based on geographical location information of the vehicle 2. Therefore, regardless of whether the vehicle 1 or the vehicle 2 is to obtain an encryption key, the vehicle 1 and the vehicle 2 need to carry respective location information, so that the V2V application server can return an encryption key in a corresponding area.

In the solution described in FIG. 13A and FIG. 13B, security of the encryption key can be further improved by introducing the location information of the vehicle 1. Considering that all vehicles that register the same service 1 have the same encryption key, once an encryption key corresponding to the service 1 on a vehicle is leaked, another vehicle is also affected. Therefore, to limit a scope of encryption key leakage, selection of a specific V2V application scenario is added (for example, factors such as compliance requirements for autonomous driving vehicles to use an autonomous driving function in different areas and an enabling condition that is not met at some locations or in some areas need to be considered). In addition, a location identifier or an area identifier is introduced, so that not only a use range of the encryption key is limited, but also the V2V message can be valid in a specified area.

1. A location limitation is added. This is applicable to a scenario in which a V2V application has a specific location requirement. For example, regulatory requirements of different cities impose some limitations in a test phase.

2. Cross-border transmission of sensitive data through V2V can be limited to some extent, to meet a regulatory requirement.

3. Key management security is improved, and impact caused by key leakage is limited.

It should be noted that in the embodiments shown in FIG. 9A and FIG. 9B to FIG. 13A and FIG. 13B, the service key application message corresponds to the first request message, and the service key response message corresponds to the first response message in the foregoing embodiments.

It should be noted that in the embodiments shown in FIG. 9A and FIG. 9B to FIG. 13A and FIG. 13B, the authorization code, the metric value, and the location information of the vehicle 1 may be used in combination. This is not limited in this embodiment of this application. For example, in the embodiment shown in FIG. 12A and FIG. 12B or FIG. 9A and FIG. 9B, if the vehicle 1 further provides the location information of the vehicle 1 for the V2V application server, step 1209 may be implemented in the following manner: When determining, based on the metric value, that the vehicle 1 is authorized, the V2V application server generates, based on APP_ID and the location tag, the encryption key kb corresponding to APP_ID. Step 907 may be implemented in the following manner: If the vehicle 1 meets the condition for enabling the service 1, the V2V application server generates, based on APP_ID and the location tag, the encryption key kb corresponding to the service 1.

It may be understood that the V2V application server may store a mapping relationship between APP_ID, the location tag, and the encryption key kb. When sending the encryption key to the vehicle 1, the V2V application server may further send the location tag corresponding to the encryption key kb, so that the vehicle 1 determines that the encryption key kb can be adapted to a range corresponding to the location tag 1. Then, to help the vehicle 2 successfully obtain the encryption key kb from the V2V application server, the V2V message not only carries the identifier of the service 1 and the encrypted coordinate data of the vehicle 1, but also may carry the location tag corresponding to the encryption key kb. In this way, the vehicle 2 can obtain the encryption key kb from the V2V application server based on the identifier of the service 1 and the location tag corresponding to the encryption key kb.

For example, Table 1 shows encryption keys corresponding to a same service in different ranges, that is, a key mapping relationship table.

TABLE 1

| Example of a key mapping relationship table | | |
| --- | --- | --- |
| Service identifier | Location tag | Encryption key |
| Service 1 | location_tag 1 | kb 1 |
| | location_tag 2 | kb 2 |

As shown in Table 1, if the location information of the vehicle 1 corresponds to location_tag 1, the encryption key that corresponds to the service 1 and that is fed back by the V2V application server to the vehicle 1 is kb 1. Similarly, the V2V application server may send kb 1 to the vehicle 2 based on the service 1 and location_tag 1 that are provided by vehicle 2.

It should be noted that in the embodiments shown in FIG. 9A and FIG. 9B to FIG. 13A and FIG. 13B, after obtaining, from the V2V application server, the encryption key corresponding to the first service, the vehicle 1 stores the encryption key corresponding to the first service in the vehicle 1. Then, in the application phase, even if a secure connection between the V2V application server and the vehicle 1 is interrupted, the vehicle 1 can still obtain the encryption key from the secure storage hardware, to encrypt the first information. This resolves a problem that the encryption key cannot be obtained through network connection in the application phase.

Figure 14A:
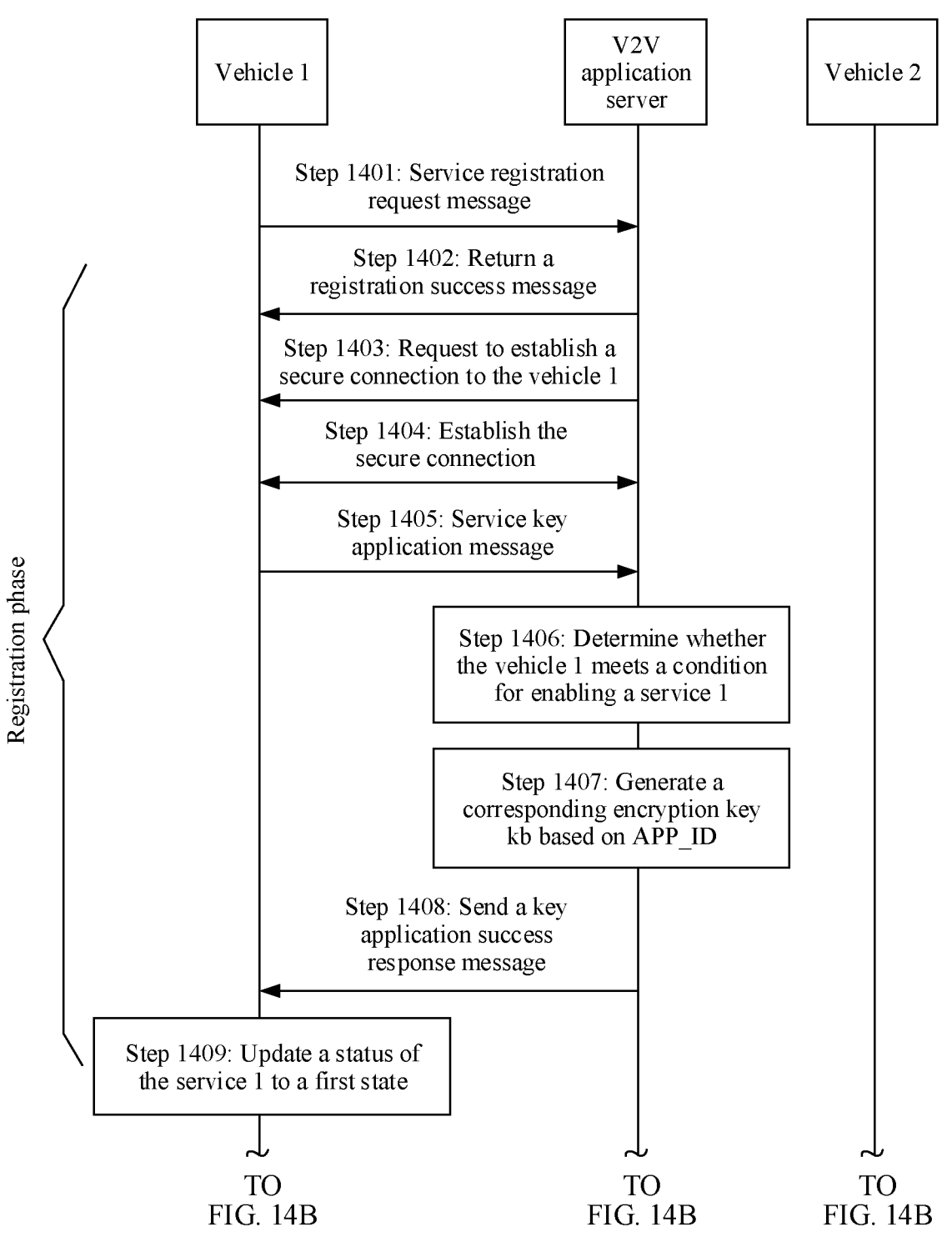
FIG. 14A and FIG. 14B are a schematic diagram 6 of a specific embodiment of a secure communications method according to an embodiment of this application.
Figure 14B:
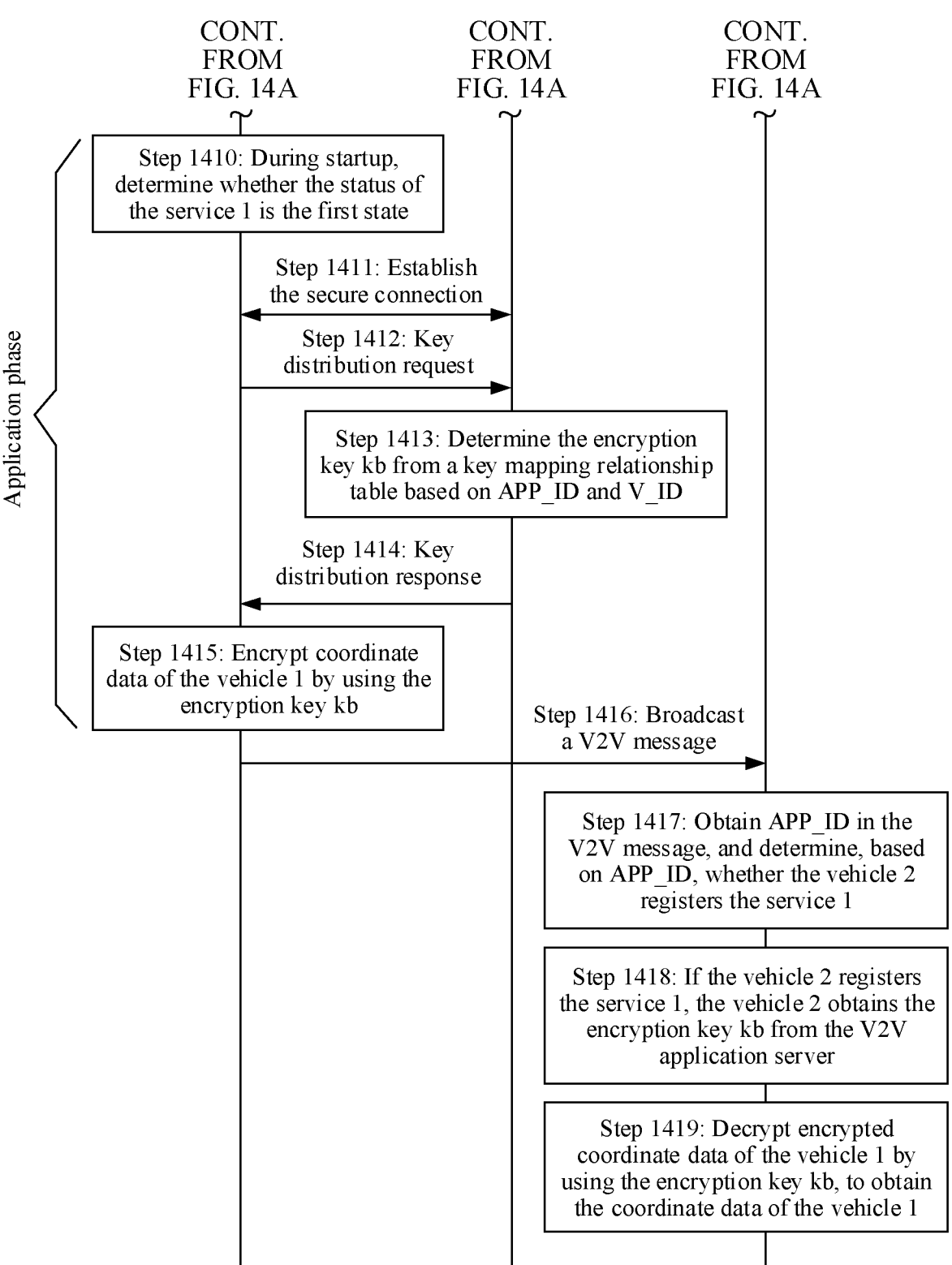

FIG. 14A and FIG. 14B show a specific implementation procedure of another secure communications method according to an embodiment of this application. A difference between this method and the embodiments shown in FIG. 9A and FIG. 9B to FIG. 13A and FIG. 13B lies in that, in this embodiment shown in FIG. 14A and FIG. 14B, to reduce a security risk caused by locally storing an encryption key in a vehicle, a delayed key distribution manner is used (that is, in an application phase, a V2V application server sends the encryption key to a vehicle 1 based on a request of the vehicle 1). In addition, the encryption key is temporarily stored, the encryption key is obtained in a vehicle startup phase, and the encryption key is cleared when the vehicle is in a stalled state (an engine is shut down). Specific steps are as follows:

Step 1401 to step 1407: Same as step 901 to step 907. Details are not described herein again.

Step 1408: The V2V application server sends a key application success response message to the vehicle 1, and correspondingly, the vehicle 1 receives the key application success response message.

The key application success response message indicates that the vehicle 1 successfully enables the service 1, a service status of the service 1 is available, or the V2V application server has generated the encryption key corresponding to service 1. It may be understood that the key application success response message includes second indication information, and the second indication information is used to indicate that the vehicle 1 successfully enables the service 1, the service status of the service 1 is available, or the V2V application server has generated the encryption key corresponding to the service 1.

Step 1409: The vehicle 1 updates a status of the service 1 to a first state.

In a possible embodiment, as shown in FIG. 14A and FIG. 14B, after step 1409, the method provided in this embodiment of this application may further include the following steps.

Step 1410: During startup, the vehicle 1 determines whether the status of the service 1 is the first state.

Step 1411: If the service status of the vehicle 1 is the first state, the vehicle 1 and the V2V application server perform two-way authentication and establish a secure connection.

It should be noted that if the secure connection between the vehicle 1 and the V2V application server is interrupted after step 1401 to step 1410, the vehicle 1 and the V2V application server further need to perform two-way authentication and establish the secure connection. Step 1411 may be omitted if the secure connection between the vehicle 1 and the V2V application server is not interrupted when the vehicle 1 needs to encrypt the first information by using the encryption key after step 1401 to step 1410.

Step 1412: The vehicle 1 sends a key distribution request to the V2V application server, and correspondingly, the V2V application server receives the key distribution request from the vehicle 1.

The key distribution request is used to request the encryption key corresponding to the service 1. For example, the key distribution request includes APP_ID and V_ID.

Step 1413: The V2V application server determines the encryption key kb from a key mapping relationship table based on APP_ID and V_ID.

For example, if the V2V application server determines, based on V_ID, that the vehicle 1 meets a condition for enabling the service 1, the V2V application server queries the key mapping relationship table based on APP_ID used as an index, and uses an encryption key associated with APP_ID in the key mapping relationship table as the encryption key corresponding to APP_ID.

Step 1414: The V2V application server sends a key distribution response to the vehicle 1, and correspondingly, the vehicle 1 receives the key distribution response from the V2V application server.

The key distribution response includes the encryption key kb corresponding to APP_ID.

Step 1415: The vehicle 1 temporarily stores the encryption key kb, and encrypts coordinate data of the vehicle 1 by using the encryption key kb.

Step 1416 to step 1419: Same as step 913 to step 916. Details are not described herein again.

It should be noted that in the embodiment shown in FIG. 14A and FIG. 14B, when requesting the V2V application server to generate the encryption key corresponding to the service 1, the vehicle 1 may also provide location information of the terminal 1, so that the V2V application server generates the encryption key based on the identifier of the vehicle 1 and a location tag. Subsequently, the V2V message may further include the location tag. When the encryption key is determined based on the location tag, the vehicle 2 also needs to provide the location tag when obtaining the encryption key from the V2V application server.

Figure 15A:
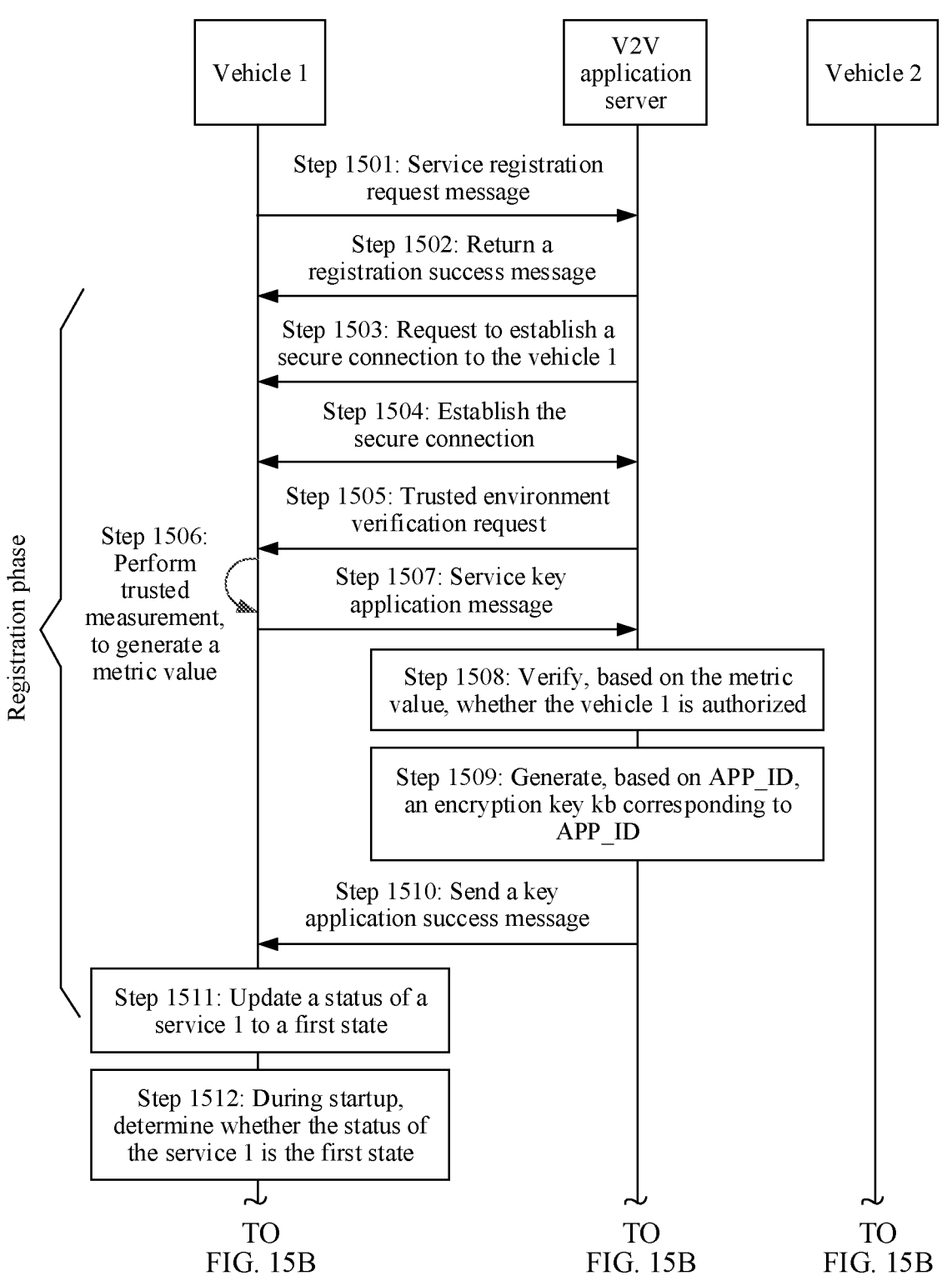
FIG. 15A and FIG. 15B are a schematic diagram 7 of a specific embodiment of a secure communications method according to an embodiment of this application.
Figure 15B:
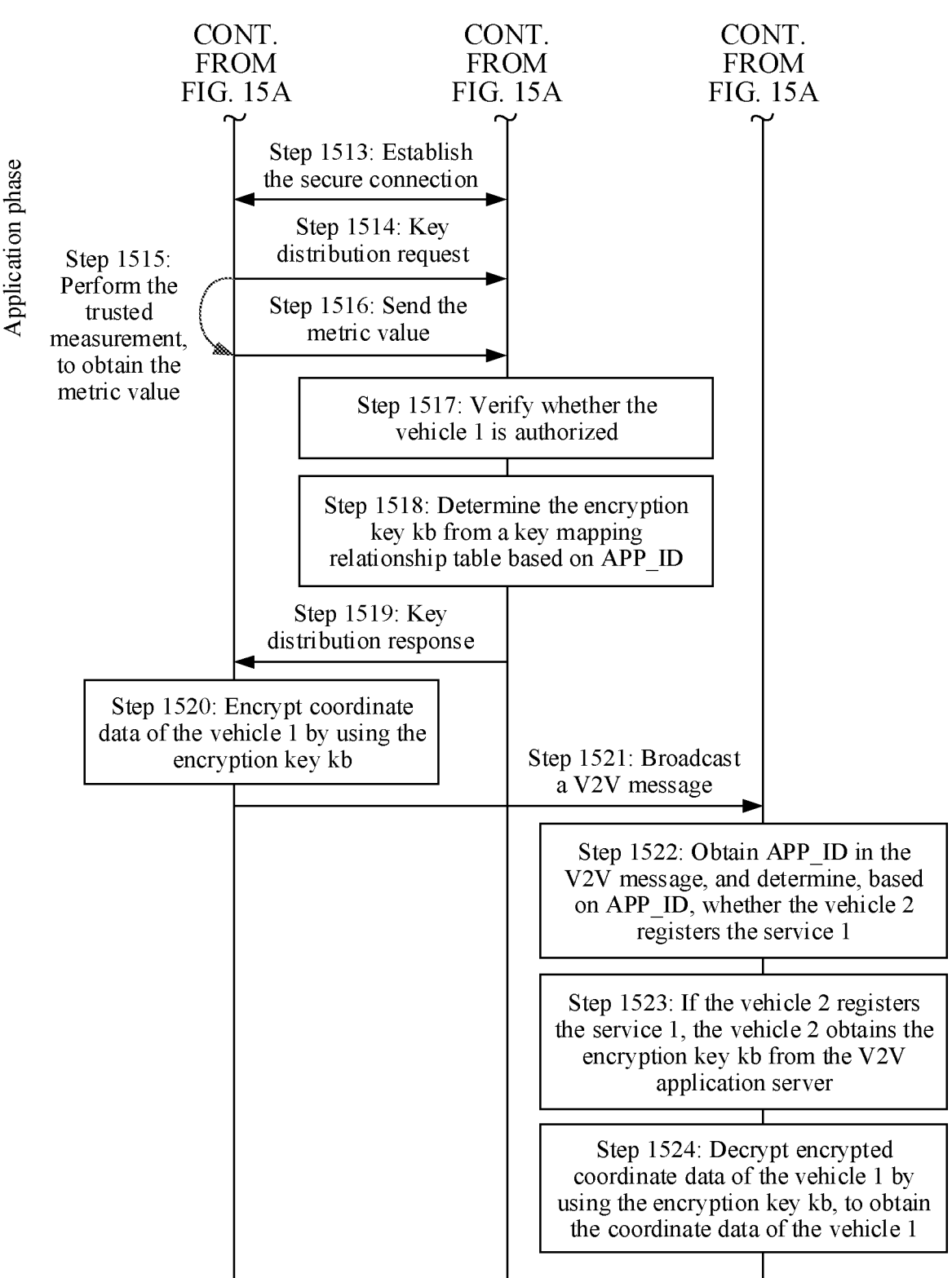

FIG. 15A and FIG. 15B are a schematic flowchart of another secure communications method according to an embodiment of this application. A difference between this method and the embodiment shown in FIG. 14A and FIG. 14B lies in that, in this embodiment shown in FIG. 15A and FIG. 15B, a process of performing trusted measurement is added, to further improve security of locally using a key by a vehicle. To be specific, the trusted measurement is performed in a registration phase. After verification succeeds, a V2V application server generates and stores an encryption key, and returns a key application success response message to a vehicle 1, but does not return the encryption key. In an application phase, the V2V application server sends the encryption key kb to the vehicle 1 only after the trusted measurement succeeds. Specific steps are as follows:

Step 1501 to step 1509: Same as step 1101 to step 1109. Details are not described herein again.

Step 1510 and step 1511: Same as step 1408 and step 1409. Details are not described herein again.

The key application success response message is used to indicate that the vehicle 1 has successfully applied for the encryption key kb corresponding to the service 1. For example, the key application success response message carries APP_ID. In a possible implementation, the key application success response message may further carry indication information or a field used to indicate that the vehicle 1 has successfully applied for the encryption key kb corresponding to the service 1.

In a possible embodiment, as shown in FIG. 15A and FIG. 15B, after step 1511, the method provided in this embodiment of this application may further include the following steps.

Step 1512 to step 1514: Same as step 1410 to step 1412. Details are not described herein again.

Step 1515: The vehicle 1 performs the trusted measurement, to obtain the metric value.

It may be understood that after step 1514, the vehicle 1 may perform trusted environment verification based on a requirement of the V2V application server, and then the vehicle 1 performs step 1515. Alternatively, the vehicle 1 independently determines that step 1515 needs to be performed. Alternatively, the V2V application server and the vehicle 1 negotiate in advance or a protocol predefines that in an application phase in a key distribution scenario, if the vehicle 1 needs to obtain the encryption key, the vehicle 1 needs to perform the trusted measurement. For the latter two cases, the metric value may be carried in the key distribution request in step 1514.

It may be understood that step 1515 may be performed before step 1514. Certainly, the vehicle 1 may alternatively first send the metric value to the V2V application server, and then send the key distribution request. Alternatively, the vehicle 1 may send the metric value and the key distribution request in parallel.

Step 1516: The vehicle 1 sends the metric value to the V2V application server, and correspondingly, the V2V application server receives the metric value from the vehicle 1.

Step 1517: The V2V application server verifies, based on the metric value of the vehicle 1, whether the vehicle 1 is authorized.

Step 1518: When the vehicle 1 is authorized, the V2V application server queries, based on APP_ID, a key mapping relationship table for the encryption key kb corresponding to APP_ID.

Step 1519 to step 1524: Same as step 1414 to step 1419. Details are not described herein again.

It should be noted that in the embodiment shown in FIG. 14A and FIG. 14B or FIG. 15A and FIG. 15B, the key distribution response corresponds to the first response message in the foregoing embodiments, the key distribution request corresponds to the first request message in the foregoing embodiments, the key application success response message corresponds to the second response message, and the service key application message corresponds to the second request message.

In the embodiment shown in FIG. 14A and FIG. 14B or FIG. 15A and FIG. 15B, in the registration phase, the V2V application server may also send an authorization code corresponding to the encryption key to the vehicle 1. Then, in the application phase, the vehicle 1 obtains, from the V2V application server based on the identifier of the service 1 and the authorization code, the encryption key corresponding to the service 1.

Figure 16:
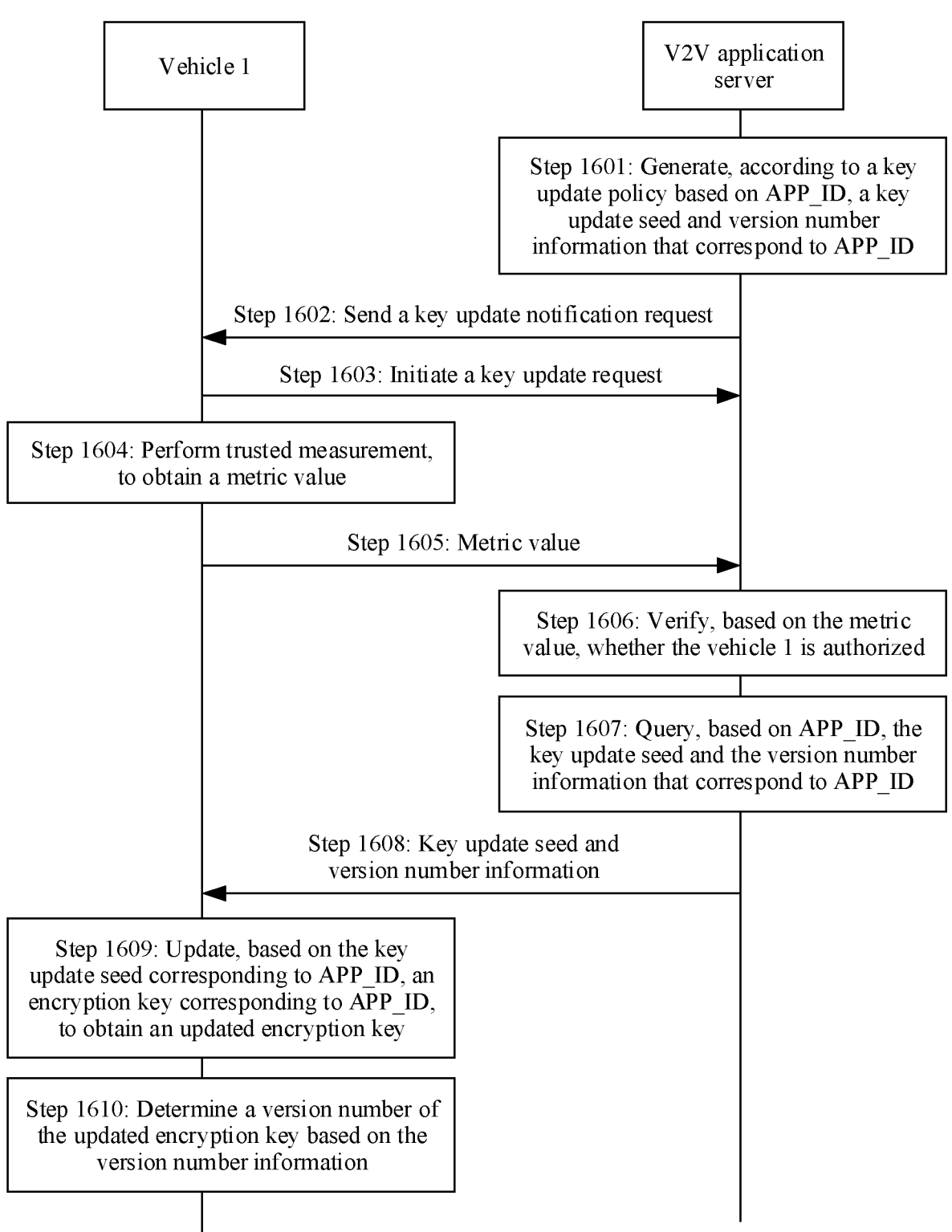
FIG. 16 is a schematic diagram of a specific embodiment of a key update method according to an embodiment of this application.

FIG. 16 shows a specific embodiment of a key update method according to an embodiment of this application. The method includes the following steps.

Step 1601: A V2V application server generates, according to a key update policy based on APP_ID, a key update seed and version number information that correspond to APP_ID.

Step 1602: The V2V application server sends a key update notification request to one or more vehicles (including a vehicle 1), and correspondingly, the one or more vehicles receive the key update notification request from the V2V application server, where the key update notification request is used to indicate the vehicle to update an encryption key corresponding to a service 1.

It may be understood that the one or more vehicles may be all or some of vehicles that have registered the service 1. Alternatively, the one or more vehicles may be vehicles that have registered the service 1 and that have requested the encryption key corresponding to the service 1.

It should be noted that a vehicle that receives the key update notification request automatically initiates a secure connection during next startup. After vehicle And the V2V application server perform two-way authentication, the vehicle establishes the secure connection to the V2V application server, and performs an encryption key update process.

For example, the V2V application server may send the key update notification request to the one or more vehicles (including the vehicle 1) based on a key update period corresponding to the encryption key. Alternatively, the V2V application server may independently determine a period for sending the key update notification request to the one or more vehicles (including the vehicle 1).

Step 1603: The vehicle 1 initiates a key update request to the V2V application server, where the key update request is used to request the V2V application server to update the encryption key corresponding to the service 1.

Step 1604: The vehicle 1 performs trusted measurement, to obtain a metric value.

It may be understood that after step 1603, the vehicle 1 may perform trusted environment verification based on a requirement of the V2V application server, and then the vehicle 1 performs step 1604. Alternatively, the vehicle 1 independently determines that step 1604 needs to be performed. Alternatively, the V2V application server and the vehicle 1 negotiate in advance or a protocol predefines that in a key update scenario, if the vehicle 1 needs to update the encryption key, the vehicle 1 needs to perform the trusted measurement. For the latter two cases, the metric value may be carried in the key update request in step 1603.

Step 1605: The vehicle 1 sends the metric value to the V2V application server, and correspondingly, the V2V application server receives the metric value from the vehicle 1.

Step 1606: The V2V application server verifies, based on the metric value, whether the vehicle 1 is authorized.

Step 1607: When the metric value is authorized, the V2V application server queries, based on APP_ID, the key update seed and the version number information that correspond to APP_ID.

Step 1608: The V2V application server sends the key update seed and the version number information that correspond to APP_ID to the vehicle 1, and correspondingly, the vehicle 1 receives, from the V2V application server, the key update seed and the version number information that correspond to APP_ID.

Step 1609: The vehicle 1 updates, based on the key update seed corresponding to APP_ID, the encryption key corresponding to APP_ID, to obtain an updated encryption key.

Step 1610: The vehicle 1 determines a version number of the updated encryption key based on the version number information.

It should be noted that in a process in which the vehicle 1 updates the encryption key, the V2V application server may also update, based on the key update seed corresponding to APP_ID, the encryption key that corresponds to APP_ID and that is stored on the V2V application server side, to obtain an updated encryption key. In addition, the V2V application server may also determine a version number of the updated encryption key based on the version number information corresponding to APP_ID.

In the embodiment shown in FIG. 16, after the vehicle 1 obtains the updated encryption key, the method provided in this embodiment of this application may further include: The vehicle 1 sends an update success message to the V2V application server, where the update success message is used by the V2V application server to determine that the vehicle 1 has successfully updated the encryption key corresponding to the service 1.

It should be noted that if a key update period corresponding to each service is configured on the vehicle 1, the vehicle 1 may actively send the key update request to the V2V application server when the key update period corresponding to the service 1 expires. In this case, step 1601 and step 1602 may be omitted. In FIG. 16, for example, the V2V application server notifies the vehicle 1 to update the encryption key. In addition, if the step of updating the encryption key is performed by the V2V application server, step 1607 to step 1610 may be replaced with: The V2V application server queries, based on APP_ID, the key update seed and the version number information that correspond to APP_ID. The V2V application server updates, based on the key update seed corresponding to APP_ID, the encryption key corresponding to APP_ID, to obtain an updated encryption key. The V2V application server determines a version number of the updated encryption key based on the version number information. The V2V application server sends the updated encryption key and the version number of the updated encryption key to the vehicle 1.

It may be understood that the updated encryption key obtained after the V2V application server updates the encryption key based on the key update seed is the same as the updated encryption key obtained after the vehicle 1 updates the encryption key based on the key update seed. When both the V2V application server and the vehicle 1 update the encryption key based on the key update seed, if the V2V application server sends the updated encryption key to the vehicle 1, the vehicle 1 determines that a priority of the updated encryption key from the V2V application server is higher than a priority of the updated encryption key obtained by the vehicle 1 based on the key update seed.

For example, the V2V application server or the vehicle may determine the updated encryption key based on the key update seed, the encryption key, and a KDF. For example, updated kb=KDF (seed, kb_oldversion). Herein, kb_oldversion represents the encryption key before the update.

To ensure that vehicles using a same service update the encryption key in a timely manner, the V2V application server reserves a specific update period. A vehicle that has not started for a long time receives the key update notification request from the V2V application server after the vehicle starts, and then sends a key update request to the V2V application server, to update the encryption key to a latest version. Therefore, vehicles that start and go on the road and that have registered the service have a same encryption key.

In the embodiments shown in FIG. 9A and FIG. 9B to FIG. 16, the vehicle 1 corresponds to the first terminal device, the V2V message corresponds to the first message, and the V2V application server corresponds to the server 10. APP_ID corresponds to the identifier of the first service, and V_ID corresponds to the identifier of the first terminal device.

The methods provided in the embodiments of this application may be applied to the internet of vehicles field, for example, V2X, V2X in LTE, and V2X or V2V in NR, or may be applied to fields such as D2D, intelligent connected vehicles, unmanned driving, autonomous driving, assisted driving, intelligent driving, connected driving, intelligent connected driving, car sharing, and artificial intelligence.

The foregoing mainly describes the solutions in the embodiments of this application from a perspective of interaction between the network elements. It may be understood that to implement the foregoing functions, each network element such as the server or the first terminal device includes corresponding hardware structures and/or software modules for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the server or the first terminal device may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that in the embodiments of this application, division into the units is an example and is merely logical function division, and may be other division in an actual implementation.

The foregoing describes the methods in the embodiments of this application with reference to FIG. 5 to FIG. 16. The following describes communications apparatuses that are provided in the embodiments of this application and that perform the foregoing methods. A person skilled in the art may understand that the method and the apparatus may be mutually combined and referenced. The communications apparatus provided in the embodiments of this application may perform the steps performed by the server in the foregoing communications method or key update method. Alternatively, the communications apparatus may perform the steps performed by the first terminal device in the communications method or the key update method in the foregoing embodiment.

An example in which each functional module is obtained through division based on each corresponding function is used below for description.

Figure 17:
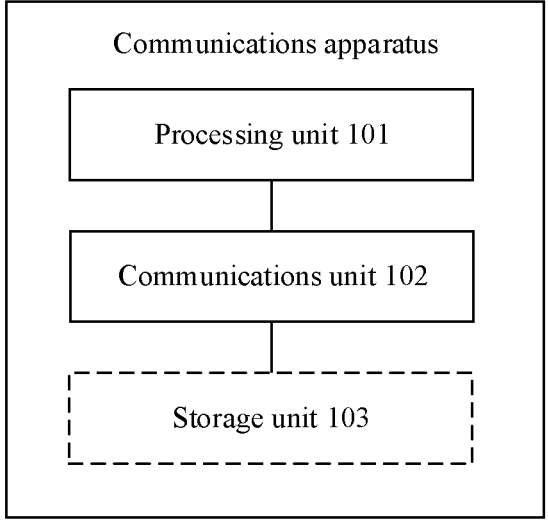
FIG. 17 is a schematic structural diagram of a communications apparatus according to an embodiment of this application.

FIG. 17 is a schematic structural diagram of a communications apparatus according to an embodiment of this application. The communications apparatus may be a first terminal device or a server in this embodiment of this application, or may be a chip or a chip system applied to the server. The communications apparatus includes a processing unit 101 and a communications unit 102. The communications unit 102 is configured to support the communications apparatus in performing the step of sending or receiving information. The processing unit 101 is configured to support the communications apparatus in performing the step of processing information.

In an example, the communications apparatus is the server or the chip or the chip system applied to the server. The communications unit 102 is configured to support the communications apparatus in performing the receiving action performed by the server 10 in step 501 in the foregoing embodiment. The processing unit 101 is configured to support the communications apparatus in performing step 502 in the foregoing embodiment. The communications unit 102 is further configured to support the communications apparatus in performing the sending action performed by the server 10 in step 503 in the foregoing embodiment.

In a possible embodiment, the communications unit 102 is further configured to support the communications apparatus in performing the receiving action performed by the server 10 in step 701 in the foregoing embodiment. The processing unit 101 is further configured to support the communications apparatus in performing step 702 and step 703 in the foregoing embodiment. The communications unit 102 is further configured to support the communications apparatus in performing the sending action performed by the server 10 in step 704 in the foregoing embodiment.

In another example, the communications apparatus is the first terminal device. The communications unit 102 is configured to support the communications apparatus in performing the sending action performed by the first terminal device in step 501 in the foregoing embodiment. The communications unit 102 is configured to support the communications apparatus in performing the receiving action performed by the first terminal device in step 503 in the foregoing embodiment.

In a possible embodiment, the communications unit 102 is further configured to support the communications apparatus in performing the sending actions performed by the first terminal device in step 607 and step 701 in the foregoing embodiments. The communications unit 102 is further configured to support the communications apparatus in performing the receiving action performed by the first terminal device in step 704 in the foregoing embodiment.

The processing unit 101 is configured to support the communications apparatus in performing the processing actions performed by the first terminal device in step 604, step 605, step 606, step 705, and step 706 in the foregoing embodiments.

In still another example, the communications apparatus is the server or the chip or the chip system applied to the server. The communications unit 102 is configured to support the communications apparatus in performing the sending action performed by the server 10 in step 802 in the foregoing embodiment. The processing unit 101 is configured to support the communications apparatus in performing step 801 in the foregoing embodiment.

In a possible implementation, the communications unit 102 is further configured to support the communications apparatus in performing the sending action performed by the server 10 in step 804 in the foregoing embodiment.

In still another example, the communications apparatus is the first terminal device. The communications unit 102 is configured to support the communications apparatus in performing the receiving action performed by the first terminal device in step 802 in the foregoing embodiment. The processing unit 101 is configured to support the communications apparatus in performing the processing action performed by the first terminal device in step 803 in the foregoing embodiment.

In a possible embodiment, the communications unit 102 is further configured to support the communications apparatus in performing the receiving action performed by the first terminal device in step 804 in the foregoing embodiment. The processing unit 101 is further configured to support the communications apparatus in performing the processing action performed by the first terminal device in step 805 in the foregoing embodiment.

In a possible embodiment, the communications apparatus may further include a storage unit 103. The processing unit 101, the communications unit 102, and the storage unit 103 are connected through a communications bus.

The storage unit 103 may include one or more memories. The memory may be a component configured to store a program or data in one or more devices or circuits.

The storage unit 103 may exist independently, and is connected to the processing unit 101 of the communications apparatus through the communications bus. The storage unit 103 may alternatively be integrated into the processing unit.

The communications apparatus may be used in a communications device, a circuit, a hardware component, or a chip.

For example, the communications apparatus may be a chip or a chip system applied to the first terminal or a chip or a chip system applied to the server in the embodiments of this application. In this case, the communications unit 102 may be an input/output interface, a pin, a circuit, or the like. For example, the storage unit 103 may store computer execution instructions of the method on the first terminal side and the server side, so that the processing unit 101 performs the method on the first terminal device side or the server side in the foregoing embodiments. The storage unit 103 may be a register, a cache, a RAM, or the like. The storage unit 103 may be integrated into the processing unit 101. The storage unit 103 may be a ROM or another type of static storage device that can store static information and instructions, and the storage unit 103 may be independent of the processing unit 101.

An embodiment of this application provides a communications apparatus. The communications apparatus includes one or more modules, configured to implement the method in step 501 to step 503, step 701 to step 712, step 601 to step 609, or step 801 to step 805; and the one or more modules may correspond to step 501 to step 503, step 701 to step 712, step 601 to step 609, or step 801 to step 805. Specifically, in this embodiment of this application, for each step in the method performed by a server, the server includes a unit or a module that performs each step in the method. For each step in the method performed by a first terminal device, the first terminal device includes a unit or a module that performs each step in the method. For example, a module that controls or processes an action of the communications apparatus may be referred to as a processing module. A module that performs a step of processing a message or data and that is on the communications apparatus side may be referred to as a communications module.

For example, the communications unit 102 may include a sending unit and a receiving unit. The sending unit is configured to support the communications apparatus in performing a sending action. The receiving unit is configured to support the communications apparatus in performing a receiving action.

It should be understood that, for example, the communications apparatus is a first terminal device. The communications unit 102 is further configured to perform the receiving or sending actions performed by the vehicle 1 in FIG. 9A and FIG. 9B to FIG. 16. The processing unit 101 is further configured to perform the processing actions performed by the vehicle 1 in FIG. 9A and FIG. 9B to FIG. 16.

For example, the communications apparatus is a server. The communications unit 102 is further configured to perform the receiving or sending actions performed by the V2V application server in FIG. 9A and FIG. 9B to FIG. 16. The processing unit 101 is further configured to perform the processing actions performed by the V2V application server in FIG. 9A and FIG. 9B to FIG. 16.

Figure 18:
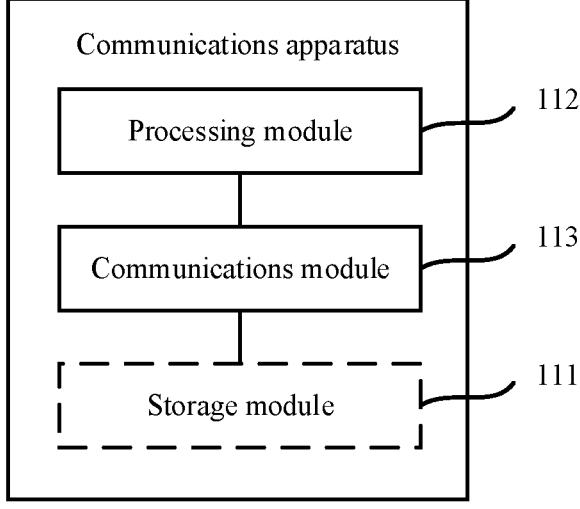
FIG. 18 is a schematic structural diagram of another communications apparatus according to an embodiment of this application.

When an integrated unit is used, FIG. 18 is a possible schematic logical structural diagram of a communications apparatus related to the foregoing embodiments. The communications apparatus may be the first terminal device in the foregoing embodiments. Alternatively, the communications apparatus may be the server in the foregoing embodiments. The communications apparatus includes a processing module 112 and a communications module 113. The processing module 112 is configured to: control and manage an action of the communications apparatus. The communications module 113 is configured to perform the step of processing a message or data on the communications apparatus side.

Optionally, the communications apparatus may further include a storage module 111, configured to store program code and data that are of the communications apparatus.

In an example, the communications apparatus is a server or a chip or a chip system applied to the server. The communications module 113 is configured to support the communications apparatus in performing the receiving action performed by the server 10 in step 501 in the foregoing embodiment. The processing module 112 is configured to support the communications apparatus in performing step 502 in the foregoing embodiment. The communications module 113 is further configured to support the communications apparatus in performing the sending action performed by the server 10 in step 503 in the foregoing embodiment.

In a possible embodiment, the communications module 113 is further configured to support the communications apparatus in performing the receiving action performed by the server 10 in step 701 in the foregoing embodiment. The processing module 112 is further configured to support the communications apparatus in performing step 702 and step 703 in the foregoing embodiment. The communications module 113 is further configured to support the communications apparatus in performing the sending action performed by the server 10 in step 704 in the foregoing embodiment.

In another example, the communications apparatus is a first terminal device. The communications module 113 is configured to support the communications apparatus in performing the sending action performed by the first terminal device in step 501 in the foregoing embodiment. The communications module 113 is configured to support the communications apparatus in performing the receiving action performed by the first terminal device in step 503 in the foregoing embodiment.

In a possible embodiment, the communications module 113 is further configured to support the communications apparatus in performing the sending actions performed by the first terminal device in step 607 and step 701 in the foregoing embodiments. The communications module 113 is further configured to support the communications apparatus in performing the receiving action performed by the first terminal device in step 704 in the foregoing embodiment.

The processing module 112 is configured to support the communications apparatus in performing the processing actions performed by the first terminal device in step 604, step 605, step 606, step 705, and step 706 in the foregoing embodiments.

In another example, the communications apparatus is a server or a chip or a chip system applied to the server. The communications module 113 is configured to support the communications apparatus in performing the sending action performed by the server 10 in step 802 in the foregoing embodiment. The processing module 112 is configured to support the communications apparatus in performing step 801 in the foregoing embodiment.

In a possible implementation, the communications module 113 is further configured to support the communications apparatus in performing the sending action performed by the server 10 in step 804 in the foregoing embodiment.

In another example, the communications apparatus is a first terminal device. The communications module 113 is configured to support the communications apparatus in performing the receiving action performed by the first terminal device in step 802 in the foregoing embodiment. The processing module 112 is configured to support the communications apparatus in performing the processing action performed by the first terminal device in step 803 in the foregoing embodiment.

In a possible embodiment, the communications module 113 is further configured to support the communications apparatus in performing the receiving action performed by the first terminal device in step 804 in the foregoing embodiment. The processing module 112 is further configured to support the communications apparatus in performing the processing action performed by the first terminal device in step 805 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various examples of logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a communications interface, a transceiver, a transceiver circuit, an interface circuit, or the like. The storage module 111 may be a memory.

When the processing module 112 is the processor 41 or the processor 45, the communications module 113 is the communications interface 43, and the storage module 111 is the memory 42, the communications apparatus in this application may be the communications device shown in FIG. 4.

Figure 19:
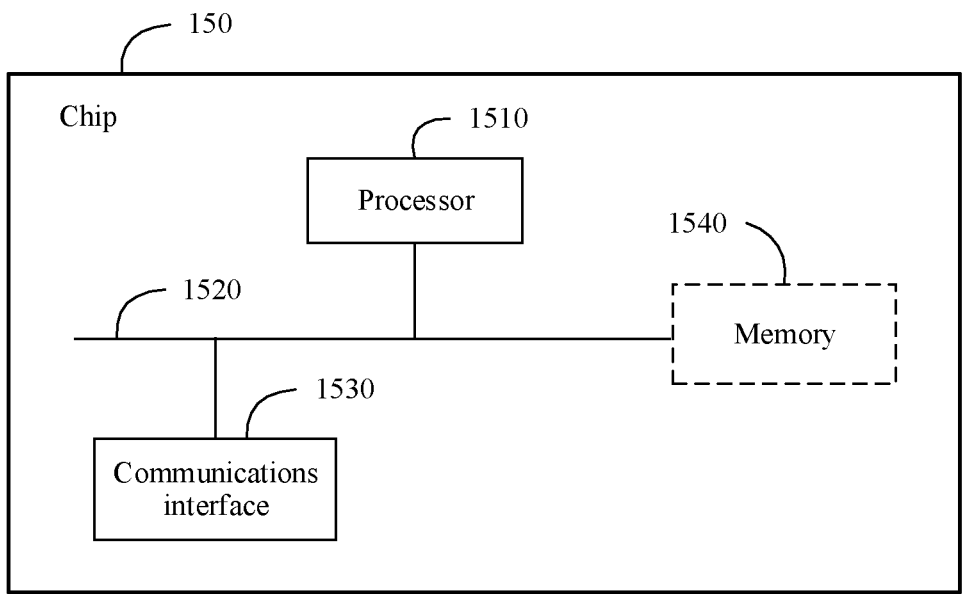
FIG. 19 is a schematic structural diagram of a chip according to an embodiment of this application.

FIG. 19 is a schematic structural diagram of a chip 150 according to an embodiment of the present invention. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extension set thereof.

In this embodiment of the present invention, a corresponding operation is performed by invoking the operation instructions stored in the memory 1540 (where the operation instructions may be stored in an operating system).

In a possible implementation, a first terminal device and a server use a similar chip structure, and different apparatuses may use different chips to implement respective functions.

The processor 1510 controls operations of the first terminal device and the server, and the processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, during application, the memory 1540, the communications interface 1530, and the memory 1540 are coupled together through a bus system 1520. The bus system 1520 may include a power bus, a control bus, a status signal bus, and the like in addition to a data bus. However, for clear description, various buses are marked as the bus system 1520 in FIG. 19.

The foregoing communications unit may be an interface circuit or a communications interface of the apparatus, and is configured to receive a signal from another apparatus. For example, when the apparatus is implemented as a chip, the communications unit is an interface circuit or a communications interface that is on the chip and that is configured to receive a signal from another chip or apparatus or send a signal.

The methods disclosed in the embodiments of the present invention may be applied to the processor 1510, or may be implemented by the processor 1510. The processor 1510 may be an integrated circuit chip and has a signal processing capability. In an implementation process, steps in the foregoing method may be implemented by using a hardware integrated logical circuit in the processor 1510, or by using an instruction in a form of software. The processor 1510 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor 1510 may implement or perform the methods, steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, for example, the chip shown in FIG. 19 is applied to the terminal. In this case, the communications interface 1530 is configured to perform the sending or receiving steps performed by the first terminal device in the embodiments shown in FIG. 5 to FIG. 8. The processor 1510 is configured to perform the processing steps performed by the first terminal device in the embodiments shown in FIG. 5 to FIG. 8.

In a possible implementation, for example, the chip shown in FIG. 19 is applied to the server. In this case, the communications interface 1530 is configured to perform the sending or receiving steps performed by the server in the embodiments shown in FIG. 5 to FIG. 8. The processor 1510 is configured to perform the processing steps performed by the server in the embodiments shown in FIG. 5 to FIG. 8.

In the foregoing embodiments, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

An embodiment of this application further provides a computer readable storage medium. The methods described in the foregoing embodiments may be all or partially implemented by using software, hardware, firmware, or any combination thereof. If the methods are implemented in software, the functions used as one or more instructions or code may be stored in the computer readable storage medium or transmitted on the computer readable storage medium. The computer readable storage medium may include a computer storage medium and a communications medium, and may further include any medium that can transfer a computer program from one place to another. The storage medium may be any target medium that can be accessed by a computer.

In an optional design, the computer readable storage medium may include a RAM, a ROM, an EEPROM, a CD-ROM or another optical disc storage, a magnetic disk storage or another magnetic storage device, or any other medium that is used to carry or store required program code in a form of an instruction or a data structure and that may be accessed by the computer. In addition, any connection is appropriately referred to as a computer readable storage medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combination should also be included within the scope of the computer readable storage medium.

In an example, an embodiment of this application provides a computer readable storage medium. The computer readable storage medium stores a computer program or instructions. When the computer program or the instructions are run on a computer, the computer is enabled to perform the actions performed by the first terminal device in the embodiments corresponding to FIG. 5 to FIG. 8.

In an example, an embodiment of this application provides a computer readable storage medium. The computer readable storage medium stores a computer program or instructions. When the computer program or the instructions are run on a computer, the computer is enabled to perform the actions performed by the server in the embodiments corresponding to FIG. 5 to FIG. 8.

In an example, an embodiment of this application provides a communications system. The communications system includes a first terminal device and a server. The server is configured to perform the actions performed by the server in the embodiments shown in FIG. 5 to FIG. 7A and FIG. 7B. The first terminal device is configured to perform the actions performed by the first terminal device in the embodiments shown in FIG. 5 to FIG. 7A and FIG. 7B.

In a possible implementation, the communications system may further include a second terminal device, configured to perform the actions performed by the second terminal device in the embodiments shown in FIG. 5 to FIG. 7A and FIG. 7B.

In an example, an embodiment of this application provides a communications system. The communications system includes a first terminal device and a server. The server is configured to perform the actions performed by the server in the embodiment shown in FIG. 8. The first terminal device is configured to perform the actions performed by the first terminal device in the embodiment shown in FIG. 8.

An embodiment of this application further provides a computer program product. The methods described in the foregoing embodiments may be all or partially implemented by using software, hardware, firmware, or any combination thereof. When the methods are implemented in software, the methods may be all or partially implemented in a form of the computer program product. The computer program product includes one or more computer instructions. When the computer program instructions are loaded and executed on a computer, the procedures or functions described in the foregoing method embodiments are all or partially generated. The computer may be a general-purpose computer, a dedicated computer, a computer network, a base station, a terminal, or another programmable apparatus.

In an example, an embodiment of this application provides a computer program product including instructions. When the instructions are run on a computer, the computer is enabled to perform the actions performed by the server in the embodiments corresponding to FIG. 5 to FIG. 8.

In an example, an embodiment of this application provides a computer program product including instructions. When the instructions are run on a computer, the computer is enabled to perform the actions performed by the first terminal device in the embodiments corresponding to FIG. 5 to FIG. 8.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A communication method performed by a first terminal device of a first vehicle in a vehicle-to-vehicle (V2V) network, comprising:

sending, by a first communications interface via a first spectrum band, a first request message to a server to request the server allocate an encryption key corresponding to a first V2V network service, the first request message comprising:

an identifier of the first V2V network service, an identifier of the first terminal device, and location information of the first terminal device;

receiving, by the first communications interface via the first spectrum band, a first response message from the server, wherein the first response message comprises the encryption key corresponding to the first V2V network service, wherein the encryption key is generated based on the identifier of the first V2V network service and a location tag, wherein the location tag is determined based on the location information of the first terminal device, and wherein the location tag determines a range within which the encryption key can be used;

encrypting, using the encryption key, coordinate data of the first vehicle; and broadcasting, by a second communications interface to one or more additional terminal devices of one or more additional vehicles in the V2V network and via a second spectrum band, a first message comprising the encrypted coordinate data of the first vehicle, wherein the one or more additional vehicles in the V2V network have been authenticated by the server.

2. The method according to claim 1, wherein the identifier of the first terminal device comprises an integrity measurement value of the first terminal device, wherein the integrity measurement value is a standard metric value or a metric value obtained by the first terminal device by performing a trusted measurement, and wherein the encryption key is generated based further on for-verifying, based on the integrity measurement value, that the first terminal device is authorized to receive the encryption key corresponding to the first V2V network service.

3. The method according to claim 1, further comprising:

receiving, from the server, an authorization code corresponding to the encryption key, wherein the authorization code is for obtaining the encryption key.

4. The method according to claim 1, further comprising:

storing the encryption key in a module of the first terminal device; and updating a status of the first V2V network service to a first state, the first state indicating that the first V2V network service has the corresponding encryption key.

5. The method according to claim 4, further comprising:

obtaining, based on the identifier of the first V2V network service indicating the status of the first V2V network service being the first state, the encryption key from the module of the first terminal device storing the encryption key.

6. The method according to claim 5, wherein the step of obtaining the encryption key from the module of the first terminal device comprises:

generating a first authorization code based on an integrity measurement value; and in response to the first authorization code being the same as the authorization code corresponding to the encryption key, obtaining, based on the identifier of the first V2V network service, the encryption key from the module of the first terminal device.

7. The method according to claim 1, wherein before the step of sending the first request message to the server, the method further comprises:

sending a prior request message to the server to request the server allocate the encryption key corresponding to the first V2V network service, the prior request message comprising the identifier of the first V2V network service and the identifier of the first terminal device;

receiving a prior response message from the server, wherein the prior response message indicates that the first V2V network service has the corresponding encryption key; and updating, by the first terminal device, the status of the first V2V network service to the first state based on the prior response message, the first state indicating that the first V2V network service has the corresponding encryption key.

8. The method according to claim 1, the first message further comprising the identifier of the first V2V network service and the location tag.

9. The method according to claim 1, wherein the first communications interface and first spectrum band correspond to vehicle-to-network (V2N) communications, and wherein the second communications interface and second spectrum band correspond to vehicle-to-vehicle communications.

10. The method according to claim 1, wherein the second communications interface is a PC5 interface and the second spectrum band is a 5.9 gigahertz (GHz) spectrum band.

11. The method according to claim 1, wherein the first message is not valid outside the range determined by the location tag.

12. The method according to claim 1, further comprising:

receiving, by the first communications interface via the first spectrum band, a key update message from the server, the key update message comprising a key update seed and version number information, generating, based on the key update seed, the encryption key corresponding to the first V2V network service, and a key derivation function (KDF), an updated encryption key, determining, based on the version number information, a version number of the updated encryption key.

13. The method according to claim 12, wherein the encryption key corresponding to the first V2V network service corresponds to a first update period, and wherein the updated encryption key corresponds to a second update period.

14. A method performed by a server, the method comprising:

receiving, via a first spectrum band, a first request message from a first terminal device in a vehicle-to-vehicle (V2V) network, wherein the first request message:

requests the server to allocate an encryption key, corresponding to a first V2V network service, for encrypting communications to be broadcast in the V2V network via a second spectrum band, and comprises an identifier of the first V2V network service, an identifier of the first terminal device, and location information of the first terminal device;

generating an encryption key corresponding to the first V2V network service, wherein the encryption key is generated based on the identifier of the first V2V network service, the identifier of the first terminal device, and a location tag determined based on the location information of the first terminal device, wherein the location tag determines a range within which the encryption key can be used; and sending, via the first spectrum band, a first response message to the first terminal device, the first response message comprising the encryption key corresponding to the first V2V network service.

15. The method according to claim 14, wherein the identifier of the first terminal device comprises an integrity measurement value of the first terminal device, wherein the integrity measurement value is a standard metric value or a metric value obtained by the first terminal device by performing a trusted measurement, the method further comprising:

determining, based on the integrity measurement value, that the first terminal device is authorized to receive the encryption key corresponding to the first V2V network service.

16. The method according to claim 14, further comprising:

sending an authorization code corresponding to the encryption key to the first terminal device.

17. The method according to claim 14, wherein before the step of receiving the first request message from the first terminal device, the method further comprises:

receiving a prior request message from the first terminal device, wherein the prior request message requests the server to allocate the corresponding encryption key to the first V2V network service, and comprises the identifier of the first V2V network service and the identifier of the first terminal device; and sending a prior response message to the first terminal device, wherein the prior response message indicates that the first V2V network service has the corresponding encryption key.

18. The method according to claim 17, wherein the step of sending the encryption key corresponding to the first V2V network service to the first terminal device comprises:

receiving an integrity measurement value of the first terminal device from the first terminal device;

determining, based on the integrity measurement value of the first terminal device, that the first terminal device is authorized to receive the encryption key corresponding to the first V2V network service, and sending the encryption key corresponding to the first V2V network service to the first terminal device.

19. The method according to claim 17, wherein the step of determining the encryption key corresponding to the first V2V network service comprises:

determining, based on the identifier of the first terminal device, that the first terminal device is capable of enabling the first V2V network service; and determining, based on the identifier of the first V2V network service, the encryption key corresponding to the first V2V network service.

20. A terminal device comprising:

a memory storing executable instructions;

a processor configured to execute the executable instructions to perform operations of:

sending, by a first communications interface via a first spectrum band, a first request message to a server to request the server allocate an encryption key corresponding to a first vehicle-to-vehicle (V2V) service, the first request message comprising an identifier of the first V2V network service, an identifier of the first terminal device, and location information of the first terminal device;

receiving, by the first communications interface via the first spectrum band, a first response message from the server, the first response message comprising the encryption key corresponding to the first V2V network service, wherein the encryption key is generated based on the identifier of the first V2V network service and a location tag, wherein the location tag is determined based on the location information of the first terminal device, and wherein the location tag determines a range within which the encryption key can be used;

encrypting, using the encryption key, coordinate data of a first vehicle corresponding to the first terminal device; and broadcasting, by a second communications interface to one or more additional terminal devices of one or more additional vehicles in the V2V network and via a second spectrum band, a first message comprising the encrypted coordinate data of the first vehicle, wherein the one or more additional vehicles in the V2V network have been authenticated by the server.

21. The terminal device according to claim 20, wherein the identifier of the first terminal device comprises an integrity measurement value of the first terminal device, wherein the integrity measurement value is a standard metric value or a metric value obtained by the first terminal device by performing a trusted measurement, and wherein the encryption key is generated based further on verifying, based on the integrity measurement value, that the first terminal device is authorized to receive the encryption key corresponding to the first V2V network service.

22. The terminal device according to claim 20, wherein the processor is further configured to perform an operation of:

receiving, from the server, an authorization code corresponding to the encryption key, wherein the authorization code is for obtaining the encryption key.

* * * * *